US012166708B2

(12) United States Patent
Su et al.

(10) Patent No.: US 12,166,708 B2
(45) Date of Patent: Dec. 10, 2024

(54) REMOTE INTERFERENCE MANAGEMENT METHOD, GNB, ELECTRONIC DEVICE, AND READABLE STORAGE MEDIUM

(71) Applicant: Samsung Electronics Co., Ltd., Suwon-si (KR)

(72) Inventors: Di Su, Beijing (CN); Bin Yu, Beijing (CN); Chen Qian, Beijing (CN); Peng Lin, Beijing (CN); Chuang Zhang, Beijing (CN); Qi Xiong, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/430,154

(22) PCT Filed: Feb. 11, 2020

(86) PCT No.: PCT/KR2020/001921
§ 371 (c)(1),
(2) Date: Aug. 11, 2021

(87) PCT Pub. No.: WO2020/166946
PCT Pub. Date: Aug. 20, 2020

(65) Prior Publication Data
US 2022/0150012 A1    May 12, 2022

(30) Foreign Application Priority Data

Feb. 11, 2019   (CN) .......................... 201910110433.5
Feb. 14, 2019   (CN) .......................... 201910115007.0
Apr. 26, 2019   (CN) .......................... 201910345915.9

(51) Int. Cl.
*H04L 5/00*         (2006.01)
*H04B 17/26*        (2015.01)
(Continued)

(52) U.S. Cl.
CPC .......... *H04L 5/0048* (2013.01); *H04B 17/26* (2015.01); *H04B 17/345* (2015.01); *H04J 11/0056* (2013.01); *H04L 5/0007* (2013.01)

(58) Field of Classification Search
CPC ... H04L 5/0048; H04L 5/0007; H04L 5/0023; H04L 5/14; H04L 5/0062; H04L 5/001;
(Continued)

(56) References Cited

U.S. PATENT DOCUMENTS 9,893,925 B1*    2/2018  Patel ................... H04L 27/2659
2003/0108126 A1*  6/2003  Akopian ................ G01S 19/29
375/326

(Continued)

FOREIGN PATENT DOCUMENTS

WO        2011/122833 A2    10/2011

OTHER PUBLICATIONS

ZTE Corporation, Discussion on RIM RS resource and configurations, 3GPP TSG RAN WG1 Ad-Hoc Meeting 1901, Jan. 21-25, 2019, Taipei, Taiwan (Year: 2019).*

(Continued)

*Primary Examiner* — Un C Cho
*Assistant Examiner* — Rasha K Fayed
(74) *Attorney, Agent, or Firm* — Jefferson IP Law, LLP

(57) ABSTRACT

The disclosure relates to a pre-5th-generation (5G) or 5G communication system to be provided for supporting higher data rates beyond 4th-generation (4G) communication system such as long term evolution (LTE). The disclosure provides a remote interference management method, a gNB, an electronic device, a readable storage medium, and a base station for performing inter-base station interference coordination. The method includes steps of: determining, by a gNB, a mapping relationship between a gNB set ID and a (Continued)

RIM-RS according to received configuration information; transmitting, by the gNB, the RIM-RS according to the allocated gNB set ID and the mapping relationship; and/or performing RIM-RS detection, by the gNB, determining gNB set ID information through the detected RIM-RS according to the mapping relationship, and reporting the determined gNB set ID information. The present disclosure determines the mapping relationship between the gNB set ID and the RIM-RS according to the received configuration information, and further transmits and/or detects the RIM-RS based on the mapping relationship, thus simplifying signaling interaction information and improving the communication flexibility of the RIM-RS with multiple functions. The base station includes: a transceiver, configured to transmit signals and/or receive signals; and a processor, configured to: control the transceiver to receive a physical signal transmitted by a second base station and perform interference measurement based on the received physical signal; and control the transceiver to report an interference measurement result to the second base station or a management center, to cause the second base station to perform interference coordination for at least the first base station based on the interference measurement result reported by the first base station or configuration by the management center.

14 Claims, 21 Drawing Sheets

(51) Int. Cl.
   *H04B 17/345*        (2015.01)
   *H04J 11/00*         (2006.01)
(58) Field of Classification Search
   CPC ... H04L 5/0053; H04L 5/0073; H04L 5/0085; H04L 5/0091; H04L 5/1469; H04L 5/0012; H04L 5/0098; H04L 5/0032; H04L 27/261; H04L 27/2605; H04L 27/26025; H04L 27/2607; H04L 27/2634; H04L 27/0006; H04L 27/2655; H04L 27/2691; H04L 27/2613; H04W 84/045; H04W 36/04; H04W 76/27; H04W 76/28; H04W 74/004; H04W 24/02; H04W 24/10; H04W 24/08; H04W 72/0446; H04W 72/042; H04W 72/0453; H04W 72/12; H04W 16/16; H04W 16/14; H04W 16/08; H04W 56/0005; H04W 56/0015; H04W 56/00; H04W 52/243; H04W 52/241; H04W 52/143; H04W 52/343; H04W 52/367; H04W 52/242; H04W 52/244; H04W 52/40; H04W 52/245; H04W 52/04; H04W 28/0236; H04B 2201/698; H04B 2201/70702; H04B 1/713; H04B 1/7156; H04B 1/7107; H04B 17/26; H04B 17/345; H04B 17/328; H04J 11/0056; H04J 11/004; H04J 13/0062; H04J 11/0023
   See application file for complete search history.

(56) References Cited

U.S. PATENT DOCUMENTS

| | | | |
|---|---|---|---|
| 2005/0265222 A1* | 12/2005 | Gerlach | H04W 52/343 370/208 |
| 2007/0042799 A1 | 2/2007 | Jubin et al. | |
| 2009/0042593 A1 | 2/2009 | Yavuz et al. | |
| 2011/0212743 A1* | 9/2011 | Yokomakura | H04L 25/0242 455/509 |
| 2011/0222416 A1* | 9/2011 | Damnjanovic | H04W 52/343 370/252 |
| 2014/0362956 A1* | 12/2014 | Zhang | H04L 1/0045 375/346 |
| 2017/0126340 A1* | 5/2017 | Li | H04W 24/08 |
| 2018/0034575 A1 | 2/2018 | Das et al. | |
| 2020/0106575 A1* | 4/2020 | Masal | H04L 5/0044 |
| 2020/0196343 A1* | 6/2020 | Marinier | H04L 1/1896 |
| 2021/0219304 A1* | 7/2021 | Xu | H04L 5/0073 |
| 2021/0321417 A1* | 10/2021 | Kim | H04L 5/0048 |
| 2021/0385035 A1* | 12/2021 | Ghozlan | H04L 5/14 |
| 2021/0385049 A1* | 12/2021 | Zhu | H04L 5/0073 |
| 2021/0400520 A1* | 12/2021 | Sundberg | H04W 72/27 |
| 2021/0400676 A1* | 12/2021 | Faxer | H04W 72/0446 |
| 2021/0410081 A1* | 12/2021 | Xu | H04W 72/54 |
| 2022/0131630 A1* | 4/2022 | Ghozlan | H04B 17/382 |
| 2022/0141694 A1* | 5/2022 | Miao | H04B 17/345 370/252 |
| 2022/0239455 A1* | 7/2022 | Park | H04W 76/27 |

OTHER PUBLICATIONS

European Search Report dated Mar. 7, 2022, issued in European Patent Application No. 20755258.9.
3GPP TR 38.866 V16.0.0, 3rd Generation Partnership Project; Technical Specification Group Radio Access Network; Study on remote interference management for NR, Dec. 2018.
Huawei, Discussion on OAM functions and RIM mechanisms, 3GPP TSG RAN WG1 Ad-Hoc Meeting 1901 R1-1900050, Jan. 21-25, 2019.
Hisense, Discussion on remote interference mitigation mechanisms for RIM, 3GPP TSG RAN WG1 Meeting AH-1901 R1-1900661, Jan. 21-25, 2019.
Intel Corporation, OAM functions to support RIM operation, 3GPP TSG RAN WG1 Meeting AH 1901 R1-1900492, Jan. 21-25, 2019, Taipei, Taiwan.
CMCC, Feature lead summary for NR RIM, 3GPP TSG RAN WG1 Adhoc Meeting R1-1901309, Jan. 21-25, 2019, Taipei, Taiwan.
European Search Report dated Jul. 7, 2022, issued in European Patent Application No. 20755258.9.
Indian Office Action dated Feb. 14, 2023, issued in an Indian Patent Application No. 202117040985.
European Search Report dated Jul. 9, 2024 issued in European Patent Application No. 20 755 258.9.

* cited by examiner

REMOTE INTERFERENCE MANAGEMENT METHOD, GNB, ELECTRONIC DEVICE, AND READABLE STORAGE MEDIUM

TECHNICAL FIELD

The present disclosure relates to the technical field of radio communication, and more particularly, to a remote interference management method, a gNB, an electronic device, a readable storage medium, and a method and a base station for inter-base station interference coordination in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'beyond 4G Network' or a 'post long term evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A wireless communication system, which uses the same frequency resources for UL and DL communication, including a time division duplex (TDD) system and a co-frequency co-time full duplex (CCFD) system, may have a phenomenon of remote interference caused by an atmospheric ducting. The atmospheric ducting is a physical phenomenon, which usually occurs under certain weather conditions, high rarefaction of the earth's atmosphere causes the refraction factor to decrease, thus causing the signal to be crookedly transmitted to the earth's surface. For example, during seasonal transitions, or in winter in coastal areas, the atmospheric ducting often occurs. In such an environment, the wireless signal may face a small attenuation, thus propagating remote beyond a normal radiation propagation range, resulting in strong interference between remote gNBs in the system in which the same frequency is used in UL and DL communication, which seriously affecting network performance. Then an effective remote interference management (RIM) method is needed to assist the network in reducing or avoiding remote interference and ensure network performance.

Generally, in a TDD communication system, such as the TDD system protocol formulated by the 3rd generation partnership project (3GPP), there will be a gap to prevent the DL transmission of the gNB from seriously interfering with the UL reception. However, when the atmospheric ducting occurs, a very large Gap will need to be configured to achieve the above-mentioned purpose. If a larger gap is always configured, the spectrum utilization rate will inevitably be too low, and configuring a smaller gap will cause serious remote gNB interference when the atmospheric ducting occurs. In response to this phenomenon, the 3GPP has initiated corresponding research and proposed various remote interference management frameworks. As described in 3GPP technical report TS38.866, one of the core issues of remote interference management is how to detect the interfering gNB (Aggressor gNB) that generates remote interference, implement measures to reduce the interference to the interfered gNB (Victim gNB), and how to restore the gNB to normal network operation when finding that the atmospheric ducting remote interference phenomenon disappears, so as to improve network performance and efficiency.

Therefore, in order to solve the above core problems and provide sufficient flexibility in remote interference management to ensure the performance and effectiveness of remote interference management, a flexible management mechanism is urgently needed to configure the communication resources of various Remote Interference Management Reference Symbols (RIM-RS) in remote interference management.

According to ITU's estimation, an amount of global monthly mobile data traffic will reach 62 EBs (Exa Byte, 1 EB=2^30 GB) by 2020, and an amount of global mobile data service will even grow at an annual rate of about 55% from 2020 to 2030. In addition, a proportion of video service and machine-to-machine communication service in mobile data service will gradually increase, and in 2030, the amount of video service will be 6 times of the amount of non-video service, while the amount of machine-to-machine communication service will account for about 12% of the amount of mobile data service ("IMT traffic estimates for the years 2020 to 2030, Report ITU-R M 2370-0").

The rapid growth of mobile data service, especially an exponential growth of high-definition video and ultra-high-definition video service, puts forward higher requirements on transmission rate of wireless communication, and in order to meet a growing demand for mobile service, people need to propose new technologies based on a 4th generation (4G) or a fifth generation (5G) to further improve the transmission rate and throughput of the wireless communication system. A full-duplex technology may further improve a spectrum utilization ratio in the existing system. Unlike a traditional half-duplex system, which adopts time domain (time division duplex, TDD) or frequency domain (frequency division duplex, FDD) orthogonal division for uplink and downlink, a full-duplex system allows users' uplink and downlink to be transmitted simultaneously in time domain and frequency domain. Therefore, the full-duplex system may theoretically reach twice the throughput of the half-duplex system.

However, because the uplink and downlink are the same in time and frequency, transmission signals of a full-duplex device will generate strong self-interference with reception signals, and the self-interference signal will even be 120 dB higher than a bottom noise. In order to make the full-duplex device be able to work, the first problem to solve is to design a scheme to cancel self-interference. At present, there are many researches on self-interference cancellation. By adopting various cancellation methods, such as analog cancellation method, digital-assisted analog cancellation method, and digital cancellation method, etc., power of the self-interference signal may be reduced to at least a same level as that of the bottom noise.

When full-duplex is used in a cellular network scenario, situation about the interference becomes more complicated. Compared with a traditional non-full-duplex cellular network, a full-duplex cellular system suffers from more interference sources and higher interference power. From the base station side, when there is at least one of neighboring cells performing full-duplex transmission, any one of the base stations, when performing uplink reception, may be interfered by downlink transmission of a neighboring cell, which is called inter-base station cross-link interference of neighboring cells. This kind of interference does not exist in the traditional non-full-duplex system, for the reason that: in a time division duplex system, it is generally assumed that neighboring cells adopt same uplink and downlink subframe configuration, so a case where transmission directions of neighboring cells on a subframe are different does not occur; and in a frequency division duplex system, frequency point planning can ensure that neighboring cells do not transmit in different directions in a same frequency band.

DISCLOSURE OF INVENTION

Technical Problem

The new air interface protocol of a 5G communication system introduces a dynamic time division duplex technology, which allows the base station to dynamically decide that certain slots or time-domain symbols are used for uplink transmission or downlink transmission in a manner of scheduling, without being restrained by cell-specific uplink and downlink subframe configuration. At this time, even if neighboring cells adopt same uplink and downlink subframe configuration, inter-base station cross-link interference may occur in certain slots or time-domain symbols dynamically decided by the base station.

For such interference, a processing method of the existing system is generally coordinating, by a management center (typically, an operation administration and maintenance (OAM)), according to interference reported by a base station, dynamic subframe configuration of neighboring base stations, for example, to prevent the neighboring base stations from performing downlink scheduling on physical resources causing interference.

When full-duplex is used in a cellular network scenario, situation about the interference becomes more complicated. Compared with a traditional non-full-duplex cellular network, a full-duplex cellular system suffers from more interference sources and higher interference power. From the base station side, when there is at least one of neighboring cells performing full-duplex transmission, any one of the base stations, when performing uplink reception, may be interfered by downlink transmission of a neighboring cell (inter-base station cross-link interference of neighboring cells).

However, when existing interference coordination methods are also applied to the full-duplex system, it means that neighboring base stations are forced to perform only uplink transmission on the physical resources causing interference, which will deteriorate spectrum efficiency of the full-duplex system and cannot effectively solve the problem of inter-base station cross-link interference of neighboring cells in the full-duplex system.

Solution to Problem

The disclosure provides a remote interference management method, a gNB, an electronic device and a readable storage medium for providing flexible and unified management configuration of a RIM-RS.

In a first aspect, the present disclosure provides a remote interference management method, comprising: determining, by a gNB, a mapping relationship between a gNB set ID and a remote interference management reference symbol (RIM-RS) according to received configuration information;
  transmitting, by the gNB, the RIM-RS according to the allocated gNB set ID and the mapping relationship; and/or
  performing RIM-RS detection, by the gNB, determining gNB set ID information through the detected RIM-RS according to the mapping relationship, and reporting the determined gNB set ID information.

In a second aspect, the present disclosure provides a gNB, comprising: a determination module, a transmission module and/or a detection module,
  the determining module is configured to determine a mapping relationship between a gNB set ID and a RIM-RS according to received configuration information;
  the transmission module is configured to transmit the RIM-RS according to the allocated gNB set ID and the mapping relationship; and
  the detection module is configured to perform RIM-RS detection, determine gNB set ID information through the detected RIM-RS according to the mapping relationship, and report the determined gNB set ID information.

In a third aspect, the present disclosure provides an electronic device, comprising:
  a processor and a memory, the memory stores at least one instruction, at least one program, code set or instruction set, and the at least one instruction, the at least one program, code set or instruction set are loaded and executed by the processor to implement the method as shown in the first aspect of the present disclosure.

In a fourth aspect, the present disclosure provides a computer-readable storage medium, the computer storage medium is used for storing computer instructions, programs, code sets, or instruction sets that, when executed on a computer, cause the computer to perform the method as shown in the first aspect of the present disclosure.

The remote interference management method, the gNB, the electronic device and the readable storage medium provided by the present disclosure determines the mapping relationship between the gNB set ID and the RIM-RS according to the remote interference management method, and further transmits and/or detects the RIM-RS based on the mapping relationship, thus simplifying signaling interaction information and improving the communication indication flexibility of the RIM-RS with multiple functions.

According to an aspect of the present disclosure, a method of inter-base station interference coordination is provided, which includes: receiving, by a first base station, a physical signal transmitted by a second base station and performing interference measurement based on the received physical signal; and reporting, by the first base station, an interference measurement result to the second base station or a management center, to cause the second base station to perform interference coordination at least for the first base station, according to the interference measurement result reported by the first base station or the configuration by the management center.

The method further includes: wherein the physical signal includes an inter-base station measurement physical signal, the inter-base station measurement physical signal being transmitted in one or more frequency sub-bands, and, wherein the inter-base station measurement physical signal is repeatedly transmitted in each frequency sub-band in a plurality of transmission periods, and, wherein at least two replicas with different replica indexes of the inter-base station measurement physical signal are repeatedly transmitted in each frequency sub-band in a same transmission period.

The method further includes: manners in which a plurality of replicas with different replica indexes of the inter-base station measurement physical signal are repeatedly transmitted in each frequency sub-band in the same transmission period contain at least one of the following: at least two replicas with same complex symbols of the inter-base station measurement physical signal being transmitted in each frequency sub-band in a same transmission period by the second base station with different analog transmit beams; at least two replicas with same complex symbols of the inter-base station measurement physical signal being transmitted in each frequency sub-band in the same transmission period by the second base station with different digital transmit beams; or at least two replicas with the same complex symbols of the inter-base station measurement physical signal being transmitted in each frequency sub-band in the same transmission period by the second base station with same analog transmit beams and same digital transmit beams.

The method further includes: wherein the step of the first base station receiving the physical signal transmitted by the second base station and performing interference measurement based on the received physical signal includes: averaging, by the first base station, inter-base station interference signal power of replicas in different transmission periods, in the same frequency sub-band and with the same replica index, to obtain an average inter-base station interference signal power for each frequency sub-band and each replica index.

The method further includes: wherein the step of the first base station receiving the physical signal transmitted by the second base station and performing interference measurement based on the received physical signal further includes: obtaining, by the first base station, at least one of the following as the interference measurement result: an average inter-base station interference signal power for each frequency sub-band and each replica index, replica indexes of M replicas with the strongest average inter-base station interference signal power in each frequency sub-band, average inter-base station interference signal power of the M replicas in each frequency sub-band, and transmit power reduction values for downlink transmission by the second base station in each frequency sub-band using transmit beams corresponding to the M replicas, wherein M is a positive integer and is configured by the management center or is a predetermined system value.

The method further includes: wherein the step of the first base station receiving the physical signal transmitted by the second base station and performing interference measurement based on the received physical signal further includes: obtaining, by the first base station, at least one of the following as the interference measurement result: the average inter-base station interference signal power for each frequency sub-band and each replica index, replica indexes of M replicas of a plurality of replicas of which average inter-base station interference signal power are greater than a predetermined threshold in each frequency sub-band, average inter-base station interference signal power of the M replicas in each frequency sub-band, and transmit power reduction values for downlink transmission by the second base station in each frequency sub-band using the transmit beams corresponding to the M replicas, wherein M is a positive integer and M≤X, wherein X is a positive integer and is configured by the management center or is a predetermined system value.

The method further includes: wherein the interference measurement result reported by the first base station to the management center is used by the management center to obtain at least one of the following as the configuration by the management center: an average inter-base station interference signal power for each frequency sub-band and each replica index, replica indexes of the M replicas, average inter-base station interference signal power of the M replicas in each frequency sub-band, and transmit power reduction values for downlink transmission by the second base station in each frequency sub-band using the transmit beams corresponding to the M replicas; and wherein the configuration by the management center is transmitted to the second base station by the management center.

The method further includes: wherein the interference measurement result reported by the first base station or the configuration by the management center is used by the second base station to perform the following steps: determining transmit beams corresponding to the interference measurement result reported by the first base station or the configuration by the management center; and performing the following steps for K transmit beams among the determined transmit beams: performing downlink transmission without using the K transmit beams in all time-and-frequency resources or specific time-and-frequency resources of the system; or further determining transmit power reduction values corresponding to the K transmit beams from the interference measurement result, and performing downlink transmission in all time-and-frequency resources or the specific time-and-frequency resources according to the determined transmit power reduction values corresponding to the K transmit beams when performing downlink transmission using the K transmit beams; wherein K is a positive integer and K≤M*[number of frequency sub-bands].

The method further includes: wherein the specific time-and-frequency resources include one of the following: time-and-frequency resources for interference coordination configured by the management center; or time-and-frequency resources for interference coordination acquired by the second base station according to a predetermined rule, wherein the predetermined rule includes: using a fixed frequency band within a system bandwidth as the frequency-domain resources for interference coordination; using a fixed (single) subframe(s) or a slot(s) or time-domain symbols in a slot(s) as time-domain resources for interference coordination; and combination of the above frequency-domain resources and time-domain resources.

The method further includes: wherein the step of the first base station reporting the interference measurement result to the second base station or the management center to cause the second base station to perform interference coordination for at least the first base station according to the interference measurement result reported by the first base station or the configuration by the management center includes: accessing, by the first base station, a cell to which the second base station belongs, and reporting the interference measurement result to the second base station through an access link, including: the first base station carrying the interference measurement result in an Msg3 of a random access procedure with the cell to which the second base station belongs, or, the first base station carrying the interference measurement result in an uplink shared channel in an MsgA of a two-step random access procedure with the cell to which the second base station belongs, or, the first base station reporting the interference measurement result on physical resources of semi-persistent scheduling configured by the second base station for the first base station.

The method further includes: wherein, the step of the first base station receiving the physical signal transmitted by the second base station includes: the first base station receiving the physical signal transmitted by the second base station in response to energy of interference with uplink reception being higher than a predetermined interference energy threshold.

The method further includes: the first base station configuring a full-duplex bandwidth or bandwidth part within a system bandwidth, wherein the full-duplex bandwidth or bandwidth part of the first base station and that of the second base station are not overlapped or not completely overlapped.

The method further includes: wherein the step of the first base station configuring the full-duplex bandwidth or bandwidth part within the system bandwidth includes: determining a starting position and a frequency-domain range of the full-duplex bandwidth or bandwidth part of the first base station based on the system bandwidth, the full-duplex bandwidth, a coordinated multiplexing factor and a cell identifier of the first base station.

According to another aspect of the present disclosure, a method of inter-base station interference coordination is provided, which includes: transmitting, by a second base station, a physical signal to a first base station, so that the first base station performs interference measurement based on the physical signal transmitted by the second base station and reporting an interference measurement result to the second base station or a management center; and performing, by the second base station, interference coordination for at least the first base station according to the interference measurement result reported by the first base station or the configuration by the management center.

The method further includes: wherein the physical signal includes an inter-base station measurement physical signal, the inter-base station measurement physical signal being transmitted in one or more frequency sub-bands, wherein the inter-base station measurement physical signal is repeatedly transmitted in each frequency sub-band in a plurality of transmission periods, and wherein at least two replicas with different replica indexes of the inter-base station measurement physical signal are repeatedly transmitted in each frequency sub-band in the same transmission period.

The method further includes: manners in which a plurality of replicas with different replica indexes of the inter-base station measurement physical signal are repeatedly transmitted in each frequency sub-band in the same transmission period contain at least one of the following: the second base station transmitting at least two replicas with the same complex symbols of the inter-base station measurement physical signal in each frequency sub-band in the same transmission period with different analog transmit beams; the second base station transmitting at least two replicas with the same complex symbols of the inter-base station measurement physical signal in each frequency sub-band in the same transmission period with different digital transmit beams; or the second base station transmitting at least two replicas with the same complex symbols of the inter-base station measurement physical signal in each frequency sub-band in the same transmission period with the same analog transmit beams and the same digital transmit beams.

The method further includes: wherein the inter-base station measurement physical signal is used by the first base station to average inter-base station interference signal power of replicas with the same replica index in different transmission periods and in the same frequency sub-band, to obtain an average inter-base station interference signal power for each frequency sub-band and each replica index.

The method further includes: wherein, the inter-base station measurement physical signal is used by the first base station to obtain at least one of the following as the interference measurement result: the average inter-base station interference signal power for each frequency sub-band and each replica index, replica indexes of M replicas with the strongest average inter-base station interference signal power in each frequency sub-band, average inter-base station interference signal power of the M replicas in each frequency sub-band, and transmit power reduction values for downlink transmission by the second base station in each frequency sub-band using the transmit beams corresponding to the M replicas, wherein M is a positive integer and is configured by the management center or is a predetermined system value.

The method further includes: wherein, the inter-base station measurement physical signal is used by the first base station to obtain at least one of the following as the interference measurement result: the average inter-base station interference signal power for each frequency sub-band and each replica index, replica indexes of M replicas of a plurality of replicas of which average inter-base station interference signal power are greater than a predetermined threshold in each frequency sub-band, average inter-base station interference signal power of the M replicas in each frequency sub-band, and transmit power reduction values for downlink transmission by the second base station in each frequency sub-band using the transmit beams corresponding to the M replicas, wherein M is a positive integer and M≤X, wherein X is a positive integer and is configured by the management center or is a predetermined system value.

The method further includes: wherein the interference measurement result is used by the management center to obtain at least one of the following as the configuration by the management center: the average inter-base station interference signal power for each frequency sub-band and each replica index, replica indexes of the M replicas, average inter-base station interference signal power of the M replicas in each frequency sub-band, and transmit power reduction values for downlink transmission by the second base station in each frequency sub-band using the transmit beams corresponding to the M replicas; and wherein the configuration by the management center is transmitted to the second base station by the management center.

The method further includes: wherein the step of the second base station performing interference coordination for at least the first base station according to the interference measurement result reported by the first base station or the configuration by the management center includes: determining transmit beams corresponding to the interference measurement result reported by the first base station or the configuration by the management center; and performing the following steps for K transmit beams among the determined transmit beams: performing downlink transmission without using the K transmit beams in all time-and-frequency resources or specific time-and-frequency resources of the system; or further determining transmit power reduction values corresponding to the K transmit beams from the interference measurement result, and performing downlink transmission in all time-and-frequency resources or specific time-and-frequency resources according to the determined transmit power reduction values corresponding to the K transmit beams when performing downlink transmission using the K transmit beams; wherein K is a positive integer and K≤M*[number of frequency sub-bands].

The method further includes: wherein the specific time-and-frequency resources include one of the following: time-and-frequency resources for interference coordination configured by the management center; or time-and-frequency resources for interference coordination acquired by the second base station according to a predetermined rule, wherein the predetermined rule includes: using a fixed frequency band within a system bandwidth as frequency-domain resources for interference coordination; using a fixed (single) subframe(s) or a slot(s) or time-domain symbols in a slot(s) as time-domain resources for interference coordination; and combination of the above frequency-domain resources and time-domain resources.

The method further includes: wherein the interference measurement result is acquired by the second base station from the first base station by: the second base station acquiring the interference measurement result through an access link through which the first base station accesses a cell to which the second base station belongs, including: the second base station acquiring the interference measurement result in an Msg3 of a random access procedure of the first base station with the cell to which the second base station belongs, or, the second base station acquiring the interference measurement result in an uplink shared channel in an MsgA of a two-step random access procedure of the first base station with the cell to which the second base station belongs, or, the second base station acquiring the interference measurement result on physical resources of semi-persistent scheduling configured by the second base station for the first base station.

The method further includes: wherein the physical signal transmitted from the second base station to the first base station is received by the first base station in response to energy of interference with uplink reception being higher than a predetermined interference energy threshold.

The method further includes: the second base station configuring a full-duplex bandwidth or bandwidth part within a system bandwidth, wherein the full-duplex bandwidth or bandwidth part of the first base station and that of the second base station are not overlapped or not completely overlapped.

The method further includes: wherein the step of the second base station configuring a full-duplex bandwidth or bandwidth part within the system bandwidth includes: determining a starting position and a frequency-domain range of the full-duplex bandwidth or bandwidth part of the second base station based on the system bandwidth, the full-duplex bandwidth, a coordinated multiplexing factor and a cell identifier of the second base station.

According to another aspect of the present disclosure, a method of inter-base station interference coordination is provided, which includes: receiving, by a first base station, a physical signal transmitted by a second base station and performing interference measurement based on the received physical signal; and reporting, by the first base station, an interference measurement result to the second base station or a management center, to cause the second base station to perform interference coordination for at least the first base station according to the interference measurement result reported by the first base station or the configuration by the management center.

The method further includes: wherein the physical signal includes an inter-base station measurement physical signal, the inter-base station measurement physical signal being transmitted in one or more frequency sub-bands, and, wherein the inter-base station measurement physical signal is repeatedly transmitted in each frequency sub-band in a plurality of transmission periods, and, wherein at least two replicas with different replica indexes of the inter-base station measurement physical signal are repeatedly transmitted in each frequency sub-band in the same transmission period.

The method further includes: manners in which a plurality of replicas with different replica indexes of the inter-base station measurement physical signal are repeatedly transmitted in each frequency sub-band in the same transmission period contain at least one of the following: the second base station transmitting at least two replicas with the same complex symbols with different analog transmit beams; the second base station transmitting at least two replicas with the same complex symbols with different digital transmit beams; or the second base station transmitting at least two replicas with the same complex symbols with the same analog transmit beams and the same digital transmit beams.

The method further includes: averaging, by the first base station, the reception signal power of replicas of the inter-base station measurement physical signal in different transmission periods, in the same frequency sub-band and with the same replica index, to obtain an average inter-base station interference signal power for each frequency sub-band and each replica index.

The method further includes: obtaining, by the first base station, at least one of the following as the interference measurement result: the average inter-base station interference signal power for each frequency sub-band and each replica index, replica indexes of M replicas with the strongest average inter-base station interference signal power in each frequency sub-band, average inter-base station interference signal power of the M replicas in each frequency sub-band, and transmit power reduction values for downlink transmission by the second base station in each frequency sub-band using the transmit beams corresponding to the M replicas, wherein M is a positive integer and is configured by the management center or is a predetermined system value.

The method further includes: obtaining, by the first base station, at least one of the following as the interference measurement result: the average inter-base station interference signal power for each frequency sub-band and each replica index, replica indexes of M replicas of a plurality of replicas of which average inter-base station interference signal power are greater than a predetermined threshold in each frequency sub-band, average inter-base station interference signal power of the M replicas in each frequency sub-band, and transmit power reduction values for downlink transmission by the second base station in each frequency sub-band using the transmit beams corresponding to the M replicas, wherein M is a positive integer and M≤X, wherein X is a positive integer and is configured by the management center or is a predetermined system value.

The method further includes: obtaining, by the management center, at least one of the following as the configuration by the management center from the interference measurement result reported by the first base station: the average inter-base station interference signal power for each frequency sub-band and each replica index, replica indexes of the M replicas, average inter-base station interference signal power of the M replicas in each frequency sub-band, and transmit power reduction values for downlink transmission by the second base station in each frequency sub-band using the transmit beams corresponding to the M replicas; and transmitting, by the management center, the configuration by the management center to the second base station.

The method further includes: determining, by the second base station, transmit beams corresponding to the interference measurement result reported by the first base station or the configuration by the management center; and performing the following steps for K transmit beams among the determined transmit beams: performing, by the second base station, downlink transmission without using the K transmit beams in all time-and-frequency resources or specific time-and-frequency resources of the system; further determining, by the second base station, transmit power reduction values corresponding to the K transmit beams from the interference measurement result, and performing downlink transmission in all time-and-frequency resources or specific time-and-frequency resources according to the determined transmit power reduction values corresponding to the K transmit beams when performing downlink transmission using the K transmit beams; wherein K is a positive integer and K≤M*[number of frequency sub-bands].

The method further includes: wherein the specific time-and-frequency resources include one of the following: time-and-frequency resources for interference coordination configured by the management center; or time-and-frequency resources for interference coordination acquired by the second base station according to a predetermined rule, wherein the predetermined rule includes: using a fixed frequency band within a system bandwidth as frequency-domain resources for interference coordination; using a fixed (single) subframe(s) or a slot(s) or time-domain symbols in a slot(s) as time-domain resources for interference coordination; and combination of the above frequency-domain resources and time-domain resources.

The method further includes: accessing, by the first base station, a cell to which the second base station belongs, and reporting the interference measurement result to the second base station through an access link, including: the first base station carrying the interference measurement result in an Msg3 of a random access procedure with the cell to which the second base station belongs, or, the first base station carrying the interference measurement result in an uplink shared channel in an MsgA of a two-step random access procedure with the cell to which the second base station belongs, or, the first base station reporting the interference measurement result on physical resources of semi-persistent scheduling configured by the second base station for the first base station.

The method further includes: the first base station receiving the physical signal transmitted by the second base station in response to energy of interference with uplink reception being higher than a predetermined interference energy threshold.

The method further includes: at least one of the first base station and the second base station configuring a full-duplex bandwidth or bandwidth part within a system bandwidth, wherein the full-duplex bandwidth or bandwidth part of the first base station and that of the second base station are not overlapped or not completely overlapped.

The method further includes: determining a starting position and a frequency-domain range of the full-duplex bandwidth or bandwidth part of the at least one of the first base station and the second base station based on at least one of the system bandwidth, a full-duplex bandwidth, a coordinated multiplexing factor and a cell identifier of the at least one of the first base station and the second base station.

The method further includes: acquiring, by the first base station, a cell identity of the cell to which the second base station belongs to complete downlink synchronization with the cell to which the second base station belongs, or acquiring, by the first base station, the cell identity of the cell to which the second base station belongs according to a neighboring cell identity list configured by an operation administration and maintenance management center, and receiving a downlink synchronization signal of the cell to which the second base station belongs to complete downlink synchronization with the cell to which the second base station belongs.

The method further includes: wherein the inter-base station measurement physical signal includes one of the following: a downlink physical signal of the second base station and a dedicated inter-base station measurement physical signal transmitted by the second base station, wherein the downlink physical signal of the second base station includes one of the following: a synchronization signal block and a channel state information reference signal (CSI-RS), wherein the synchronization signal block includes one of the following: a downlink primary synchronization signal, a downlink auxiliary synchronization signal and a demodulation reference signal of a physical broadcast channel.

The method further includes: wherein the plurality of frequency sub-bands are one of the following: different bandwidth parts; or different frequency sub-bands divided at a predetermined frequency interval within the system bandwidth; or different frequency sub-bands divided at a predetermined frequency interval within a bandwidth part.

The method further includes: acquiring, by the first base station, configuration parameters for the inter-base station measurement physical signal transmitted by the second base station, which include one of the following: a transmission period of the inter-base station measurement physical signal, a time-domain starting position offset of the inter-base station measurement physical signal in the transmission period, times of repetition in the transmission period or duration of a single transmission of the inter-base station measurement physical signal, a transmission frequency/bandwidth of the inter-base station measurement physical signal, a subcarrier offset of the synchronization signal block, a subcarrier interval of the inter-base station measurement physical signal, a sequence of the inter-base station measurement physical signal, and a frequency interval for the inter-base station measurement physical signal to be transmitted at the frequency interval.

The method further includes: wherein the first base station acquires configuration parameters for the inter-base station measurement physical signal transmitted by the second base station by receiving user-specific signaling or a system message transmitted by the second base station; or, the first base station acquires configuration parameters for the inter-base station measurement physical signals transmitted by the second base station by receiving configuration by the management center transmitted by the management center.

The method further includes: configuring, by the second base station, unavailable resources which are physical resources not used for uplink and/or downlink transmission of terminals within the cell to which the second base station belongs, for transmitting the inter-base station measurement physical signal by the second base station.

The method further includes: receiving, by the second base station, configuration information of the management center, which includes at least one of the following: the transmission period of the inter-base station measurement physical signal, times of repetition of the inter-base station measurement physical signal in the period, and a transmission frequency interval of the inter-base station measurement physical signal; and configuring, by the second base station, time-domain and frequency-domain resources for transmitting the inter-base station measurement physical signal as the unavailable resources based on the configuration information of the management center.

The method further includes: configuring, by the first base station, unavailable resources which are physical resources not used for uplink and/or downlink transmission of terminals within the cell to which the first base station belongs, for receiving the inter-base station measurement physical signal from the second base station.

The method further includes: configuring, by the first base station, uplink unavailable resources or uplink and downlink unavailable resources of the terminals, through indication information of the physical resources used for transmitting the inter-base station measurement physical signal configured by the management center or through high-level signaling, wherein the high-level signaling may be a system message or user group-specific signaling or user-specific signaling.

According to yet another aspect of the present disclosure, a method of inter-base station interference coordination is provided, which includes: transmitting, by a second base station, a physical signal to a first base station, so that the first base station performs interference measurement based on the physical signal transmitted by the second base station and reporting an interference measurement result to the second base station or a management center; and performing, by the second base station, interference coordination for at least the first base station according to the interference measurement result reported by the first base station or the configuration by the management center.

The method further includes: wherein the physical signal includes an inter-base station measurement physical signal, the inter-base station measurement physical signal being transmitted in one or more frequency sub-bands, and, wherein the inter-base station measurement physical signal is repeatedly transmitted in each frequency sub-band in a plurality of transmission periods, and, wherein at least two replicas with different replica indexes of the inter-base station measurement physical signal are repeatedly transmitted in each frequency sub-band in the same transmission period.

The method further includes: manners in which a plurality of replicas with different replica indexes of the inter-base station measurement physical signal are repeatedly transmitted in each frequency sub-band in the same transmission period contain at least one of the following: the second base station transmitting at least two replicas with the same complex symbols with different analog transmit beams; the second base station transmitting at least two replicas with the same complex symbols with different digital transmit beams; or the second base station transmitting at least two replicas with the same complex symbols with the same analog transmit beams and the same digital transmit beams.

The method further includes the following steps: averaging, by the first base station, inter-base station interference signal power of replicas in different transmission periods, in the same frequency sub-band and with the same replica index, to obtain an average inter-base station interference signal power for each frequency sub-band and each replica index.

The method further includes: obtaining, by the first base station, at least one of the following as the interference measurement result: the average inter-base station interference signal power for each frequency sub-band and each replica index, replica indexes of M replicas with the strongest average inter-base station interference signal power in each frequency sub-band, average inter-base station interference signal power of the M replicas in each frequency sub-band, and transmit power reduction values for downlink transmission by the second base station in each frequency sub-band using the transmit beams corresponding to the M replicas, wherein M is a positive integer and is configured by the management center or is a predetermined system value.

The method further includes: obtaining, by the first base station, at least one of the following as the interference measurement result: the average inter-base station interference signal power for each frequency sub-band and each replica index, replica indexes of M replicas of a plurality of replicas of which average inter-base station interference signal power are greater than a predetermined threshold in each frequency sub-band, average inter-base station interference signal power of the M replicas in each frequency sub-band, and transmit power reduction values for downlink transmission by the second base station in each frequency sub-band using the transmit beams corresponding to the M replicas, wherein M is a positive integer and M≤X, wherein X is a positive integer and is configured by the management center or is a predetermined system value.

The method further includes: obtaining, by the management center, at least one of the following as the configuration by the management center from the interference measurement result reported by the first base station: the average inter-base station interference signal power for each frequency sub-band and each replica index, replica indexes of the M replicas, average inter-base station interference signal power of the M replicas in each frequency sub-band, and transmit power reduction values for downlink transmission by the second base station in each frequency sub-band using the transmit beams corresponding to the M replicas; and transmitting, by the management center, the configuration by the management center to the second base station.

The method further includes: determining, by the second base station, transmit beams corresponding to the interference measurement result reported by the first base station or the configuration by the management center; and performing the following steps for K transmit beams among the determined transmit beams: performing, by the second base station, downlink transmission without using the K transmit beams in all time-and-frequency resources or specific time-and-frequency resources of the system; further determining, by the second base station, transmit power reduction values corresponding to the K transmit beams from the interference measurement result, and performing downlink transmission in all time-and-frequency resources or specific time-and-frequency resources according to the determined transmit power reduction values corresponding to the K transmit beams when performing downlink transmission using the K transmit beams; wherein K is a positive integer and K≤M*[number of frequency sub-bands].

The method further includes: wherein the specific time-and-frequency resources include one of the following: time-and-frequency resources for interference coordination configured by the management center; or time-and-frequency resources for interference coordination acquired by the second base station according to a predetermined rule, wherein the predetermined rule includes: using a fixed frequency band within a system bandwidth as frequency-domain resources for interference coordination; using a fixed (single) subframe(s) or a slot(s) or time-domain symbols in a slot(s) as time-domain resources for interference coordination; and combination of the above frequency-domain resources and time-domain resources.

The method further includes: receiving, by the second base station, the interference measurement result from the first base station through an access link, including: the second base station obtaining the interference measurement result through an Msg3 of a random access procedure of the first base station with the cell to which the second base station belongs, or, the second base station obtaining the interference measurement result through an uplink shared channel in an MsgA of a two-step random access procedure of the first base station with the cell to which the second base station belongs, or, the second base station obtaining the interference measurement result on physical resources of semi-persistent scheduling configured by the second base station for the first base station.

The method further includes: the second base station transmitting a physical signal to the first base station in response to energy of interference with uplink reception being higher than a predetermined interference energy threshold.

The method further includes: at least one of the first base station and the second base station configuring a full-duplex bandwidth or bandwidth part within a system bandwidth, wherein the full-duplex bandwidth or bandwidth part of the first base station and that of the second base station are not overlapped or not completely overlapped.

The method further includes: determining a starting position and a frequency-domain range of the full-duplex bandwidth or bandwidth part of the at least one of the first base station and the second base station based on at least one of the system bandwidth, a full-duplex bandwidth, a coordinated multiplexing factor and a cell identifier of the at least one of the first base station and the second base station.

The method further includes: acquiring, by the first base station, a cell identity of the cell to which the second base station belongs to complete downlink synchronization with the cell to which the second base station belongs, or acquiring, by the first base station, the cell identity of the cell to which the second base station belongs according to a neighboring cell identity list configured by the management center, and receiving a downlink synchronization signal of the cell to which the second base station belongs to complete downlink synchronization with the cell to which the second base station belongs.

The method further includes: wherein the inter-base station measurement physical signal includes one of the following: a downlink physical signal of the second base station and a dedicated inter-base station measurement physical signal transmitted by the second base station, wherein the downlink physical signal of the second base station includes one of the following: a synchronization signal block and a channel state information reference signal (CSI-RS), wherein the synchronization signal block includes one of the following: a downlink primary synchronization signal, a downlink auxiliary synchronization signal and a demodulation reference signal of a physical broadcast channel.

The method further includes: wherein the plurality of frequency sub-bands are one of the following: different bandwidth parts; or different frequency sub-bands divided at a predetermined frequency interval within the system bandwidth; or different frequency sub-bands divided at a predetermined frequency interval within a bandwidth part.

The method further includes: transmitting, by the second base station, configuration parameters for the inter-base station measurement physical signal to the first base station, which include one of the following: a transmission period of the inter-base station measurement physical signal, a time-domain starting position offset of the inter-base station measurement physical signal in the transmission period, times of repetition in the transmission period or duration of a single transmission of the inter-base station measurement physical signal, a transmission frequency/bandwidth of the inter-base station measurement physical signal, a subcarrier offset of the synchronization signal block, a subcarrier interval of the inter-base station measurement physical signal, a sequence of the inter-base station measurement physical signal, and a frequency interval for the inter-base station measurement physical signal to be transmitted at the frequency interval.

The method further includes: wherein the second base station transmits configuration parameters for the inter-base station measurement physical signal to the first base station by transmitting user-specific signaling or a system message to the first base station; or, the first base station acquires configuration parameters for the inter-base station measurement physical signals transmitted by the second base station by receiving configuration by the management center transmitted by the management center.

The method further includes: configuring, by the second base station, unavailable resources which are physical resources not used for uplink and/or downlink transmission of terminals within the cell to which the second base station belongs, for transmitting the inter-base station measurement physical signal by the second base station.

The method further includes: receiving, by the second base station, configuration information of the management center, which includes at least one of the following: the transmission period of the inter-base station measurement physical signal, times of repetition of the inter-base station measurement physical signal in the period, and a transmission frequency interval of the inter-base station measurement physical signal; and configuring, by the second base station, time-domain and frequency-domain resources for transmitting the inter-base station measurement physical signal as the unavailable resources based on the configuration information of the management center.

The method further includes: configuring, by the first base station, unavailable resources which are physical resources not used for uplink and/or downlink transmission of terminals within the cell to which the first base station belongs, for receiving the inter-base station measurement physical signal from the second base station.

The method further includes: configuring, by the first base station, uplink unavailable resources or uplink and downlink unavailable resources of the terminals, through indication information of the physical resources used for transmitting the inter-base station measurement physical signal configured by the management center or through high-level signaling, wherein the high-level signaling may be a system message or user group-specific signaling or user-specific signaling.

According to yet another aspect of the present disclosure, a first base station for performing inter-base station interference coordination is provided, which includes: a transceiver, configured to transmit signals and/or receive signals; and a processor, configured to: control the transceiver to receive a physical signal transmitted by a second base station and perform interference measurement based on the received physical signal; and control the transceiver to report an interference measurement result to the second base station or a management center, to cause the second base station to perform interference coordination for at least the first base station based on the interference measurement result reported by the first base station or the configuration by the management center.

According to yet another aspect of the present disclosure, a second base station for performing inter-base station interference coordination is provided, which includes: a transceiver, configured to transmit data and/or receive data; and a processor, configured to: control the transceiver to transmit a physical signal to a first base station, so that the first base station performs interference measurement based on the physical signal transmitted by the second base station and reporting an interference measurement result to the second base station or a management center; and performing interference coordination for at least the first base station according to the interference measurement result reported by the first base station or the configuration by the management center.

Advantageous Effects of Invention

The present disclosure at least aims to design an interference coordination scheme, which includes steps of interference measurement, reporting of an interference measurement result, interference coordination based on the interference measurement result, and the like. This scheme can be used to deal with the inter-base station cross-link interference of neighboring cells in a full-duplex cellular network and thus effectively reduce the energy of interference with the base station side in the full-duplex cellular network.

BRIEF DESCRIPTION OF DRAWINGS

In order to more clearly explain that technical solution in the embodiment of the present disclosure, the drawings require to be used in the description of the embodiment of the present disclosure will be briefly described below.

BEST MODE FOR CARRYING OUT THE INVENTION

Figure 1:
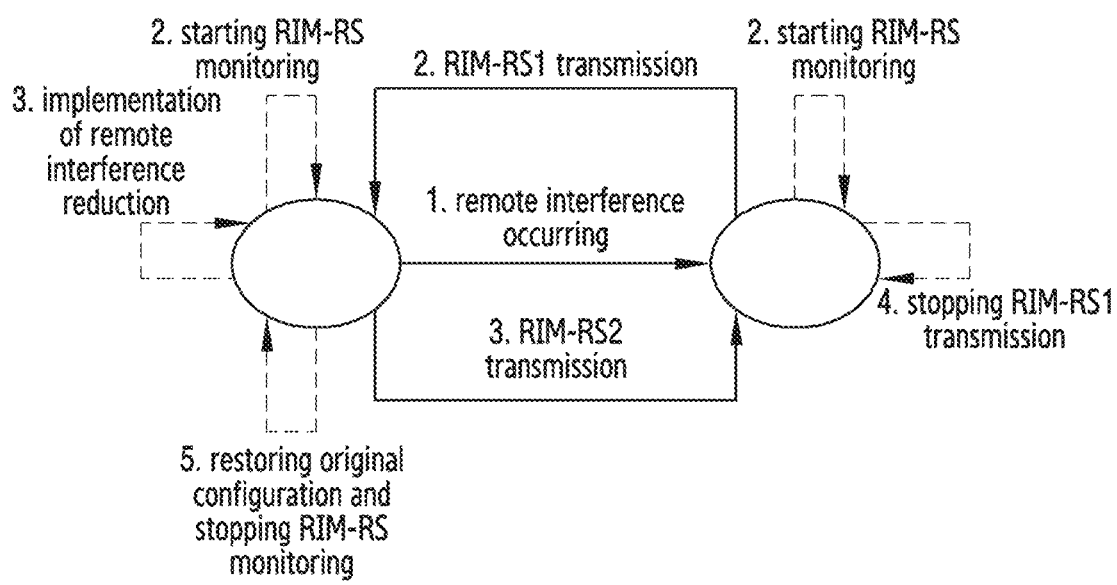
FIG. 1 is a schematic diagram of a remote interference management framework according to an embodiment of the present disclosure.

Embodiments of the present disclosure are described in detail below, examples of which are illustrated in the accompanying drawings, wherein the same or similar reference numerals refer to the same or similar elements or elements having the same or similar functions throughout. The embodiments described below with reference to the accompanying drawings are exemplary and are only for the purpose of explaining the present disclosure and should not be construed as limiting the present disclosure.

Those skilled in the art will understand that the singular forms "a", "an", "said" and "the" as used herein may also include plural forms unless expressly stated. It should be further understood that the term "comprising" as used in the specification of this disclosure refers to the presence of stated features, integers, steps, operations, elements and/or components, but does not preclude the presence or addition of one or more other features, integers, steps, operations, elements, components and/or groups thereof. It should be understood that when an element is referred to as being "connected" or "coupled" to another element, it may be directly connected or coupled to the other element, or intervening elements may also be present. In addition, as used herein, "connected" or "coupled" may include a wireless connection or a wireless coupling. As used herein, the phrase "and/or" includes all or any element and all combinations of one or more associated listed items.

Those skilled in the art can understand that "gNB" and "gNB device" as used herein include not only a device having a wireless signal receiver, which can be a device having a wireless signal receiver without transmitting capability, but also a device having a receiving hardware and a transmitting hardware, which can be a device having a receiving hardware and a transmitting hardware capable of carrying out bidirectional communication on a bidirectional communication link.

In order to make the object, technical scheme and advantages of this disclosure clearer, the embodiments of this disclosure will be described in further detail below with reference to the accompanying drawings.

Firstly, a remote interference management framework related to this disclosure is introduced, as shown in FIG. 1, the operation mode of this framework is as follows:

1. the phenomenon of atmospheric ducting occurs and thus remote interference occurs.
2. the victim gNB suffers interference with the characteristics of atmospheric ducting interference and starts to transmit RIM-RS1, which is used to assist the aggressor gNB to find out the interference they have caused to the victim gNB and to detect how much UL resources are affected by the interference caused to the victim gNB; the aggressor gNB performs RIM-RS1 detection.
3. upon detecting RIM-RS1, the aggressor gNB starts to take remote interference reduction measures and transmit RIM-RS2 to inform the victim gNB whether the remote interference caused by the atmospheric ducting still exists, wherein, the interference reduction measures can include such as configuring a large gap in time domain, adjusting the dip angle of an antenna in space domain, reducing transmission power in power domain and staggering in frequency domain.
4. the Victim gNB can turn on RIM-RS2 detection in the second step, that is, upon detecting RIM-RS2, the Victim gNB will continue to transmit RIM-RS1. and if RIM-RS2 is not detected and the interference falls back to a certain level, the victim gNB will stop transmitting RIM-RS1.
5. the aggressor gNB continues to adopt interference reduction measures until RIM-RS1 is not detected, and then the aggressor gNB can restore the previous settings.

In view of the problems existing in the prior art, the present disclosure provides a flexible and unified configuration of RIM-RSs and a corresponding remote interference management configuration indication method, which can be applied to the above-described remote interference management framework. Wherein the remote interference management framework is one of the interference management frameworks in the 3GPP technical report TS38.866, and the flexible and unified configuration of RIM-RSs and the corresponding remote interference management configuration indication method provided by the present disclosure can also be applied to other interference management frameworks in the 3GPP technical report TS38.866. The scheme of the present disclosure can simplify the configuration of signaling interaction information and provide flexibility of configuration/communication indication of RIM-RS with multiple functions.

Figure 2:
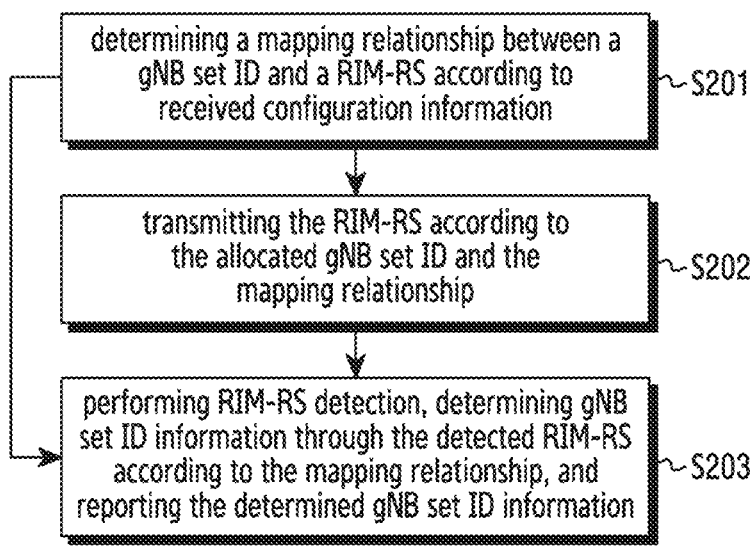
FIG. 2 is a flow chart of a remote interference management method according to an embodiment of the present disclosure.

The embodiment of the present disclosure provides a remote interference management method, as shown in FIG. 2, which includes:

Step S201: a gNB determines a mapping relationship between a gNB set ID and a RIM-RS according to received configuration information;

Step S202: the gNB transmits the RIM-RS according to the allocated gNB set ID and the mapping relationship;

Step S203: the gNB performs RIM-RS detection, determines gNB set ID information through the detected RIM-RS according to the mapping relationship, and reports the determined gNB set ID information.

In the embodiment of the present disclosure, the gNB may receive the configuration information configured by the operation administration and maintenance (OAM) unit of the network, and further determine the mapping relationship between the gNB set ID and the RIM-RS according to the configuration information in step S201 to simplify signaling interaction. In this way, the network can effectively configure RIM-RS resources through gNB ID/gNB set ID, and the gNB can acquire corresponding gNB ID/gNB set ID information through the detected RIM-RS, so as to facilitate interference management.

Wherein, the gNB set ID can be specifically divided into a gNB ID and a gNB set ID. When there is only one gNB in the gNB set, the gNB set ID is the gNB ID, that is, the gNB ID is a special case of the gNB set ID when there is only one gNB. For convenience of description, the gNB set ID of the gNB set is uniformly used in the embodiment of the present disclosure.

Further, the gNB executes step S202 and/or step S203 according to the above mapping relationship.

It should be noted that the sequence of steps S202 and S203 can be replaced, such as detecting RIM-RS1 before transmitting RIM-RS2. In practical disclosure, for different gNBs, each gNB can perform step S202 and/or step S203 for interaction to complete remote interference management.

Specifically, the gNB may receive a predetermined bit (described below according to L bit length for convenience of description) of gNB set ID (s) allocated by the OAM, and further, in step S202, the gNB performs RIM-RS transmission when the transmission trigger condition is satisfied according to the gNB set ID and the mapping relationship between the gNB set ID and the RIM-RS until the transmission stop information is received.

In step S203, the gNB can perform RIM-RS detection according to the configuration of the OAM, and obtain corresponding information from the detected RIM-RS and report it according to the mapping relationship between gNB set ID and the RIM-RS, specifically, it includes deriving gNB set ID information and reporting it to the OAM. In practical disclosure, OAM can configure one or more detection time windows, and the gNB can report the detected gNB set ID information after RIM-RS detection within the detection time window.

According to the remote interference management method provided by the embodiment of the present disclosure, the mapping relationship between the gNB set ID and the RIM-RS is determined according to the received configuration information, and then the RIM-RS is transmitted and/or detected based on the mapping relationship, so that signaling interaction information is simplified, and the configuration/communication indication flexibility of the RIM-RS with multiple functions is improved.

In the embodiment of the present disclosure, the TDD network can configure the following types of RIM-RSs for remote interference management in order to better cope with remote interference caused by the atmospheric ducting:
 (1) RIM-RS for remote gNB interference detection (also referred to as RIM-RS1 for "remote gNB interference detection").
 (2) RIM-RS for near gNB interference detection (also referred to as RIM-RS1 for "near gNB interference detection").

Wherein, the RIM-RS1 for "remote gNB interference detection" and the RIM-RS1 for "near gNB interference detection" are respectively used for interference detection of near/remote gNBs. Specifically, the RIM-RS1 for "remote gNB interference detection" and the RIM-RS1 for "near gNB interference detection" correspond to the relative distances of the two types of RIM-RSs with respect to a certain time reference point, that with a large relative distance is used for remote gNB interference detection, and that with a small relative distance is used for near gNB interference detection. In actual configuration, the near/remote attribute of the RIM-RS can be implicitly judged by the relative distances without being indicated by display.
 (3) RIM-RS for indicating whether remote interference still exists (also referred to as RIM-RS2 for "detecting whether remote interference still exists").

This RIM-RS2 is used by the aggressor gNB to inform the victim gNB whether the remote interference caused by the atmospheric ducting still exists.

In addition, the following two types of RIM-RSs can be configured:
 (1) RIM-RS for indicating not enough mitigation (also referred to as RIM-RS1 for "indicating not enough mitigation").
 The RIM-RS1 is used to be transmitted when the victim gNB suffers from interference with atmospheric ducting interference characteristics.
 (2) RIM-RS for indicating enough mitigation (also referred to as RIM-RS1 for "indicating enough mitigation").
 This RIM-RS1 is used to be transmitted when it is found that the interference to the victim gNB is reduced to an acceptable level.

The embodiment of the present disclosure provides a feasible implementation. The configuration information configured by the OAM includes but is not limited to at least one of the following:
 (1) DL and UL pattern period (DL-UL pattern period) P.
 Specifically, it is a single DL-UL pattern period or a concatenated DL-UL pattern period.
 Wherein, the single DL-UL pattern period p includes $M_p=1$ DL-UL switching points, and the single DL-UL pattern period p is the period length of one DL-UL pattern switching period (also referred to as DL-UL switching period).
 The cascaded DL-UL pattern period P is formed by cascading $M_p \geq 2$ DL-UL patterns and includes $M_p$ DL-UL switching points, and the cascaded DL-UL pattern period P is the sum of switching periods $p_n$ corresponding to $M_p$ DL-UL patterns, respectively, i.e., $P=\Sigma_{n=0}^{M_p} P_n$.
 (2) transmission period of RIM-RS (also referred to as RIM-RS transmission period) T.
 The RIM-RS transmission period T is an integer multiple of the single DL-UL pattern period P or the cascaded DL-UL pattern period P, i.e., $T=N \times P$. Each RIM-RS transmission period T includes $$\frac{T \times M_p}{P} = N \times M_p$$

(N and M are integers) RIM-RS transmission opportunities, i.e. each DL-UL switching period is one RIM-RS transmission occasion.
 (3) time period allocation information of each type of RIM-RS in the transmission period of the RIM-RS.
 That is, it is the time period allocation information of RIM-RS1 and RIM-RS2 in the RIM-RS transmission period T.
 Specifically, the time period allocation information of each type of RIM-RS in the transmission period T of the RIM-RS is as follows: The transmission period T of the RIM-RS includes two time periods, the former time period being the RIM-RS time period $T_1$ for interference detection and the latter time period being the RIM-RS time period $T_2$ for indicating whether the remote interference still exists, wherein $T=T_1+T_2$.
 As an example, the time period allocation information may include: The transmission period T is divided into two time periods, the former time period is RIM-RS1 time period and the latter time period is RIM-RS2 time period. Then, the time period allocation information can be configured according to $T_1=N_1 \times P$ and $T_2=N_2 \times P$, respectively. Wherein, the $T_1$ time period includes $$\frac{T_1 \times M_p}{P} = N_1 \times M_p$$

RIM-RS transmission opportunities, the $T_2$ time period includes $$\frac{T_2 \times M_p}{P} = N_2 \times M_p$$

RIM-RS transmission opportunities, and the division of the time period is in units of P, i.e. the time period is an integer multiple of P.
 Alternatively, the time period allocation information may be directly configured as: $N_1 \times M_p$ RIM-RS transmission opportunities belong to the former time period for RIM-RS1; and $N_2 \times M_p$ RIM-RS transmission opportunities belong to the latter time period for RIM-RS2. The division of the time period is in units of RIM-RS transmission opportunity, i.e. the time period is an integer multiple of RIM-RS transmission opportunity.
 It can be understood that $M_p=1$ is also applicable to the above two modes.
 The RIM-RS transmission period T is segmented back and forth, and RIM-RS1 and RIM-RS2 are respectively transmitted to ensure respective functions and reduce waiting time, and the configuration signaling can be simplified at the same time.
 (4) the number of repetitions $R_x$ of each type of RIM-RS
 That is, it is the number of repetitions $R_x$, x={a, b, c} of RIM-RS1 for "near gNB interference detection", RIM-RS1 for "remote gNB interference detection" and RIM-RS2.
 Specifically, the number of repetitions $R_a$ of RIM-RS1 for "near gNB interference detection", the number of repetitions $R_b$ of RIM-RS1 for "remote gNB interference detection" and the number of repetitions $R_c$ of RIM-RS2 can be configured separately or uniformly, that is, the number of repetitions of each type of RIM-RS can be configured to be the same or different.
 In one possible implementation, the number of repetitions of the RIM-RS used for remote gNB interference detection is the same as that of the RIM-RS used for near gNB interference detection, that is, the number of repetitions of RIM-RS1 for "remote gNB interference detection" and RIM-RS1 for "near gNB interference detection" can be configured to be the same, then the number of repetitions of RIM-RS1 can be directly indicated to be $R=R_a+R_b$.

(5) the number of frequency domain resources $N_f$ of remote interference management reference symbol that is, it is the number of frequency domain resources $N_f$ of RIM-RS.

(6) a set of available sequences on transmission opportunities of each RIM-RS

The set of RIM-RS available sequences containing $N_s$ available sequences included on each RIM-RS transmission opportunity includes whether the sequence domain is configured with two RIM-RS1s indicating "enough mitigation" and "not enough mitigation", respectively, i.e., whether RIM-RS1 indicating "not enough mitigation" and RIM-RS1 indicating "enough mitigation" are configured. When the RIM-RS1 indicating "not enough mitigation" and the RIM-RS1 indicating "enough mitigation" are configured, a half of the sequences of the set of RIM-RS available sequences with $N_s$ available sequences are used for the RIM-RS1 indicating "not enough mitigation" and the other half are used to indicate the RIM-RS1 indicating "enough mitigation". The set of RIM-RS available sequences with $N_s$ available sequences can all be used for RIM-RS2.

In the embodiment of the present disclosure, the configuration information configured by the OAM may further include: The location of the transmission symbol of the RIM-RS in the RIM-RS transmission opportunities.

The OAM also configures specific RIM-RS to be located at specific symbol level locations in the UL-DL switching period. In other words, the RIM-RS transmission opportunities is the time domain location information at the level of the DL-UL switching period. In this DL-UL switching period, the OAM can configure a reference time point for the RIM-RS symbol level transmission time.

For example, the reference time point is the DL transmission boundary in the DL-UL pattern switching period, and the TDD-UL-DL-Config Common configuration information in 3GPP TS 38.331 document can be referred to configure the DL transmission boundary, and then the RIM-RS symbol level transmission starting point location is configured to be the symbol ordinal relative to the reference time point.

For example, if the RIM-RS occupies 2 OFDM symbols, the boundary of DL transmission is configured as the reference time point and the boundary of the last DL slot in the DL-UL pattern is configured as the reference time point, and one slot has 14 symbols, then the starting location of RIM-RS can be configured as the $0^{th} \sim 12^{th}$ symbols of the slot at the reference time point. If the DL reference time point is configured as the last DL symbol in the DL-UL pattern, then the location of the transmission symbol of RIM-RS can be configured as the first two symbols of the DL reference time point, which is consistent with the boundary alignment of the reference time point. The above are only schematic illustrations of the configuration of symbol level locations and should not be construed as limiting the embodiments of the present disclosure.

Further, the gNB can determine the mapping relationship between the gNB set ID having L bits long and the RIM-RS in the network according to the above configuration information, which can also be referred to as a mapping rule or a unified mapping rule.

The embodiment of the present disclosure provides a feasible implementation mode for step S202, which specifically includes:

Step S2021: the gNB acquires the RIM-RS resource information in the transmission period corresponding to the gNB set ID according to the gNB set ID and the mapping relationship.

That is, the gNB can obtain corresponding RIM-RS resource information, such as sequence domain information, time domain information and frequency domain information $\{I_f, I_o, I_s\}$ of RIM-RS resource configuration, according to the configured gNB set ID and the determined mapping rule between the RIM-RS resource information and the gNB set ID in the transmission period T.

In remote interference management, the gNB can be notified to receive the gNB set ID having L bits long configured by the OAM, and the gNB can automatically obtain the corresponding RIM-RS resource information through the gNB set ID.

Step S2022: the gNB transmits the RIM-RS on the resources corresponding to the RIM-RS resource information according to the transmission period.

Specifically, when the transmission trigger condition is satisfied, the RIM-RS transmission is performed on the corresponding resources with the transmission period T as the period until the transmission stop information is received, for example, the transmission is performed at the corresponding RIM-RS time and frequency domain locations.

Similarly, in step S203 of the embodiment of the present disclosure, the gNB acquires the corresponding gNB set ID information having L bits long through the detected RIM-RS information $\{I_f, I_o, I_s\}$, and reports it.

In the embodiment of the present disclosure, a feasible implementation mode is provided for step S2021. Specifically, the gNB acquires the RIM-RS resource information in a RIM-RS transmission period corresponding to the gNB set ID according to the mapping relationship according to the indication of at least one of the following information domains contained in the gNB set ID having L bits long, that is, the mapping rule is to obtain RIM-RS resources corresponding to the gNB set ID in the RIM-RS transmission period T configured by the OAM through the indication of the following information domains contained in the gNB set ID having L bits long:

(1) Sequence Indication Information Domain

For example, it is a sequence indication information domain having $l_1$ bits long, specifically:

$l_1 = \lceil \log_2(N_s) \rceil$

Where, $\lceil \cdot \rceil$ is an upward rounding operation, and log is a logarithmic operation. The bit value corresponding to 1, bits indicates the RIM-RS sequence index to be transmitted by the gNB at each RIM-RS transmission opportunity corresponding to the gNB set ID.

As described above, in the embodiment of the present disclosure, the OAM can configure the two RIM-RS1s of the sequence domain to indicate "enough mitigation" or "not enough mitigation", respectively.

When the OAM does not configure the two RIM-RS1s of the sequence domain to indicate "enough mitigation" or "not enough mitigation", the bit value corresponding to the bit of the sequence indication information domain corresponds to the index of each available sequence in the set of available sequences, and is used for indicating each available sequence of the gNB corresponding to the gNB set ID on the transmission opportunities of the corresponding RIM-RS.

That is, the bit value corresponding to the $l_1=\lceil\log_2(N_s)\rceil$ bits is the index of one sequence of the set of available sequences with $N_s$ available sequences, e.g., $I_s=\{0, 1, \ldots, N_s-1\}$, indicating a sequence corresponding to the gNB set ID that the gNB can use at the corresponding RIM-RS transmission opportunities.

When the OAM does not configure the two RIM-RS1s of the sequence domain to indicate "enough mitigation" or "not enough mitigation", respectively, or when the sequence transmitted by the RIM-RS transmission opportunities is used for RIM-RS2, the bit value of the sequence indication information domain corresponds to the index in the set of available sequences of the sequence used at the corresponding RIM-RS transmission opportunities corresponding to the gNB set ID.

When the OAM configures the two RIM-RS1s of the sequence domain to indicate "enough mitigation" or "not enough mitigation", respectively, the bit value corresponding to the bit of the sequence indication information domain corresponds to the sequence index of each available sequence in the set of available sequences, wherein a half of the sequence index corresponding to the set of available sequences is used for indicating the RIM-RS "not enough mitigation", and the other half of the sequence index is used for indicating the RIM-RS "enough mitigation". As an example, the first half of the set of RIM-RS available sequences with Ns available sequences is used to indicate the RIM-RS1 "not enough mitigation", the second half is used to indicate the RIM-RS1 "enough mitigation", and vice versa. That is, when the sequence index in the available sequence corresponding to the bit value is in the first half of the sequence, that is, when it corresponds to $$I_s = \left\{0, 1, \ldots, \frac{N_s}{2}-1\right\},$$

the sequence used to indicate the gNB corresponding to the gNB set ID to transmit on the corresponding RIM-RS transmission opportunities is used to indicate the RIM-RS1 "not enough mitigation", while the sequence index in the available sequence corresponding to the bit value is in the second half of the sequence, that is, when it corresponds to $$I_s = \left\{\frac{N_s}{2}, \frac{N_s}{2}+1, \ldots, N_s-1\right\},$$

the sequence used to indicate the gNB corresponding to the gNB set ID to transmit on the corresponding RIM-RS transmission opportunities is used to indicate the RIM-RS1 "enough mitigation", and vice versa. At this time, the RIM-RS1 resources indicating "enough mitigation" or "not enough mitigation" can be configured for a gNB by configuring two gNB set IDs, respectively.

Alternatively, when the OAM configures the two RIM-RS1 of the sequence domain to indicate "enough mitigation" or "not enough mitigation", respectively, the bit value corresponding to the bit of the sequence indication information domain corresponds to the index of each pair of available sequences in the set of available sequences, which is used to indicate that the gNB corresponding to the gNB set ID indicates each pair of available sequences "enough mitigation" or "not enough mitigation", respectively, on the corresponding RIM-RS transmission opportunities. That is, the bit value corresponding to the $$\left\lceil\log_2\left(\frac{N_s}{2}\right)\right\rceil$$

bits among $l_1$ bits is the index of a pair of sequences in the set of available sequences with $N_s$ available sequences, for example $$I_s = \left\{0, 1, \ldots, \frac{N_s}{2}-1\right\},$$

indicating a pair of sequences corresponding to the gNB set ID that can be used by the gNB at the corresponding RIM-RS transmission opportunities to indicate "enough mitigation" or "not enough mitigation", while the OAM configures which sequence in each pair of sequences is used to indicate "enough mitigation", which is used to indicate "not enough mitigation", and the remaining $$\left\lceil\log_2\left(\frac{N_s}{2}\right)\right\rceil$$

states among $l_1$ states is reserved for unused.

(2) Time Indication Information Domain

For example, it is a time indication information domain having 12 bits long, specifically:

$$l_2 = \left\lceil\log_2\left(\frac{T_1 \times M_P}{(R_a+R_b)\times P} + \frac{T_2 \times M_P}{R_c \times P}\right)\right\rceil = \left\lceil\log_2\left(\frac{N_1 \times M_P}{(R_a+R_b)} + \frac{N_2 \times M_P}{R_c}\right)\right\rceil$$

Wherein, the bit value corresponding to the $l_2$ bits indicates the time domain location of each RIM-RS transmission opportunity in the RIM-RS transmission period T corresponding to the gNB set ID.

In another way, if a large total bit overhead can be provided, specifically:

$$l_2 = \left\lceil\log_2\left(\frac{N_1 \times M_P}{(R_a+R_b)}\right)\right\rceil + \left\lceil\log_2\left(\frac{N_2 \times M_P}{R_c}\right)\right\rceil$$

it can be segmented as:

$$l_{2\_RS1} = \left\lceil\log_2\left(\frac{N_1 \times M_P}{(R_a+R_b)}\right)\right\rceil$$

and $$l_{2\_RS2} = \left\lceil\log_2\left(\frac{N_2 \times M_P}{R_c}\right)\right\rceil.$$

The above two correspond to the time domain indications of RIM-RS1 and RIM-RS2 respectively, and the mapping rule is in the same way.

Specifically, in a feasible implementation, the time indication information domain corresponds to each RIM-RS transmission opportunity in the transmission period in which time domain location numbering is performed.

Briefly, for $$\frac{T \times M_p}{P} = N \times M_p$$

(N and M are integers) RIM-RS transmission opportunities in the RIM-RS transmission period T, the time domain sequence numbering is performed, for example, $I_o$ is $\{0, 1, \ldots, N \times M_p - 1\}$. Then, the first $$\frac{N_1 \times M_p}{(R_a + R_b)}$$

state values (Code Point or Code State) of the time indication information domain having $l_2$ bits long can indicate the time domain location number $I_{o_1}$, $= A_{l_2} \times (R_a + R_b)$ of the first transmission opportunity, in the RIM-RS transmission period T, among the consecutive $R_a + R_b$ RIM-RS1 transmission opportunities corresponding to the gNB set ID, where $A_{l_2}$, is one of the decimal values $$\left\{0, 1, \ldots, \frac{N_1 \times M_p}{(R_a + R_b)} - 1\right\}$$

corresponding to the first $$\frac{N_1 \times M_p}{(R_a + R_b)}$$

binary states of the time information domain having $l_2$ bits long, that is, the first $$\frac{N_1 \times M_p}{(R_a + R_b)}$$

state values indicate the corresponding transmission opportunity number in the RIM-RS1 time period $T_1$. Furthermore, the last $$\frac{N_2 \times M_p}{R_c}$$

state value of the time indication information domain having $l_2$ bits long can indicate the time domain location number $$I_o = N_1 \times M_P + \left(A_{l_2} - \frac{N_1 \times M_p}{(R_a + R_b)}\right) \times R_c$$

of the first transmission opportunity, in the RIM-RS transmission period T, among the consecutive $R_c$ RIM-RS2 transmission opportunities corresponding to the gNB set ID, where $A_{l_2}$ is one of the decimal values $$\left\{\frac{N_1 \times M_p}{(R_a + R_b)}, \frac{N_1 \times M_p}{(R_a + R_b)} + 1, \ldots, \frac{N_1 \times M_p}{(R_a + R_b)} + \frac{N_2 \times M_p}{R_c} - 1\right\}$$

corresponding to the binary state of the time information domain having $l_2$ bits long, that is, the last $$\frac{N_1 \times M_p}{(R_a + R_b)}$$

state values indicate the corresponding transmission opportunity number in the RIM-RS2 time period $T_2$.

Alternatively, in another feasible implementation, the time indication information domain corresponds to each RIM-RS transmission opportunity in the transmission period in which time domain numbering according to the time period allocation information.

Briefly, the RIM-RS transmission opportunities in the RIM-RS transmission period T is numbered in time domain according to the $T_1$ time period and the $T_2$ time period, respectively. $T_1$ includes $$\frac{T_1 \times M_p}{P} = N_1 \times M_p$$

RIM-RS1 transmission opportunities, with the number $I_{o_1}$ being $\{0, 1, \ldots, N_1 \times M_p - 1\}$; and $T_2$ includes $$\frac{T_2 \times M_p}{P} = N_2 \times M_p$$

RIM-RS2 transmission opportunities, with the number $I_{o_2}$ being $\{0, 1, \ldots, N_2 \times M_p - 1\}$. Then, the first $$\frac{N_1 \times M_p}{(R_a + R_b)}$$

state value of the time indication information domain having $l_2$ bits long can indicate the time domain location number $I_{o_1} = A_{l_2} \times (R_a + R_b)$ of the first transmission opportunity, in the RIM-RS transmission period T, among the consecutive $R_a + R_b$ RIM-RS1 transmission opportunities corresponding to the gNB set ID, where $A_{l_2}$ is one of the decimal values $$\left\{0, 1, \frac{N_1 \times M_p}{(R_a + R_b)} - 1\right\}$$

corresponding to the first $$\frac{N_1 \times M_p}{(R_a + R_b)}$$

binary state of the time information domain having $l_2$ bits long. In addition, the $$\frac{N_2 \times M_p}{R_c}$$

state values of the time indication information domain having $l_2$ bits long can indicate the time domain location number $$I_{o_2} = \left( A_{t_2} - \frac{N_1 \times M_p}{(R_a + R_b)} \right) \times R_c$$

of the first transmission opportunity, in the period T, among the consecutive $R_c$ RIM-RS2 transmission opportunities corresponding to the gNB set ID, where $A_{t_2}$ is one of the decimal values $$\left\{ \frac{N_1 \times M_p}{(R_a + R_b)}, \frac{N_1 \times M_p}{(R_a + R_b)} + 1, \ldots, \frac{N_1 \times M_p}{(R_a + R_b)} + \frac{N_2 \times M_p}{R_c} - 1 \right\}$$

corresponding to the binary state of the time information domain having $l_2$ bits long.

In the embodiment of the present disclosure, no matter which time domain numbering rule is adopted, the time indication information domain of the gNB set ID corresponding to each type of RIM-RS corresponds to each type of RIM-RS transmission opportunities in the transmission period. In brief, when a gNB needs to configure RIM-RS1 and RIM-RS2 at the same time, two gNB set IDs can be allocated to notify the gNB of the configuration information of RIM-RS1 and RIM-RS2 thereof, respectively. For example, the transmission opportunities indicated by the status value of a time indication information domain of a gNB set ID is within the RIM-RS1 time period $T_1$, while the transmission opportunities indicated by the state value of the time indication information domain of the other gNB set ID is within the RIM-RS2 time period $T_2$, so that the RIM-RS transmission opportunities corresponding to the two gNB set IDs can be distinguished for RIM-RS1 and RIM-RS2, respectively.

(3) Frequency Domain Indication Information Domain

For example, it is a frequency domain indication information domain having $l_3$ bits long, specifically:

$$l_3 = \lceil \log_2(N_f) \rceil$$

The bit value corresponding to the $l_3$ bits indicates which of the frequency domain transmission locations configured by the OAM is the RIM-RS that the gNB should transmit when the gNB set ID corresponds to each RIM-RS transmission opportunity.

In the embodiment of the present disclosure, the frequency domain indication information domain corresponds to the index of the frequency domain location of the gNB set ID. As an example, the OAM configures $N_f$ frequency domain locations and numbers according to the frequency domain locations, where the frequency domain indication information domain having $l_3$ bits long indicates the frequency domain location index corresponding to the gNB set ID, for example, $I_f = \{0, 1, \ldots, N_f - 1\}$, in practical disclosure, when $N_f = 1$, the frequency domain indication information domain defaults.

In the embodiment of the present disclosure, the locations in the L bits corresponding to each information domain may be predefined, for example, each information domain corresponds to the locations in the bits of the gNB set ID in any of the following sequences:

(1) mapping a sequence indication information domain, a time indication information domain and a frequency domain indication information domain in sequence starting from the least significant bit (LSB) of the gNB set ID. That is, as shown in FIG. 3A, each information domain is sequentially mapped into the sequence indication information domain having $l_1$ bits long, the time indication information domain having $l_2$ bits long, and the frequency domain indication information domain having $l_3$ bits long starting from the LSB of the L-bit gNB set ID.

(2) mapping a sequence indication information domain, a time indication information domain and a frequency domain indication information domain in sequence starting from the most significant bit (MSB) of the gNB set ID. That is, as shown in FIG. 3B, each information domain is sequentially mapped into the sequence indicating information domain having $l_1$ bits long, the time indicating information domain having $l_2$ bits long, and the frequency indicating information domain having $l_3$ bits long starting from the MSB of the L-bit gNB set ID having L bits long.

Figure 3A:
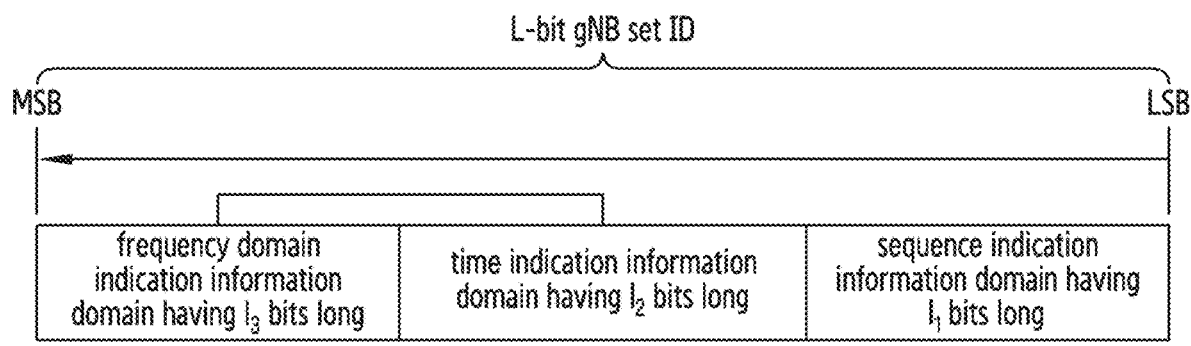
FIG. 3A is a first schematic diagram of each information domain in a gNB set ID according to an embodiment of the present disclosure.
Figure 3B:
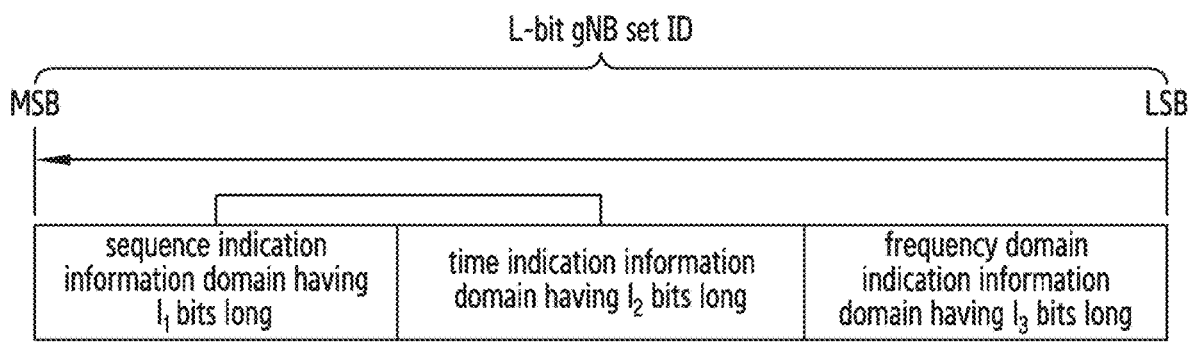
FIG. 3B is a second schematic diagram of each information domain in a gNB set ID according to an embodiment of the present disclosure.

(3) those skilled in the art will understand that FIGS. 3A and 3B are only examples and should not be construed as limiting the present disclosure. In practical disclosure, appropriate changes based on these examples can also be applied to this disclosure, so it should also be included in the protection scope of this disclosure. For example, the mutual order of each information domain can be predefined in any combination.

In the following, an embodiment employing the method of the present disclosure will be described with reference to FIG. 4. In this embodiment, the TDD network is configured with RIM-RS1 and RIM-RS2 for remote interference management.

However, RIM-RS1 for "remote gNB interference detection" and RIM-RS1 for "near gNB interference detection" are not configured, and only one RIM-RS1 transmission location is configured, i.e., RIM-RS with near/remote function is not distinguished. The OAM-configured information is as follows:

(1) the network configures to adopt a single DL-UL pattern period, and the configured single DL-UL pattern period P=10 ms (ms is milliseconds).

(2) the network configures that the length of the RIM-RS transmission period T includes 8192 UL and DL pattern periods, i.e., T=n×p=81920 ms. The single DL-UL pattern period P includes $M_p$=1 DL-UL switching point, then RIM-RS transmission period T includes $$\frac{T \times M_p}{P} = 8192$$

RIM-RS transmission opportunities.

(3) the network configures the first $T_1 = N_1 \times P = 61440$ ms time period of RIM-RS transmission period T to be used for RIM-RS1 and the remaining $T_2 = N_2 \times P = 20480$ ms time period to be used for RIM-RS2, so there are 6144 RIM-RS1 transmission opportunities at $T_1$ time period, 2048 RIM-RS2 transmission opportunities at $T_2$ time period, the 10 ms DL-UL pattern switching period is one transmission opportunity, and the sequence number $I_o$ of 8192 transmission opportunities in the RIM-RS transmission period T is {0~8191}.

(4) the network configures the location of the transmitting symbol of the RIM-RS is the last two DL symbols in the DL-UL pattern switching period.

(5) the network configures number ($R_a$=2) of repetitions of the RIM-RS1 for "near gNB interference detection" and number ($R_c$=2) of repetitions of the RIM-RS2.

Since the RIM-RS1 for "remote gNB interference detection" is not configured, repetition number $R_b$ defaults.

(6) the number of frequency domain resources ($N_f$=1).

(7) Each RIM-RS transmission opportunities has a set of RIM-RS available sequences containing $N_s$=8 available sequences, and 8 available sequences in the set of available sequences are sorted. The OAM configures that the RIM-RS1 in sequence domain to indicate the function of "enough mitigation" or "not enough mitigation", the sequences of the set of available sequences is divided into two parts, where the first half of the sequence set is used as the RIM-RS1 indicating "not enough mitigation", i.e. the first four sequences, and the other half is used as RIM-RS1 indicating "enough mitigation", i.e. the last four sequences.

Based on the above information, the gNB can determine that the gNB set ID is configured to have L=15 bits, and the mapping rule between the 15-bit gNB set ID and the RIM-RS configuration resources is as follows:

The length of the sequence indication information domain is $l_1=\lceil \log_2(N_s) \rceil$=3 bits. These 3 bits are the lowest three bits of the 15-bit gNB set ID, as shown in FIG. 4. The 3-bit value indicates the index corresponding to the set of eight available sequences configured. When the sequence transmitted by the RIM-RS transmission opportunities is used for RIM-RS1, the first four sequences, ie., $I_s$={0, 1, 2, 3}, can be used as the RIM-RS1 for "not enough mitigation", the last four sequences, ie., $I_s$={4, 5, 6, 7}, can be used as the RIM-RS1 for "enough mitigation". The gNB can judge whether RIM-RS1 resources are used to indicate "not enough mitigation" or "enough mitigation" by locating the sequence corresponding to gNB set ID in the first 4 sequences or the last 4 sequences in the set of available sequences. When the sequence transmitted at the RIM-RS transmission opportunities is used for RIM-RS2, the 3-bit value indicates one sequence index in the set of eight available sequences, ie., $I_s$={0, 1, . . . , 7}.

The length of the time indication information domain is $$l_2 = \left\lceil \log_2\left(\frac{N_1 \times M_p}{(R_a + R_b)} + \frac{N_2 \times M_p}{R_c}\right)\right\rceil = 12 \text{ bits.}$$

Figure 4:
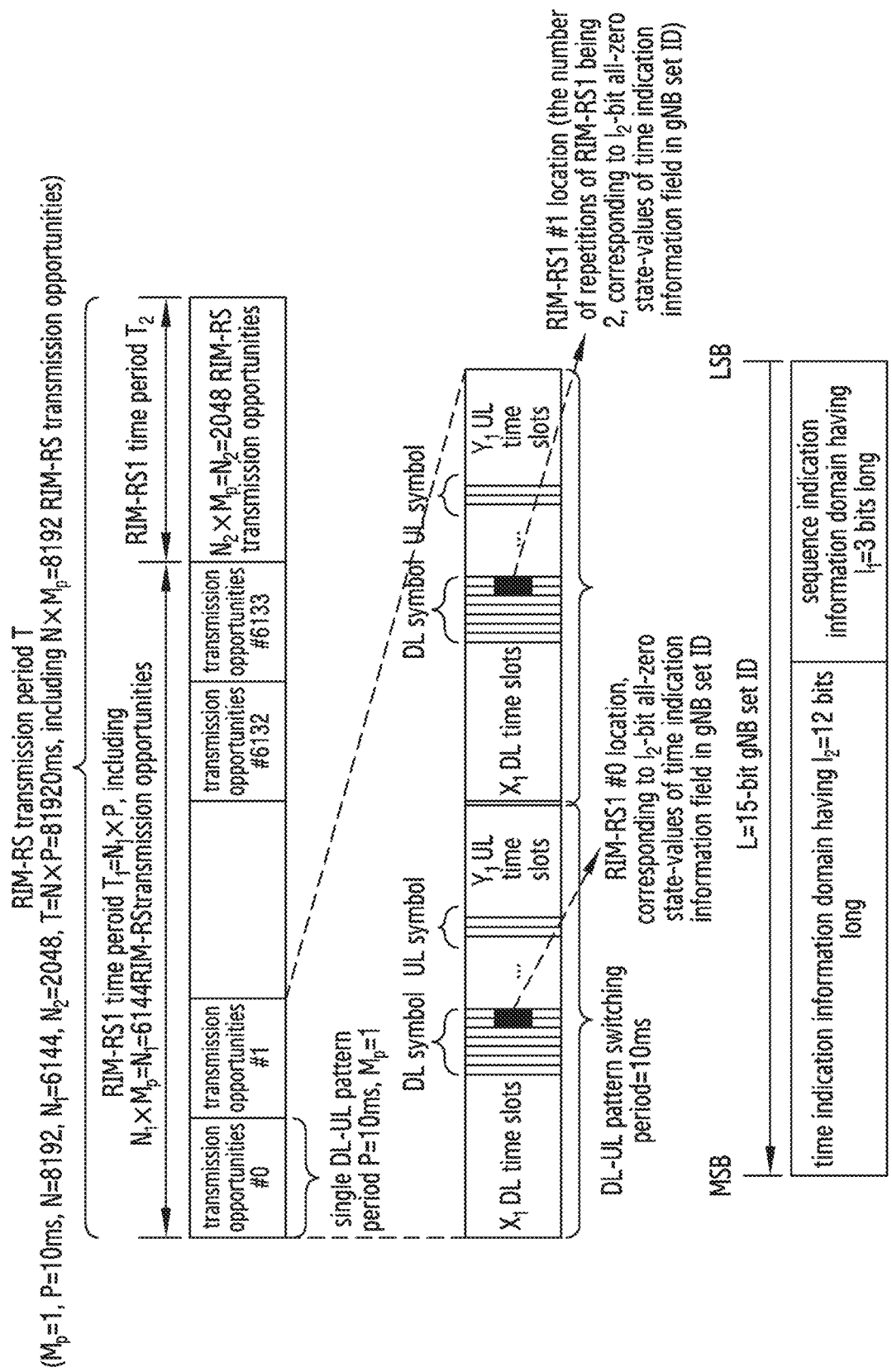
FIG. 4 is a first schematic diagram of a mapping relationship between a gNB set ID and a RIM-RS according to an embodiment of the present disclosure.

These 12 bits are the upper 12 bits of the 15-bit gNB set ID, as shown in FIG. 4. The 12-bit first $$\frac{N_1 \times M_p}{(R_a + R_b)} = 9072$$

state values indicate number $I_o=A_{l_2} \times 2$ of the first transmission opportunity, in the RIM-RS transmission period T, among the two consecutive RIM-RS1 transmission opportunities (the number of repetitions is 2) corresponding to the gNB set ID, where $A_{l_2}$ is one of the decimal values {0, 1, . . . , 9071} corresponding to the first 9072 binary states in the time information domain having $l_2$ bits long. For example, the state value 000000000000 indicates the transmission opportunities are locations 0 and 1. Similarly, other $$\frac{N_2 \times M_p}{R_c} = 1024$$

state values indicate that the number $I_o=6144+(A_{l_2}-9072) \times 2$ of the first transmission opportunity, in the RIM-RS transmission period T, among the two consecutive RIM-RS1 transmission opportunities corresponding to the gNB set ID, where $A_{l_2}$ is one of the decimal values {9072, 9073, . . . , 4095} corresponding to the binary state in the time information domain having $l_2$ bits long.

The length of the frequency domain indication information domain is $l_3\lceil \log_2(N_f) \rceil$=0, there is only one frequency domain location, no bit information is needed, and it defaults.

From the above example, according to the determined mapping rule, the gNB can obtain RIM-RS resource information corresponding to the gNB set ID through the gNB set ID, such as time domain, frequency domain and sequence domain information, etc. at the same time, whether the RIM-RS configuration is used for RIM-RS1 or RIM-RS2 can be obtained through the time indication information domain state value in the gNB set ID. Similarly, the gNB Set ID can be reversely deduced through the detected time domain, the frequency domain and the sequence domain information of the RIM-RS so as to realize reporting of the gNB set ID. It can also be seen from FIG. 4 that the OAM can configure a specific RIM-RS to be located at a specific symbol level location in the UL-DL conversion cycle. The symbol level location can be configured, but the mapping rules between the gNB set ID and the RIM-RS configuration will not be affected, i.e. the network OAM separately does not bind RIM-RS symbol locations to gNB set ID in each DL-UL pattern conversion cycle. In FIG. 4, the RIM-RS occupying the last two down-down symbol locations in the DL-UL pattern conversion cycle will not affect the mapping relationship between the above-mentioned gNB set ID and the RIM-RS resource configuration.

Another embodiment employing the method of the present disclosure will be described below with reference to FIG. 5. in this embodiment, the TDD network configures the RIM-RS1 and the RIM-RS2 to be used for remote interference management. The same gNB is configured with a RIM-RS1 for "remote gNB interference detection" and a RIM-RS1 for "near gNB interference detection", that is, two RIM-RS1 transmission locations are configured to distinguish near/remote functions. The OAM-configured information is as follows:

(1) the network configures to adopt a cascaded DL-UL pattern period, and the configured cascaded DL-UL pattern period P=10 ms (ms is milliseconds). The cascaded DL-UL pattern period P is formed by concatenating $M_p$=2 DL-UL patterns, including 2 DL-UL switching points and the respective switching periods $p_n$ of the two DL-UL patterns are 5 ms, i.e., $p=\Sigma_{n=0}^{M_p} p_n$=10 ms.

(2) the network configures that the length of the RIM-RS transmission period T is 32768 cascaded UL-DL pattern periods, i.e., T=N×P=327680 ms. The cascaded DL-UL pattern period P includes $M_p$=2 DL-UL switching points, then the RIM-RS transmission period T includes $$\frac{T \times M_p}{P} = 65536$$

RIM-RS transmission opportunities.

(3) the network configures the first $T_1=N_1 \times P$=245760 ms time period of RIM-RS transmission period T to be used for RIM-RS1 and the remaining $T_2=N_2 \times P=81920$ ms time period to be used for RIM-RS2, so the $T_1$ time period includes $N_1 \times M_p=49152$ RIM-RS transmission opportunities, $T_2$ time period includes $N_2 \times M_p=16384$ RIM-RS transmission opportunities, there are two RIM-RS transmission opportunities for each 10 ms cascaded DL-UL pattern, and the sequence number $I_o$ of 65536 transmission opportunities in the period T is {0~65535}.

(4) the network configures the transmission symbol locations of the RIM-RS to be at the last two DL symbols in the DL-UL pattern 1 switching period and the last two symbols of the last complete DL time slot in the cascaded DL-UL pattern 2 switching period.

(5) the network configures the number of repetitions of the RIM-RS1 for "near gNB interference detection" ($R_a$=1) and the number of repetitions of the RIM-RS1 for "remote gNB interference detection" ($R_b$=1), and the number of repetitions of the RIM-RS2 ($R_c$=2). The number of repetitions of the RIM-RS2 is 2, i.e., the RIM-RS2 is transmitted twice at two RIM-RS transmission opportunities corresponding to two consecutive DL-UL switching periods in the cascaded DL-UL pattern.

(6) the number of frequency domain resources ($N_f$=2). Two common frequency domain reference starting point locations are configured. and all gNBs know how RIM-RS maps to the frequency domain and the common reference starting point numbers are 0 and 1.

(7) each RIM-RS transmission opportunities has a set of RIM-RS available sequences containing $N_s$=8 available sequences, and eight available sequences in the set of available sequences are sorted. The OAM does not configure that the RIM-RS1 of the sequence domain can indicate the function of "enough mitigation" or "not enough mitigation".

Based on the above information, the gNB can determine that the gNB set ID is configured to have L=19 bits, and the mapping rule between the 19-bit gNB set ID and the RIM-RS configuration resources is as follows:

The length of the sequence indication information domain is $l_1 = \lceil \log_2(N_s) \rceil = 3$ bits. These 3 bits are the lowest 3 bits of the 19-bit gNB set ID, indicating the index of one of the configured eight sets of available sequences, as shown in FIG. 5. When the sequence transmitted at the RIM-RS transmission opportunities is used for RIM-RS1 or RIM-RS2, the 3-bit value indicates one sequence index of eight available sequences, ie., $I_s$={0, 1, . . . , 7}.

The length of the time indication information domain is $$l_2 = \left\lceil \log_2 \left( \frac{N_1 \times M_p}{(R_a + R_b)} + \frac{N_2 \times M_p}{R_c} \right) \right\rceil = 15 \text{ bits.}$$

Figure 5:
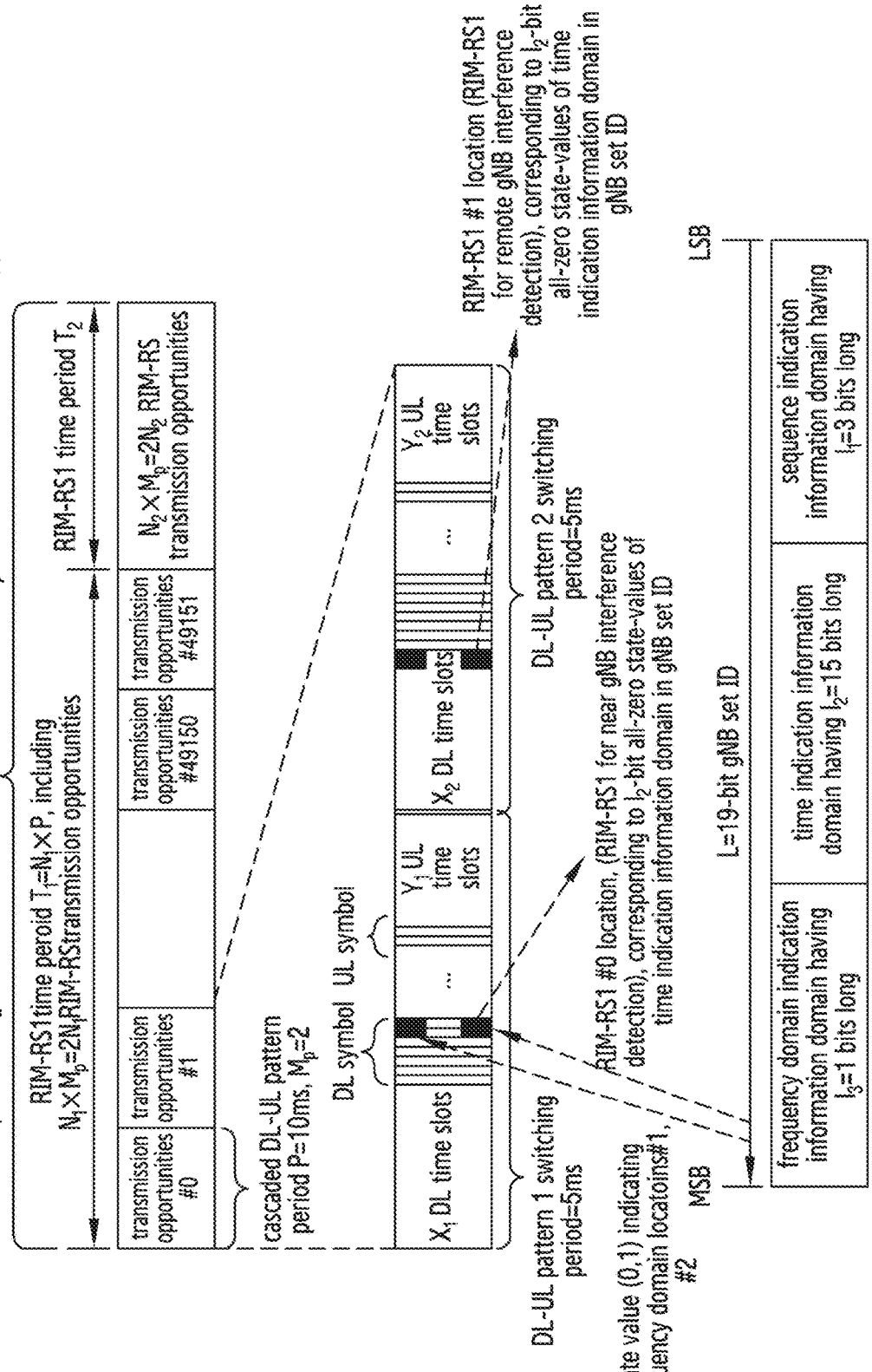
FIG. 5 is a second schematic diagram of a mapping relationship between a gNB set ID and a RIM-RS according to an embodiment of the present disclosure.

These 15 bits are the $4^{th}$ to $18^{th}$ bits of the 19-bit gNB set ID from the lowest bit, as shown in FIG. 5. The 15-bit $$\frac{N_1 \times M_p}{(R_a + R_b)} = 24576$$

state value indicates the number $I_o = A_{l_2} \times 2$ of the first transmission opportunity, in the RIM-RS transmission period T, among the two consecutive RIM-RS1 transmission opportunities (one transmission opportunity being RIM-RS1 for "near gNB interference detection" and another transmission opportunity being RIM-RS1 for "remote gNB interference detection") corresponding to the gNB set ID, where $A_{l_2}$ is one of the decimal values {0, 1, . . . , 24575} corresponding to the first 24576 binary states in the time information domain having $l_2$ bits long. For example, the state value of 000000000000000 indicates the transmission opportunities are locations 0 and 1. Similarly, other $$\frac{N_2 \times M_p}{R_c} = 8192$$

state values indicate that the number $I_o=49152+(A_{l_2}-24576) \times 2$ of the first transmission opportunity, in the RIM-RS transmission period T, among the two consecutive RIM-RS1 transmission opportunities corresponding to the gNB set ID, where $A_{l_2}$ is one of the decimal values {24576, 24577, . . . , 32767} corresponding to the binary state in the time information domain having $l_2$ bits long.

The length of the frequency domain indication information domain is $l_3 = \lceil \log_2(N_f) \rceil = 1$, which is the 19th bit from the lowest bit of the 19-bit gNB set ID, i.e. the highest bit. The 1-bit state value respectively corresponds to the index of the two configured frequency domain locations, i.e. the common frequency domain reference point number.

From the above example, according to the determined mapping rule, the gNB can obtain RIM-RS resource information corresponding to the gNB set ID through the gNB set ID, such as time domain, frequency domain and sequence domain information, etc. at the same time, whether the RIM-RS configuration is used for RIM-RS1 or RIM-RS2 can be obtained through the time indication information domain state value in the gNB set ID. Similarly, the gNB Set ID can be reversely deduced through the detected time domain, the frequency domain and the sequence domain information of the RIM-RS so as to realize reporting of the gNB set ID. It can also be seen from FIG. 5 that the OAM can configure a specific RIM-RS to be located at a specific symbol level location in the UL-DL conversion cycle. The symbol level location can be configured, but the mapping rules between the gNB set ID and the RIM-RS configuration will not be affected, i.e., the network OAM separately does not bind RIM-RS symbol locations to gNB set ID in each DL-UL pattern conversion cycle. In FIG. 5, the RIM-RS configures two symbol level locations, which are respectively used for RIM-RS1 for "near gNB interference detection" and RIM-RS1 for "remote gNB interference detection".

In the embodiment of the present disclosure, regarding the RIM-RS sequence configuration, it can further include configuring $N_s$ available sequences on each RIM-RS transmission opportunity in the following possible ways. Specifically, the initial state seed of the sequence in each transmission period is changed according to time or transmission opportunities based on the initial state of the initial state seed.

In a feasible implementation, the RIM-RS sequence is a Gold sequence. The initial state $c_{init}{}^{n_s}$ of the Gold sequence is configured by the OAM. Wherein, $c_{init}{}^{n_s}$ is the initial state seed of the $n_s{}^{th}$ sequence.

In the embodiment of the present disclosure, the initial state seed is changed according to time based on the initial state, and the possible change modes are as follows:

Counting the DL-UL pattern period according to a predetermined change step length and the maximum change length of an initial state seed, wherein the initial state seed changes according to the counting result and the initial state.

Specifically, the OAM configures an initial state of a sequence initial state seed $c_{init}^{n_s}$ in a RIM-RS transmission period, and the initial state seed $c_{init}^{n_s}$ changes according to a single DL-UL pattern period P or a cascaded DL-UL pattern period P configured by the OAM in a RIM-RS transmission period. Specifically, the single DL-UL pattern period P or the cascaded DL-UL pattern period P in the RIM-RS transmission period is counted, and $c_{init\_p}^{n_s}$ of the $P^{th}$ single DL-UL pattern period P or the cascaded DL-UL pattern period P is expressed as:

$$c_{init\_p}^{n_s} = c_{init}^{n_s} + \mathrm{mod}(p\Delta_c, M)$$

Wherein, $\Delta_c$ is the change step size configured by the OAM or preset, and M is the maximum change length of each sequence initial state, and can be determined by the interval between two adjacent sequence initial states.

For each RIM-RS transmission period, the initial state of the sequence is reset to $c_{init}^{n_s}$, and count of the single DL-UL pattern period P or the cascaded DL-UL pattern period P is restarted.

For the case where the number of RIM-RS repetitions is configured, the sequence initial state seeds of different single DL-UL pattern periods P or cascaded DL-UL pattern periods P can still be determined in the above way. In another way, the following rules can be adopted for counting the DL-UL pattern period: If the RIM-RS in the current DL-UL pattern period is still the RIM-RS in the previous DL-UL pattern period, the count of the DL-UL pattern period remains unchanged, based on the number of repetitions of the RIM-RS. Otherwise, the count of the DL-UL pattern period is incremented by one.

Briefly, if the RIM-RS in the current DL-UL pattern period is still repeating the RIM-RS in the previous DL-UL pattern period, the count P for the DL-UL pattern period remains unchanged, otherwise the count P for the DL-UL pattern period is incremented by one.

In the embodiment of the present disclosure, the initial state seed is changed according to the transmission opportunities based on the initial state, and the possible change modes are as follows:

According to the preset change step length and the maximum change length of the initial state seed, counting the RIM-RS transmission opportunities, and the initial state seed changes according to the counting result and the initial state.

Specifically, the OAM configures an initial state of a sequence initial state seed $c_{init}^{n_s}$ in a RIM-RS transmission period, and the initial state seed $c_{init}^{n_s}$ changes according to the RIM-RS transmission opportunities. Specifically, a first counter is defined to count the RIM-RS transmission opportunities in each RIM-RS transmission period, and the initial state seed $c_{init\_n}^{n_s}$ of the $n^{th}$ RIM-RS transmission opportunity is computed as:

$$c_{init\_n}^{n_s} = c_{init}^{n_s} + \mathrm{mod}(n\Delta_c, M)$$

Wherein, $\Delta_c$ is the change step size configured by the OAM or preset, and M is the maximum change length of each sequence initial state, and can be determined by the interval between two adjacent sequence initial states.

For each RIM-RS transmission period, the initial state of the sequence is reset to $c_{init}^{n_s}$, and count of the RIM-RS transmission opportunities is restarted.

For the case where the repeated RIM-RS is configured, another change modes of the initial state seed is: A second counter is defined to count the RIM-RS transmission opportunities repeated by the RIM-RS through a preset counter (i.e., the second counter) based on the repetition times of the RIM-RS to obtain a second counting result. When the second counting result is zero, the count of the RIM-RS transmission opportunities is increased by one. Otherwise, the count of the RIM-RS transmission opportunities remains unchanged.

Briefly, the repetitions of the RIM-RS transmission opportunities are counted in the range of $0 \sim R_x$, $x \in \{a, b, c\}$. When the count is reset to 0, the count of the first counter is incremented by one, otherwise the count of the first counter is unchanged.

Figure 6:
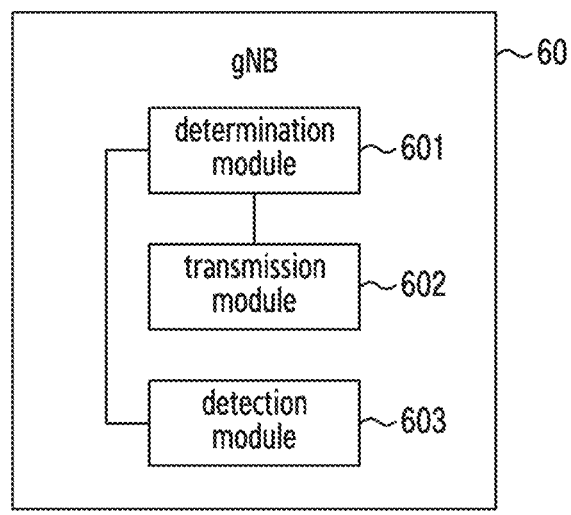
FIG. 6 is a schematic structural diagram of a gNB according to an embodiment of the present disclosure.

The embodiment of the present disclosure also provides a gNB. as shown in FIG. 6, the gNB may include: a determination module 601, a transmission module 602 and/or a detection module 603, wherein, the determining module 601 is configured to determine a mapping relationship between a gNB set ID and a RIM-RS according to received configuration information;

the transmission module 602 is configured to transmit the RIM-RS according to the allocated gNB set ID and the mapping relationship;

the detection module 603 is configured to perform RIM-RS detection, determine gNB set ID information through the detected RIM-RS according to the mapping relationship, and report the determined gNB set ID information.

In an alternative implementation, the configuration information includes at least one of the following:

DL-UL pattern period;

transmission period of RIM-RS;

time period allocation information of each type of RIM-RS in the transmission period of the RIM-RS;

the number of repetitions of each type of RIM-RS;

the number of frequency domain resources of RIM-RS;

a set of available sequences on transmission opportunities of each RIM-RS.

In an alternative implementation, the type of RIM-RS includes at least one of the following:

RIM-RS for remote gNB interference detection;

RIM-RS for near gNB interference detection;

RIM-RS for indicating whether remote interference still exists.

In an alternative implementation, the number of repetitions of the RIM-RS for remote gNB interference detection is the same as the number of repetitions of the RIM-RS for near gNB interference detection.

In an alternative implementation, the time period allocation information of each type of RIM-RS in the transmission period of the RIM-RS is: The transmission period T of the RIM-RS includes two time periods, the former time period being the RIM-RS time period $T_1$ for interference detection and the latter time period being the RIM-RS time period $T_2$ for indicating whether the remote interference still exists, wherein $T=T_1+T_2$.

In an alternative implementation mode, the transmission module 602 is specifically configured to obtain the RIM-RS resource information in the transmission period corresponding to the gNB set ID according to the gNB set ID and the mapping relationship; and the transmission module 602 is specifically configured to transmit the RIM-RS on the resources corresponding to the RIM-RS resource information according to the transmission period.

In an alternative implementation, the transmission module 602 is specifically configured to obtain the RIM-RS resource information in the transmission period corresponding to the gNB set ID according to the mapping relationship based on the indication of at least one of the following information domains contained in the gNB set ID:
  sequence indication information domain;
  time indication information domain; and
  frequency domain indication information domain.

In an alternative implementation, each information domain corresponds to a location in a bit of a gNB set ID in any of the following order:
  mapping a sequence indication information domain, a time indication information domain and a frequency domain indication information domain in sequence starting from the LSB of the gNB set ID;
  mapping a sequence indication information domain, a time indication information domain and a frequency domain indication information domain in sequence starting from the MSB of the gNB set ID.

In an alternative implementation, the time indication information domain corresponds to each RIM-RS transmission opportunity in the transmission period in which time domain location numbering is performed; or
  the time indication information domain corresponds to each RIM-RS transmission opportunity in the transmission period in which time domain numbering according to the time period allocation information; or
  the time indication information domain of the gNB set ID corresponding to each type of RIM-RS corresponds to each type of RIM-RS transmission opportunities in the transmission period.

In an alternative implementation, the bit value corresponding to the bit of the sequence indication information domain corresponds to the index of each available sequence in the set of available sequences, and is used for indicating each available sequence of the gNB corresponding to the gNB set ID on the transmission opportunities of the corresponding RIM-RS.

In an alternative implementation, the type of RIM-RS also includes at least one of the following:
  RIM-RS indicating not enough mitigation;
  RIM-RS indicating enough mitigation;
  the bit value corresponding to the bit of the sequence indication information domain corresponds to the sequence index of each available sequence in the set of available sequences, wherein a half of the sequence index corresponding to the set of available sequences is used for indicating the RIM-RS "not enough mitigation", and the other half of the sequence index is used for indicating the RIM-RS "enough mitigation"; or
  the bit value corresponding to the bit of the sequence indication information domain corresponds to the index of each pair of available sequences in the set of available sequences, which is used to indicate that the gNB corresponding to the gNB set ID indicates each pair of available sequences "enough mitigation" or "not enough mitigation", respectively, on the corresponding RIM-RS transmission opportunities.

In an alternative implementation, the frequency domain indication information domain corresponds to the index of the frequency domain location of the gNB set ID.

In an alternative implementation, the initial state seed of the sequence in each transmission period is changed according to time or transmission opportunities based on the initial state of the initial state seed.

In an alternative implementation, the initial state seed changes according to time based on the initial state, including:
  counting the DL-UL pattern period according to a predetermined change step length and the maximum change length of an initial state seed, wherein the initial state seed changes according to the counting result and the initial state.

In an alternative implementation, counting the DL-UL pattern period includes:
  If the RIM-RS in the current DL-UL pattern period is still the RIM-RS in the previous DL-UL pattern period, the count of the DL-UL pattern period remains unchanged, based on the number of repetitions of the RIM-RS.
  Otherwise, the count of the DL-UL pattern period is incremented by one.

In an alternative implementation, the initial state seed is changed according to the transmission opportunities based on the initial state, including:
  counting the RIM-RS transmission opportunities, according to the preset change step length and the maximum change length of the initial state seed, wherein the initial state seed changes according to the counting result and the initial state.

In an alternative implementation, counting the RIM-RS transmission opportunities includes:
  counting the RIM-RS transmission opportunities repeated by the RIM-RS through a preset counter based on the repetition times of the RIM-RS to obtain a second counting result;
  the count of the RIM-RS transmission opportunities is increased by one when the second counting result is zero;
  otherwise, the count of the RIM-RS transmission opportunities remains unchanged.

Figure 7:
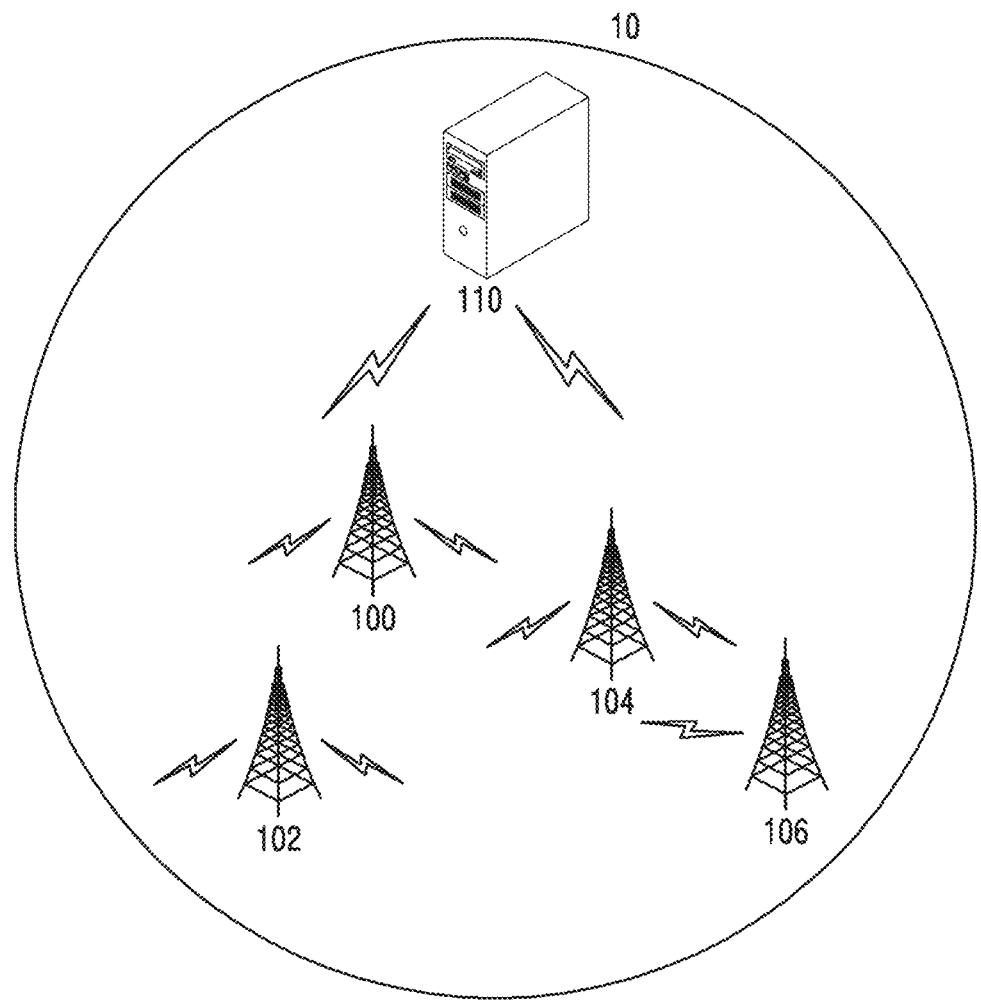
FIG. 7 is a schematic diagram illustrating a wireless communication system according to an embodiment of the present disclosure.

FIG. 7 is a schematic diagram illustrating a wireless communication system according to an embodiment of the present disclosure. All embodiments described below can be applied to a wireless cellular communication system as shown in FIG. 7. FIG. 7 includes several base stations 100, 102, 104, and 106, and (optionally) a management center (e.g., OAM) 710 that manages these base stations. Among them, each of the base stations 700, 702, 704, 706 may be interfered by other base stations. Although only four base stations are shown, there may be more or fewer base stations. Although one OAM is shown, there may be no OAM, or there may be more OAMs. Hereinafter, description is given of an example in which an OAM serves as the management center, but the management center is not limited to OAM.

Next, a method of performing interference coordination when a first base station is subjected to interference from an interfering base station (hereinafter also referred to as a "second base station") will be described with reference to FIG. 8. Herein, the number of interfering base stations may be one or more. The following description is given by taking one single interfering base station as an example. When there are multiple interfering base stations, the following steps may be repeatedly and sequentially performed on the multiple interfering base stations, so that inter-cell interference measurement as described in the present disclosure may be sequentially performed on the multiple interfering base stations.

Figure 8:
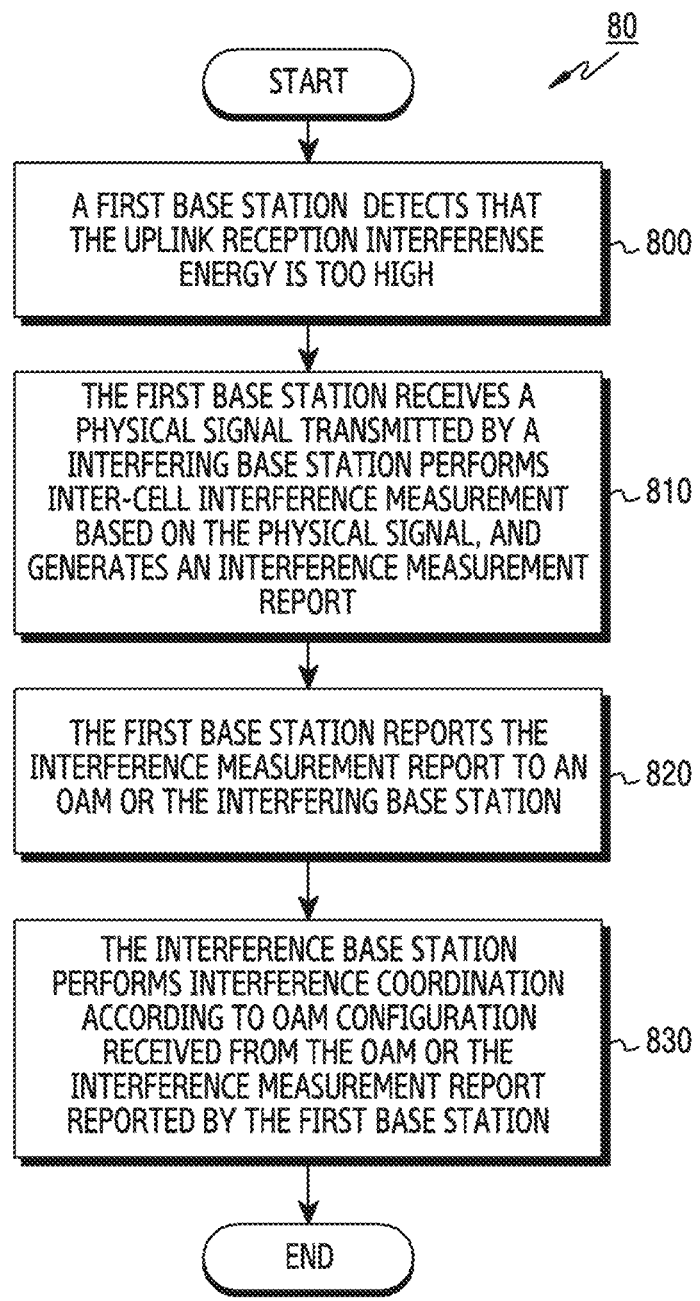
FIG. 8 is a flowchart illustrating an interference coordination method according to an embodiment of the present disclosure.

FIG. 8 illustrates a method 80 for performing interference coordination according to an embodiment of the present disclosure.

In step 800, the first base station may determine that detected energy of interference with uplink reception from the interfering base station is too high, thereby triggering an interference measurement operation. A condition for the first base station to judge that the energy of interference with uplink reception is too high may be that the interference energy is higher than a threshold. Specifically, the threshold may be set by the base station itself or configured by the OAM. When the first base station detects that the energy of interference with uplink reception is too high, the first base station may report to the OAM to trigger the OAM to perform inter-base station interference measurement related configuration. It should be noted that, the aforementioned operation that the first base station reports to the OAM is not necessary, and the OAM may directly configure inter-base station interference measurement related configuration parameters for the first base station and the interfering base station within its management area. The first base station may perform the subsequent interference coordination only when the energy of interference with uplink reception is too high, otherwise, the first base station may not perform the subsequent interference coordination, so as to avoid additional overhead caused by the interference coordination operation.

Of course, the triggering conditions for the first base station to start the inter-cell interference measurement operation are not limited to the above conditions, and the first base station may perform the inter-cell interference measurement operation periodically or a periodically without triggering conditions. That is, step 800 is not necessary.

In step 810, the first base station may receive a physical signal transmitted by the interfering base station, perform inter-cell interference measurement based on the physical signal, and generate an interference measurement report. Herein, the number of interfering base stations may be one or more. As mentioned before, when there are multiple interfering base stations, the following steps may be repeatedly and sequentially performed on the multiple interfering base stations, so that the inter-cell interference measurement as described in the present disclosure may be performed for the multiple interfering base stations sequentially. Specifically, a way that the first base station identifies interfering base stations and sequentially performs inter-cell interference measurement according to a result of the identification may be that: the first base station receives a unique cell identity (cell ID) list of cells to which the interfering base stations belong from the OAM; or the first base station acquires the Cell IDs of the cells to which the interfering base stations belong through cell search. Thus, inter-cell interference measurement for each cell is sequentially performed according to multiple cell IDs of the identified plurality of interfering base stations. In addition, the first base station may also identify base stations that cause strong interference with uplink reception of the first base station based on the Cell ID of a cell in which the first base station is located, for example, a cell the difference between whose Cell ID and that of the cell in which the first base station is located is not greater than N, herein, N may be set by the first base station itself or configured by the OAM.

In step 820, the first base station reports the interference measurement report to the OAM or the interfering base station. Specifically, the way for the first base station to report the interference measurement result may be that: the first base station reports the interference measurement result to the OAM through a backhaul link; or the first base station reports the interference measurement result to the interfering base station through an access link. Of course, ways for reporting the interference measurement result are not limited thereto, and the first base station may report the interference measurement report to multiple entities in the wireless network in various ways.

In step 830, the interfering base station performs interference coordination according to OAM configuration received from the OAM or the interference measurement report reported to the interfering base station by the first base station.

Figure 9:
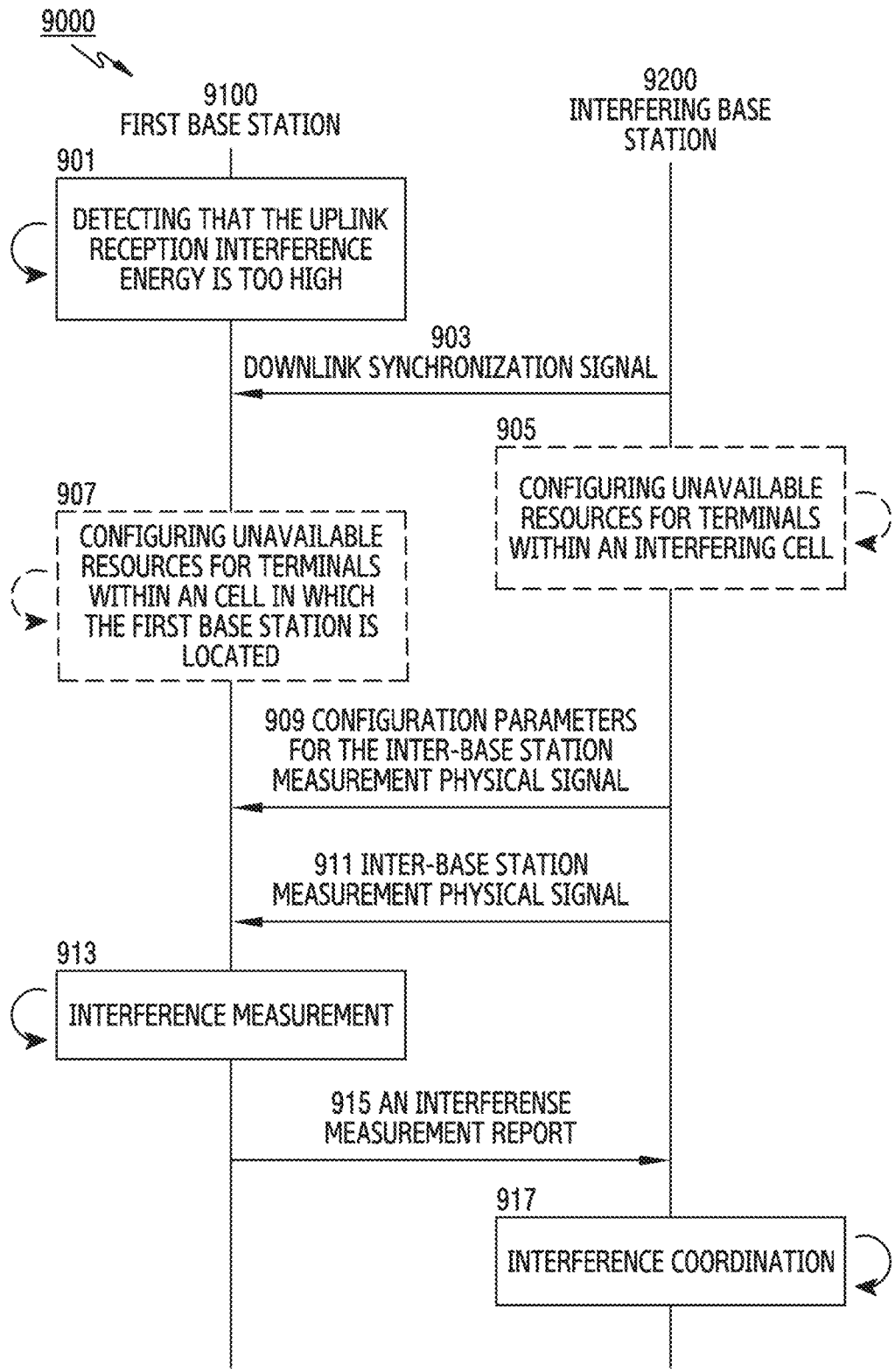
FIG. 9 is a flowchart illustrating an interference coordination method according to an embodiment of the present disclosure.

The method shown in FIG. 8 will be described in more detail below in conjunction with FIG. 9. FIG. 9 is a flowchart illustrating an interference coordination method 9000 jointly performed by a first base station 9100 and an interfering base station 9200 according to an embodiment of the present disclosure.

The interference coordination method shown in FIG. 9 is a beam-based interference coordination method. Herein, a number of the interfering base stations 9200 of the first base station 9100 may be one or more. The following description will be given by taking one single interfering base station 9200 as an example. When there are multiple interfering base stations, the steps described in the method may be repeatedly and sequentially performed, so that inter-cell interference measurement may be sequentially performed on the multiple interfering base stations.

In step 901, the first base station 9100 determines that detected energy of interference with uplink reception from the interfering base station is too high. Step 901 is the same as step 810 and will not be described repeatedly.

In step 903, the first base station 9100 receives a downlink synchronization signal transmitted by the interfering base station 9200, acquires a Cell ID of a cell to which the interfering base station 9200 belongs (referred to as an interfering cell for short), and completes downlink synchronization with the interfering cell; or, the first base station acquires the Cell ID of the interfering cell according to a neighboring cell Cell ID list configured by the OAM, receives the downlink synchronization signal of the interfering cell, and completes the downlink synchronization with the interfering cell.

Alternatively, in step 905, the interfering base station 9200 may configure unavailable resources for terminals within the interfering cell. The unavailable resources refer to physical resources that are not used for uplink and/or downlink transmission of connected terminals within the interfering cell. Herein, the unavailable resources may be used for the interfering base station to transmit the inter-base station measurement physical signal, so as to ensure that terminals within the interfering cell will not receive undesired downlink transmission. A specific instance is that the interfering base station 9200 receives indication information of the physical resources used for transmitting the inter-base station measurement physical signal configured by the OAM, which indicates time-domain and frequency-domain resources used for the inter-base station measurement physical signal transmission. The interfering base station 9200 configures downlink unavailable resources or uplink and downlink unavailable resources of the terminals through high-level signaling, which may be a system message or a user group-specific signaling or a user-specific signaling. A simple implementation may be that the interfering base station 9200 transmits the inter-base station measurement physical signal on one or more fixed subframes, wherein, for the fixed subframes for transmitting the inter-base station measurement physical signal, the interfering base station transmits multiple repetitions of the inter-base station measurement physical signal in each subframe. Interfering base station 9200 receives a transmission period of the inter-base station measurement physical signal, and/or times of repetition of the inter-base station measurement physical signal in the period, and/or a transmission frequency interval of the inter-base station measurement physical signal configured by the OAM, and periodically transmits the inter-base station measurement physical signal on a predetermined fixed subframe(s); at the same time, the interfering base station 9200 configures time-domain and frequency-domain resources for transmitting the inter-base station measurement physical signal as the unavailable resources for downlink transmission of terminals within the cell in which the interfering base station 9200 is located. The meaning of the downlink transmission of the terminals includes at least one of the following: physical downlink broadcast channel transmission, physical downlink shared channel transmission, physical downlink control channel, downlink reference signal, channel state information reference signal, and positioning reference signal.

Alternatively, in step 907, the first base station 9100 configures unavailable resources for terminals within the cell in which the first base station is located. The unavailable resources refer to physical resources that are not used for uplink transmission or uplink and downlink transmission of connected terminals within the cell to which the first base station 9100 belongs. Herein, the unavailable resources may be physical resources for the first base station 9100 to receive the inter-base station measurement physical signal, so as to ensure that the first base station 9100 is not interfered by uplink or downlink transmission of the cell in which the first base station is located when performing inter-base station interference measurement. One specific example is that the first base station 9100 receives indication information of the physical resources used for transmitting the inter-base station measurement physical signal configured by the OAM, which indicates time-domain and frequency-domain resources used for the inter-base station measurement physical signal transmission. The first base station 9100 configures uplink unavailable resources or uplink and downlink unavailable resources of the terminals through high-level signaling, which may be a system message or a user group-specific signaling or a user-specific signaling.

Although steps 905 and 907 are shown to be performed successively before step 911 in FIG. 9, steps 905 and 907 may be performed in any order before step 911, or may be omitted.

In step 909, the first base station 9100 acquires configuration parameters for the inter-base station measurement physical signal transmitted by the interfering base station 9200, content of which includes at least one of the following: a transmission period of the inter-base station measurement physical signal, a time-domain starting position offset of the inter-base station measurement physical signal in the period, times of repetition in the period/duration of a single transmission of the inter-base station measurement physical signal, a transmission frequency/bandwidth of the inter-base station measurement physical signal, a subcarrier offset of the synchronization signal block, a subcarrier interval of the inter-base station measurement physical signal, a sequence of the inter-base station measurement physical signal, and a frequency interval for the inter-base station measurement physical signal to be transmitted at the frequency interval. The method for the first base station 9100 to acquire configuration parameters for the inter-base station measurement physical signal transmitted by the interfering base station 9200 may be that, the first base station 9100 acquires the configuration parameters by receiving a user-specific signaling or a system message transmitted by the interfering base station 9200; or, the first base station 9100 acquires the configuration parameters through OAM configuration. By acquiring configuration parameters for the inter-base station measurement physical signal transmitted by the interfering base station 9200, the first base station 9100 may receive the inter-base station measurement physical signal more efficiently.

In step 911, the first base station 9100 receives the inter-base station measurement physical signal transmitted by the interfering base station 9200. Wherein, the inter-base station measurement physical signal may be a downlink physical signal within the interfering cell, such as a synchronization signal block, a channel state information reference signal, etc.; and it may also be a dedicated inter-base station measurement physical signal transmitted by the interfering base station 9200.

Figure 10:
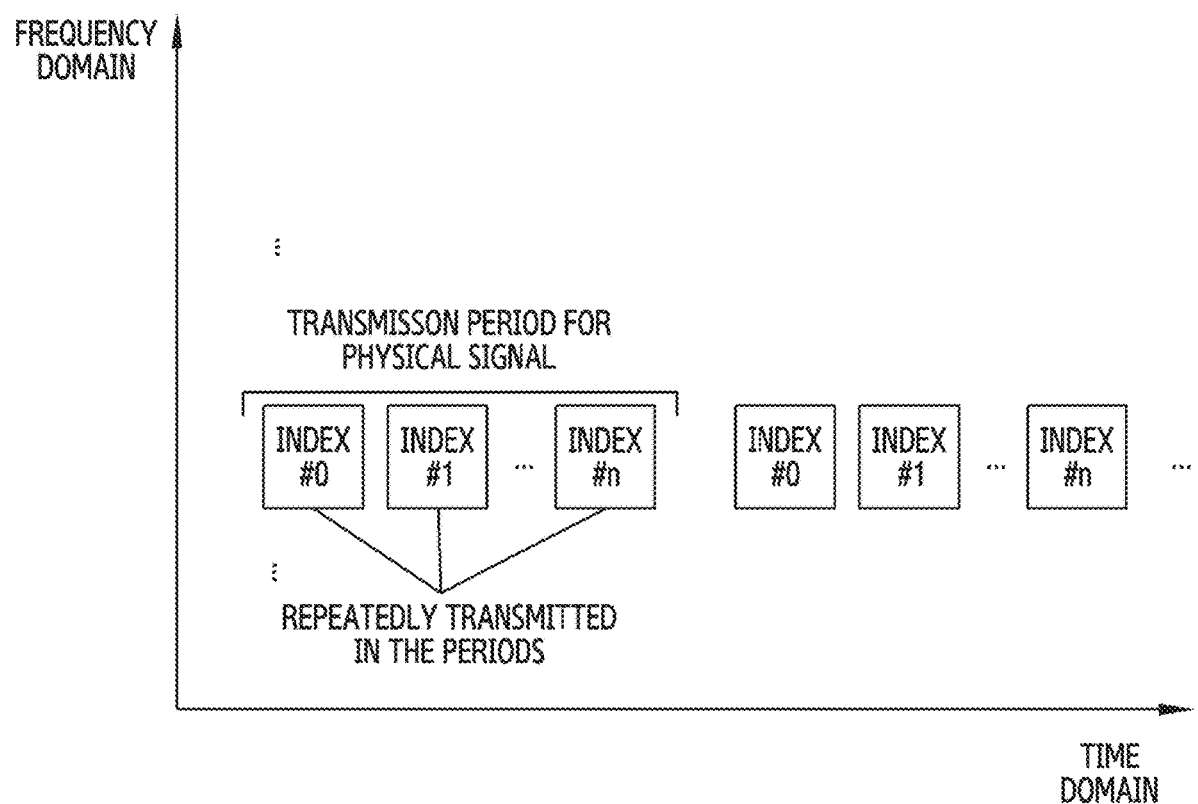
FIG. 10 illustrates an inter-base station measurement physical signal according to an embodiment of the present disclosure.

Specifically, the inter-base station measurement physical signal may be a periodic signal in time domain. Referring to FIG. 10, an example of a periodically transmitted inter-base station measurement physical signal is given in FIG. 10, where the inter-base station measurement physical signal is transmitted in certain periodicity, multiple (e.g., at least two) replicas of the inter-base station measurement physical signal are repeatedly transmitted in a same transmission period, and multiple replicas in the same period have different replica index values. The replicas are indexed, for example, index #0, index #1 . . . index #n, in which the replicas may be indexed sequentially in chronological order or not in any order as long as the replicas correspond to the index numbers. More specifically, the meaning of multiple replicas of inter-base station measurement physical signal transmitted in the same transmission period may be that, the interfering base station transmits replicas with the same complex symbols with different analog transmit beams; or, the interfering base station 9200 transmits replicas with the same complex symbols with different digital transmit beams; or the interfering base station 9200 transmits replicas with the same complex symbols with the same analog transmit beams and the same digital transmit beams. An example of the above periodic inter-base station measurement physical signal may be a synchronization signal block that transmitted by the interfering base station 9200 in downlink, which includes, for example, a downlink primary synchronization signal, a downlink auxiliary synchronization signal, and a demodulation reference signal of a physical broadcast channel.

The inter-base station measurement physical signal may also be transmitted in a plurality of frequency sub-bands. In which, the transmitting of the inter-base station measurement physical signal in a plurality of frequency sub-bands may be that, the inter-base station measurement physical signal is transmitted within different Bandwidth parts (BWPs) respectively; or the inter-base station measurement physical signal is transmitted at different frequency positions within the system bandwidth respectively at a certain frequency interval.

Figure 11:
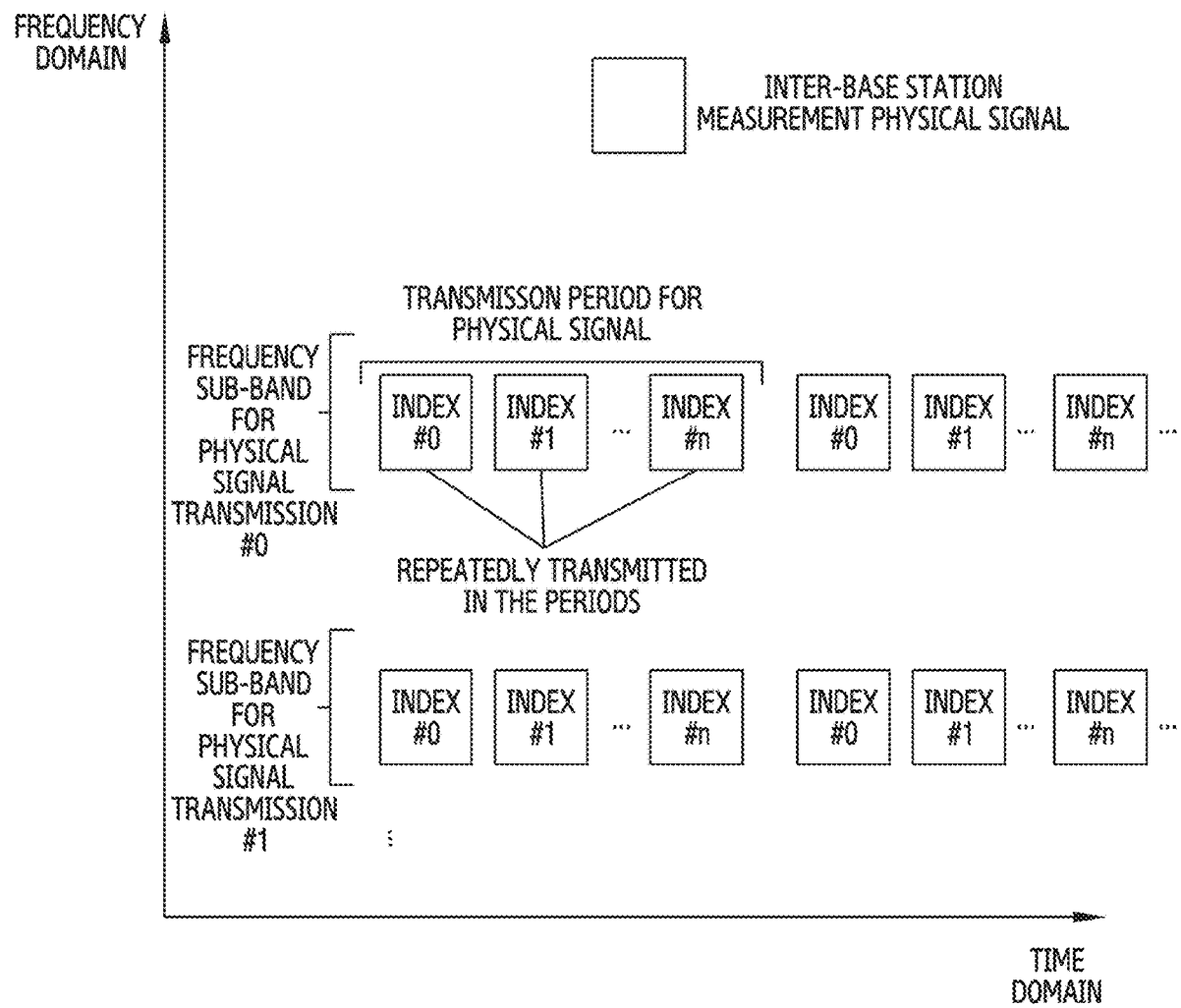
FIG. 11 illustrates an inter-base station measurement physical signal repeatedly transmitted in a plurality of time-domain periods in multiple frequency sub-bands according to an embodiment of the present disclosure.

FIG. 11 illustrates an example in which an inter-base station measurement physical signal is transmitted in multiple frequency sub-bands and the inter-base station measurement physical signal is a periodic signal in time domain.

One specific implementation is that the physical signals with the same index in the same period transmitted in different sub-bands are transmitted on the same time-domain resources, and the base station uses same transmit beam(s) when transmitting. Another specific implementation is that the physical signals with the same index in the same period transmitted in different sub-bands are transmitted on the same time-domain resources, and the base station uses different transmit beams when transmitting.

An instance of a periodic inter-base station measurement physical signal in time domain transmitted in multiple frequency sub-bands may be a synchronization signal block downlink transmitted by the interfering base station 9200 within different BWPs or in different pre-divided frequency sub-bands, herein the primary and auxiliary synchronization signals and the demodulation reference signal carried in the synchronization signal block may be used for the first base station to perform inter-base station interference measurement. Another instance of the above periodic inter-base station measurement physical signal in time domain transmitted in multiple frequency sub-bands may be a channel state information reference signal (CSI-RS) or a dedicated inter-base station measurement reference signal repeatedly transmitted in time-domain periods by the interfering base station 9200 within different BWPs or in pre-divided frequency sub-bands, herein the channel state information reference signal or the dedicated inter-base station measurement reference signal may be used for the first base station to perform inter-base station interference measurement. In the above two instances, the pre-divided frequency sub-bands may be several frequency sub-bands into which the system bandwidth or BWP are equally divided at a certain frequency interval.

By transmitting the inter-base station measurement physical signal in a plurality of frequency sub-bands, frequency selection characteristics of inter-base station interference channels may be more effectively measured, and interference coordination may be more effectively performed.

In one example, the interfering base station 9200 transmits the periodic inter-base station measurement physical signal on multiple frequency sub-bands. The interfering base station 9200 transmits different replicas multiple times using different transmit beams in the same period, and different transmit beams correspond to different replica index values. Also, the interfering base station 9200 may enable transmit beams used for transmitting replicas with the same replica index value in different periods in the same frequency sub-band to be the same. Also, the interfering base station 9200 may enable transmit beams used for transmitting replicas with the same replica index value in the same period in different frequency sub-bands to be the same, or enable transmit beams used for transmitting replicas with the same replica index value in the same period in different frequency sub-bands to be different from each other. In this way, the interfering base station can determine the transmit beam corresponding to a replica by its replica index value.

Returning to FIG. 9, in step 913, the first base station 9100 performs interference measurement based on the received inter-base station measurement physical signal.

The specific method of step 913 includes two steps (A) and (B):

step (A): the first base station 9100 obtains an average inter-base station interference signal power for each frequency sub-band and each replica index value.

The specific way in which the first base station 9100 obtains the average inter-base station interference signal power for each frequency sub-band and each replica index value may be that the first base station 9100 calculates an average reception signal power of a replica corresponding to each replica index value. Wherein, the specific way in which the first base station 9100 calculates the average reception signal power of the replica corresponding to each replica index value may be to average the reception signal power of the replicas with the same index value in different periods.

More specifically, when the inter-base station measurement physical signal transmitted by the interfering base station 9200 is a periodic physical signal transmitted in multiple frequency sub-bands and multiple replicas of the inter-base station measurement physical signal are repeatedly transmitted in the same period, the specific way in which the first base station 9100 performs interference measurement according to the inter-base station measurement physical signal transmitted by the interfering base station 9200 may be that the first base station 9100 calculates an average reception signal power of a replica corresponding to each replica index value in each frequency sub-band. In the above examples, different replica index values of replicas repeatedly transmitted in the same period may represent that interfering base station 9200 transmits replicas with the same complex symbols using different transmit beams in the same period. That is, the interference measured by the first base station 9100 is the average reception signal power of replicas transmitted using different transmit beams.

Specifically, a specific implementation in which the first base station 9100 obtains an average inter-base interference signal power will be described by taking an inter-base measurement physical signal repeatedly transmitted in multiple time periods in multiple frequency sub-bands as an example. Herein, transmitting only one inter-base station measurement physical signal in frequency domain may be regarded as a special case where the number of frequency sub-bands is 1. As described in step 911, the interfering base station 9200 transmits the temporally periodic inter-base measurement physical signal in a plurality of frequency sub-bands. In a same period, the interfering base station 9200 repeatedly transmits a plurality of replicas of the inter-base measurement physical signal multiple times using different transmit beams, and the different transmit beams correspond to different replica index values, and the interfering base station 9200 may enable transmit beams used for transmitting replicas with the same replica index value in different periods in the same frequency sub-band to be the same.

The first base station 9100 may measure the reception signal power of replicas of the inter-base station measurement physical signal with different replica index values in different periods and in different frequency sub-bands, as the inter-base station interference signal power; and then, average the inter-base station interference signal power in different periods but in the same frequency sub-band and with the same replica index value, to obtain an average inter-base station interference signal power for each frequency sub-band and each replica index value (transmit beam).

Step (B): the first base station 9100 may perform processing based on the average inter-base station interference signal power for each frequency sub-band and each replica index value, to generate an interference measurement report. Herein, there are four modes to generate the interference measurement report, including Mode 1, Mode 2, Mode 3 and Mode 4:

Mode 1: the first base station 9100 directly generates the interference measurement report based on the average inter-base station interference signal power for each frequency sub-band and each replica index value obtained in step (A), as shown in Table 1.

TABLE 1

| | Average Inter-Base Station Interference Power | | |
|---|---|---|---|
| | Frequency sub-band #0 | Frequency sub-band #1 | ... |
| Replica index value #0 | (Average interference signal power measurement result) | (Average interference signal power measurement result) | ... |

TABLE 1-continued

Average Inter-Base Station Interference Power

| | Frequency sub-band #0 | Frequency sub-band #1 | ... |
|---|---|---|---|
| Replica index value #1 | (Average interference signal power measurement results) | (Average interference signal power measurement result) | ... |
| ... | ... | ... | ... |

Here, the first base station 9100 reports all information on the measured average inter-base station interference signal power for each frequency sub-band and each replica index value, so that the OAM or the interfering base station has more comprehensive information to make a decision on how to perform interference coordination.

Mode 2: The first base station 9100 compares the average inter-base station interference signal power of different replica index values in the same frequency sub-band to obtain the replica index values of the M replicas with the strongest average inter-base station interference signal power in each frequency sub-band, to obtain corresponding relationship between frequency sub-band indexes and the replica index values of the M replicas with the strongest interference signal power in the corresponding frequency sub-bands. Specifically, for example, the first base station sorts the replica index values in each frequency sub-band (corresponding to different transmit beams of the interfering base station respectively) in a descending order of magnitudes of the average inter-base station interference signal power to obtain corresponding relationship between the frequency sub-band index and the first M replica index values in the sorted replica index value sequence, to generate the interference measurement report, as shown in Table 2(a-1). The value of M may be acquired by the first base station according to OAM configuration or may be a predetermined value. The determined M replica index values may be used by the interfering base station to determine the M transmit beams with the strongest interference.

TABLE 2(a-1)

corresponding relationship between frequency sub-band indexes and the replica index values of M replicas with the strongest interference signal power in the corresponding frequency sub-bands

| Frequency sub-band #0 | Frequency sub-band #1 | ... |
|---|---|---|
| (Replica index value with the maximum average interference power) | (Replica index value with the maximum average interference power) | ... |
| (Replica index value with the second largest average interference power) | (Replica index value with the second largest average interference power) | ... |
| ... | ... | ... |
| (Replica index value with the M-th largest average interference power) | (Replica index value with the M-th largest average interference power) | ... |

Additionally or alternatively, the first base station 9100 may obtain replica index values of M' replicas of a plurality of replicas of which average inter-base station interference signal power are greater than a predetermined threshold in each frequency sub-band to obtain corresponding relationship between frequency sub-band indexes and the replica index values of the M' replicas, to generate an interference measurement report, as shown in Table 2(a-2). The predetermined threshold may be acquired by the first base station according to the OAM configuration or may be a predetermined system value. In one implementation, the aforementioned M' replicas may be all replicas of which the average inter-base interference signal power measured by the first base station are greater than the predetermined threshold in each frequency sub-band. In another implementation, the first base station may determine the M' replicas based on X (wherein X is a positive integer), which may be obtained by the first base station according to the OAM configuration or may be a predetermined system value. Specifically, in the case where a number of multiple replicas of which the average inter-base station interference signal power measured by the first base station are greater than the predetermined threshold in each frequency sub-band is less than or equal to X, M' is equal to the number; and in the case where the number is greater than X, M' is equal to X, and the M' replicas may be, for example, the first M' replicas with strongest inter-base interference signal power among replicas of which the average inter-base interference signal power measured by the first base station are greater than the predetermined threshold in each frequency sub-band, or the M' replicas may be, for example, any M' replicas of the plurality of replicas of which the average inter-base interference signal power measured by the first base station are greater than the predetermined threshold in each frequency sub-band. That is, M' is equal to the smaller one of the number of the plurality of replicas of which the average inter-base interference signal power measured by the first base station are greater than the predetermined threshold in each frequency sub-band and X. The determined replica index values may be used by the interfering base station to determine transmit beams with interference power greater than the predetermined threshold.

TABLE 2(a-2)

corresponding relationship between frequency sub-band indexes and the replica index values of M' replicas of which the interference signal power are greater than a predetermined threshold in the corresponding frequency sub-bands

| Frequency sub-band #0 | Frequency sub-band #1 | ... |
|---|---|---|
| (The first replica index value for which the average interference power is greater than the predetermined threshold) | (The first replica index value for which the average interference power is greater than the predetermined threshold) | ... |
| (The second replica index value for which the average interference power is greater than the predetermined threshold) | (The second replica index value for which the average interference power is greater than the predetermined threshold) | ... |
| ... | ... | ... |
| (The M'-th replica index value for which the average interference power is greater than the predetermined threshold) | (The M'-th replica index value for which the average interference power is greater than the predetermined threshold) | ... |

Mode 3: the way in which the first base station 9100 generates the interference measurement report may also be that, the first base station 9100 uses average interference signal power measurement results corresponding to the first M replica index values in each frequency sub-band in addition to the corresponding relationship between the frequency sub-band indexes and the first M replica index values, to jointly generate the interference measurement report, as shown in Table 2(b-1). In this way, the interfering base station 9200 can more clearly understand how strong the interference caused by the transmit beams corresponding to the M replica index values is, and perform appropriate interference coordination.

TABLE 2(b-1)

corresponding relationship between frequency sub-band indexes and
the replica index values of the M replicas with
the strongest interference signal power in the corresponding
frequency sub-bands as well as the corresponding average
interference power measurement results

| Frequency sub-band #0 | Frequency sub-band #1 | ... |
|---|---|---|
| (Replica index value with the maximum average interference power) and (the maximum average interference power measurement result) | (Replica index value with the maximum average interference power) and (the maximum average interference power measurement result) | ... |
| (Replica index value with the second largest average interference power) and (the second largest average interference power measurement result) | (Replica index value with the second largest average interference power) and (the second largest average interference power measurement result) | ... |
| ... | ... | ... |
| (Replica index value with the M-th largest average interference power) and (the M-th largest average interference power measurement result) | (Replica index value with the M-th largest average interference power) and (the M-th largest average interference power measurement result) | ... |

Additionally or alternatively, the way in which the first base station 9100 generates the interference measurement report may also be that, first base station 9100 uses average interference signal power measurement results corresponding to the M' replica index values in each frequency sub-band in addition to the corresponding relationship between the frequency sub-band indexes and the M' replica index values, to jointly generate the interference measurement report, as shown in Table 2(b-2). In this way, the interfering base station 9200 can more clearly understand how strong the interference caused by the transmit beams corresponding to the M' replica index values is, and perform appropriate interference coordination.

TABLE 2(b-2)

corresponding relationship between the frequency sub-band indexes
and the replica index values of M' replicas of which the
interference signal power are greater than the predetermined
threshold in the corresponding frequency sub-bands as well as the
corresponding average interference power measurement results

| Frequency sub-band #0 | Frequency sub-band #1 | ... |
|---|---|---|
| (The first replica index value for which the average interference power is greater than the predetermined threshold) and (the interference power measurement result corresponding to the first replica index value) | (The first replica index value for which the average interference power is greater than the predetermined threshold) and (the interference power measurement result corresponding to the first replica index value) | ... |
| (The second replica index value for which the average interference power is greater than the predetermined threshold) and (the interference power measurement result corresponding to the second replica index value) | (The second replica index value for which the average interference power is greater than the predetermined threshold) and (the interference power measurement result corresponding to the second replica index value) | ... |
| ... | ... | ... |
| (The M'-th replica index value for which the average interference power is greater than the predetermined threshold) and (the interference | (The M'-th replica index value for which the average interference power is greater than the predetermined threshold) and (the interference | ... |

TABLE 2(b-2)-continued corresponding relationship between the frequency sub-band indexes
and the replica index values of M' replicas of which the
interference signal power are greater than the predetermined
threshold in the corresponding frequency sub-bands as well as the
corresponding average interference power measurement results

| Frequency sub-band #0 | Frequency sub-band #1 | ... |
|---|---|---|
| power measurement result corresponding to the M'-th replica index value) | power measurement result corresponding to the M'-th replica index value) | |

Mode 4: the way in which the first base station 9100 generates the interference measurement report may also be that, first base station 9100 uses transmit power reduction values for transmit beams corresponding to the first M replica index values for downlink transmission by the interfering base station 9200 in the frequency sub-band using the transmit beams corresponding to the first M replica index values in addition to the corresponding relationship between the frequency sub-band index and the first M index values, to jointly generate the interference measurement report, as shown in Table 2(c-1). The transmit power reduction values mean that when performing downlink transmission in an indicated frequency sub-band(s) using transmit beams corresponding to indicated replica index values, the interfering base station 9200 should use transmit power that is reduced, to reduce the interference with uplink reception of the first base station. In this way, the interfering base station 9200 may more flexibly perform appropriate interference coordination for each interfering beam based on the transmit power reduction values.

TABLE 2(c-1)

corresponding relationship between frequency sub-band indexes
and the replica index values of the M replicas with the strongest
interference signal power in the corresponding frequency sub-bands
as well as the corresponding transmit power reduction values

| Frequency sub-band #0 | Frequency sub-band #1 | ... |
|---|---|---|
| (Replica index value with the maximum average interference power) and (the corresponding transmit power reduction value) | (Replica index value with the maximum average interference power) and (the corresponding transmit power reduction value) | |
| (Replica index value with the second largest average interference power) and (the corresponding transmit power reduction value) | (Replica index value with the second largest average interference power) and (the corresponding transmit power reduction value) | |
| ... | ... | |
| (Replica index value with the M-th largest average interference power) and (the corresponding transmit power reduction value) | (Replica index value with the M-th largest average interference power) and (the corresponding transmit power reduction value) | |

Additionally or alternatively, the way in which the first base station 9100 generates the interference measurement report may also be that, first base station 9100 uses transmit power reduction values for transmit beams corresponding to the M' replica index values for downlink transmission by the interfering base station 9200 in the frequency sub-band using the transmit beams corresponding to the M' replica index values in addition to the corresponding relationship between the frequency sub-band indexes and the M' replica index values, to jointly generate the interference measurement report, as shown in Table 2(c-2). In this way, the interfering base station 9200 may more flexibly perform appropriate interference coordination for each interfering beam based on the transmit power reduction values.

TABLE 2(c-2)

corresponding relationship between the frequency sub-band indexes and the replica index values of M' replicas of which the interference signal power are greater than the predetermined threshold in the corresponding frequency sub-bands as well as the corresponding transmit power reduction values

| Frequency sub-band #0 | Frequency sub-band #1 | ... |
|---|---|---|
| (The first replica index value for which the average interference power is greater than the predetermined threshold) and (the corresponding transmit power reduction value) | (The first replica index value for which the average interference power is greater than the predetermined threshold) and (the corresponding transmit power reduction value) | ... |
| (The second replica index value for which the average interference power is greater than the predetermined threshold) and (the corresponding transmit power reduction value) | (The second replica index value for which the average interference power is greater than the predetermined threshold) and (the corresponding transmit power reduction value) | ... |
| ... | ... | ... |
| (The M'-th replica index value for which the average interference power is greater than the predetermined threshold) and (the corresponding transmit power reduction value) | (The M'-th replica index value for which the average interference power is greater than the predetermined threshold) and (the corresponding transmit power reduction value) | ... |

Step 810 of FIG. 8 is set forth in more detail above by steps 903-913, which may be included in step 810.

In step 915, the first base station 9100 reports the interference measurement report to the interfering base station 9200 or the management center. Specifically, the way for the first base station 9100 to report the interference measurement result may be that: the first base station 9100 reports the interference measurement result to the OAM through a backhaul link; or, the first base station 9100 reports the interference measurement result to the interfering base station 9200 through an access link.

Further, the way for the first base station 9100 to report the interference measurement report may be that: the first base station 9100 accesses the interfering cell and reports, the measurement of the interference caused by the interfering base station 9200 within the interfering cell to the first base station 9100, to the interfering base station 9200 through the access link.

Further, the specific method for the first base station 9100 to report the inter-base station interference measurement to the interfering base station 9200 through the access link may be that the first base station 9100 accesses the interfering cell and reports the interference measurement report to the interfering base station 9200 in a random access procedure. More specifically, the first base station 9100 may carry the interference measurement report in an Msg3 of a random access procedure; or the first base station 9100 may carry the interference measurement report in an uplink shared channel in an MsgA of a two-step random access procedure.

Alternatively, the specific method for the first base station 9100 to report the inter-base station interference measurement to the interfering base station 9200 through the access link may be that the first base station 9100 accesses the interfering cell and reports the inter-base station interference measurement result on physical resources of semi-persistent scheduling configured by the interfering base station 9200 for the first base station 9100. In this way, the first base station 9100 may report the interference measurement result to the interfering base station 9200 more promptly and rapidly.

Step 820 of FIG. 8 is set forth in more detail above by step 915.

In step 917, the interfering base station 9200 performs beam-based interference coordination according to the interference measurement result.

The interfering base station 9200 determines transmit beams corresponding to the reported replica index values based on the interference measurement result reported by the first base station 9100, which may also be referred to as "interfering beams" hereinafter. In addition, the interfering base station 9200 may also determine transmit power reduction values corresponding to the interfering beams based on the interference measurement result reported by the first base station 9100. In addition, the interfering base station 9200 may also determine an average interference power measurement result corresponding to the interfering beams based on the interference measurement result reported by the first base station 9100.

A beam-based inter-base station interference coordination scheme is that the interfering base station 9200 does not use interfering beams that generate strong inter-base station interference for downlink transmission. The interfering base station 9200 may acquire the interfering beams that generate strong inter-base station interference by acquiring the interfering beams corresponding to replica index values for which the inter-base station interference energy is greater than a threshold in the interference measurement report or acquiring the interfering beams corresponding to the replica index values indicated by the OAM. The threshold may be acquired by the interfering base station 9200 according to the OAM configuration or may be a predetermined value of the interfering base station 9200. In this case, interference of the interfering beams with the first base station 9100 can be reduced to the maximum extent.

Alternatively, when the interfering base station 9200 performs downlink transmission using the interfering beams that generate strong inter-base station interference, downlink transmission is performed according to the transmit power reduction values corresponding to the interfering beams reported by the first base station 9100. The interfering base station 9200 may acquire the interfering beams that generate strong inter-base station interference by acquiring the interfering beams corresponding to replica index values for which the inter-base station interference energy is greater than a threshold in the interference measurement report or acquiring the interfering beams corresponding to the replica index values indicated by the OAM. The threshold may be acquired by the interfering base station 9200 according to the OAM configuration or may be a predetermined value of the interfering base station 9200. In this case, transmission may be performed using the interfering beams with the reduced transmit power, which can appropriately reduce the interference of the interfering beams while ensuring the flexibility for the interfering base station 9200 to schedule the transmission of the interfering beams.

A specific instance is that, assuming that the transmit beams that can be used for downlink transmission by the interfering base station 9200 are $\{1, \ldots, N_{TX}\}$, and assuming that a transmit beam index corresponding to a replica index value with the largest inter-base station interference in the frequency sub-band with a frequency sub-band index value of $i_F$ reported by the first base station 9100 is $i_{TX}(i_F)$, then, for the purpose of inter-base station interference coordination, the interfering base station 9200 should avoid using the transmit beam with the transmit beam index of $i_{TX}(i_F)$ when performing downlink transmission in the frequency sub-band with the frequency sub-band index value of $i_F$, and the available transmit beam indexes are $i \in \{1, \ldots, N_{TX}\}$ and $i \neq i_{TX}(i_F)$; if the interfering base station 9200 has determined interfering beams and transmit power reduction values corresponding to the determined interfering beams, assuming that the transmit beam index corresponding to the replica index value with the largest inter-base station interference in the frequency sub-band with the frequency sub-band index value of $i_F$ reported by the first base station 9100 is $i_{TX}(i_F)$ and the transmit power reduction value corresponding to the transmit beam $i_{TX}(i_F)$ causing the inter-base station interference to neighboring cells is $\Delta P(i_{TX}(i_F))$, then, when the interfering base station 9200 performs downlink transmission using the transmit beam with the transmit beam index of $i_{TX}(i_F)$ in the frequency sub-band with the frequency sub-band index of $i_F$, the largest downlink transmit power is $P_{max} - \Delta P(i_{TX}(i_F))$, where P max is a maximum power for downlink transmission of the interfering base station 9200; and when the interfering base station 9200 performs downlink transmission using the transmit beams with the transmit beam index of $i \in \{1, \ldots, N_{TX}\}$ and $i \neq i_{TX}(i_F)$ in the frequency sub-band with the frequency sub-band index of $i_F$, the largest downlink transmit power is $P_{max}$. This design may ensure that when using transmit beams that cause strong interference to the first base station 9100, the interfering base station 9200 may use the transmit power reduction values to flexibly reduce the transmit power to decrease the interference with the first base station 9100 of the neighboring cell.

Another beam-based inter-base station interference coordination scheme is characterized in that the interfering base station 9200 may not use interfering beams for downlink transmission on specific time-domain and/or frequency-domain resources (i.e., time-and-frequency resources), and the interfering base station 9200 may use all downlink transmit beams including the interfering beams for downlink transmission on non-specific time-domain and/or frequency-domain resources. The specific time-domain and/or frequency-domain resources may be physical resources for inter-base station interference coordination configured by the OAM, or physical resources for inter-base station interference coordination acquired by the interfering base station 9200 according to a predetermined rule. For example, the predetermined rule may be to use a fixed frequency band within the system bandwidth as frequency-domain resources for inter-base station interference coordination, or may be to use several fixed subframes or slots or time-domain symbols in a slot(s) as time-domain resources for inter-base station interference coordination, and also may be to use combination of the above frequency-domain resources and time-domain resources as resources for inter-base station interference coordination. In this way, inter-base station interference coordination may be performed only on specific time-and-frequency resources as needed, thus ensuring the flexibility for the interfering base station 9200 to schedule the transmission of the interfering beams on non-specific time-and-frequency resources.

Yet another beam-based inter-base station interference coordination scheme is characterized in that when the interfering base station 9200 performs downlink transmission on specific time-domain and/or frequency-domain resources using interfering beams, downlink transmission must be performed according to transmit power reduction values corresponding to the interfering beams; when the interfering base station 9200 performs downlink transmission on the specific time-domain and/or frequency-domain resources using transmit beams other than the interfering beams, normal transmit power (without the aforementioned transmit power reduction) may be used for downlink transmission; and when the interfering base station 9200 performs downlink transmission on non-specific time-domain and/or frequency-domain resources using all beams including the interfering beams, normal transmit power (without the aforementioned transmit power reduction) may be used for downlink transmission. The specific time-domain and/or frequency-domain resources may be physical resources for inter-base station interference coordination configured by the OAM, or physical resources for inter-base station interference coordination acquired by the interfering base station 9200 according to a predetermined rule, wherein, for example, the predetermined rule may be to use a fixed frequency band within the system bandwidth as frequency-domain resources for inter-base station interference coordination, or may be to use several fixed subframes or slots or time-domain symbols in a slot(s) as time-domain resources for inter-base station interference coordination, and also may be to use combination of the above frequency-domain resources and time-domain resources as resources for inter-base station interference coordination. In this way, when interference coordination is performed on specific time-domain and frequency-domain resources, the transmit power may be reduced appropriately to reduce interference with the first base station 9100 more flexibly, while ensuring the flexibility for the interfering base station 9200 to schedule the transmission of the interfering beams on the specific time-and-frequency resources; in the meantime, the flexibility for the interfering base station 9200 to schedule the transmission of the interfering beams on non-specific time-and-frequency resources is not affected by the implementation of the interference coordination scheme.

Through the various beam-based inter-base station interference coordination schemes described above, not only the interference of the interfering base station 9200 with the first base station 9100 can be reduced, but also the interference of the interfering base station 9200 with other base stations subjected to inter-base station cross-link interference caused by the interfering beams can be reduced.

Step 830 of FIG. 8 is set forth in more detail above by step 917, i.e., step 917 may be included in step 830.

Figure 12:
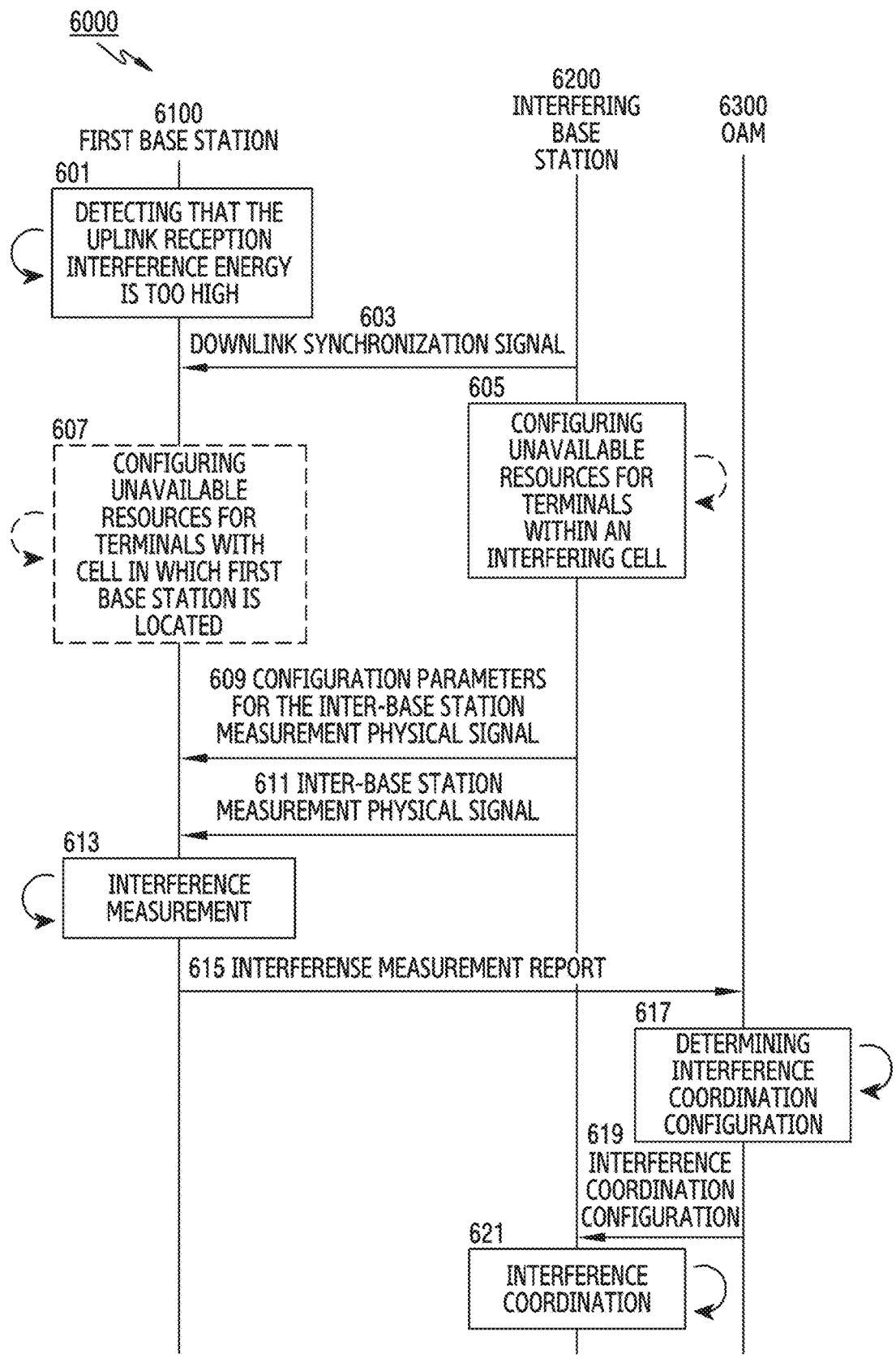
FIG. 12 is a flowchart illustrating an interference coordination method according to an embodiment of the present disclosure.

The method shown in FIG. 7 with the presence of an OAM will be described in more detail below in conjunction with FIG. 12. FIG. 12 is a flowchart 6000 showing an interference coordination method jointly performed by a first base station 6100, an interfering base station 6200, and an OAM 6300 according to an embodiment of the present disclosure. The interference coordination method shown in FIG. 6 is, for example, a beam-based interference coordination method. A number of the interfering base stations 6200 interfering with the first base station 6100 may be one or more. The following description will be given by taking one single interfering base station 6200 as an example. When there are multiple interfering base stations, the steps described in the present method may be repeatedly and sequentially performed on the multiple interfering base stations, so that inter-cell interference measurement may be sequentially performed on the multiple interfering base stations.

Steps 601, 603, 605, 607, 609, 611, 613 are the same as steps 901, 903, 905, 907, 909, 911, 913 and will not be described repeatedly.

In step 615, the first base station 6100 reports the interference measurement report.

The first base station 6100 may report the inter-base station interference measurement report to the OAM 6300 through a backhaul link.

In step 617, the OAM 6300 determines interference coordination configuration based on the interference measurement report reported by the first base station 6100.

Herein, the way for the OAM 6300 to determine the interference coordination configuration may be one of the following two modes:

Mode 1:

In the case where the interference measurement report reported by the first base station 6100 only includes an average inter-base station interference signal power for each frequency sub-band and each replica index value, the interference coordination configuration in Mode 1 is performed. Mode 1 is discussed with respect to three cases below:

Mode 1-1:

OAM 6300 compares the average inter-base station interference signal power of different replica index values in the same frequency sub-band to obtain the replica index values of the M replicas with the strongest average inter-base station interference signal power in each frequency sub-band. For example, the OAM 6300 sorts the replica index values in each frequency sub-band (corresponding to different transmit beams of the interfering base station 6200 respectively) in a descending order of magnitudes of the average inter-base station interference signal power to obtain corresponding relationship between the frequency sub-band indexes and the first M index values in the sorted replica index value sequence, to generate the interference coordination configuration, as shown in Table 2(a-1). The value of M may be configured by the OAM 6300 or may be a predetermined value.

Additionally or alternatively, OAM 6300 may obtain replica index values of M' replicas of a plurality of replicas of which average inter-base station interference signal power are greater than a predetermined threshold in each frequency sub-band, to obtain corresponding relationship between frequency sub-band indexes and the replica index values of the M' replicas of which average inter-base station interference signal power are greater than the predetermined threshold, to generate the interference coordination configuration, as shown in Table 2(a-2). The predetermined threshold may be an internal parameter of the OAM 6300 or a predetermined system value. In one implementation, the aforementioned M' replicas may be all replicas of which the average inter-base station interference signal power are greater than the predetermined threshold in each frequency sub-band. In another implementation, the OAM 6300 may determine the M' replicas based on X (wherein X is a positive integer), which may be an internal parameter of the OAM 6300 or a predetermined system value. Specifically, in the case where a number of multiple replicas of which the average inter-base station interference signal power are greater than the predetermined threshold in each frequency sub-band is less than or equal to X, M' is equal to the number; and in the case where the number is greater than X, M' is equal to X, and the M' replicas may be, for example, the first M' replicas with strongest inter-base interference signal power among the plurality of replicas of which the average are greater than the predetermined threshold in each frequency sub-band, or the M' replicas may be, for example, any M' replicas of the plurality of replicas of which the average inter-base interference signal power are greater than the predetermined threshold in each frequency sub-band. That is, M' is equal to a smaller one of the number of the plurality of replicas of which the average inter-base interference signal power are greater than the predetermined threshold in each frequency sub-band and X.

Mode 1-2:

In addition to the corresponding relationship between the frequency sub-band indexes and the first M replica index values, the OAM 6300 uses an average interference signal power measurement result corresponding to the replica index values in each frequency sub-band, to jointly generate the interference coordination configuration, as shown in Table 2(b-1).

Additionally or alternatively, in addition to the corresponding relationship between the frequency sub-band indexes and the replica index values of the M' replicas, the OAM 6300 uses an average interference signal power measurement result corresponding to the replica index values in each frequency sub-band, to jointly generate the interference coordination configuration, as shown in Table 2(b-2).

Mode 1-3:

In addition to the corresponding relationship between the frequency sub-band index and the first M index values, the OAM 6300 uses transmit power reduction values for transmit beams corresponding to the replica index values applied when the interfering base station 6200 performs downlink transmission in the frequency sub-band using the transmit beams corresponding to the replica index values, to jointly generate the interference coordination configuration, as shown in Table 2(c-1). The transmit power reduction values mean that when performing downlink transmission in an indicated frequency sub-band(s) using transmit beams corresponding to indicated replica index values, the interfering base station 6200 should use a reduced transmit power, to reduce interference with uplink reception of the first base station 6100.

Additionally or alternatively, in addition to the corresponding relationship between the frequency sub-band indexes and the replica index values of the M' replicas, the OAM 6300 uses transmit power reduction values for transmit beams corresponding to the replica index values applied when the interfering base station 6200 performs downlink transmission in the frequency sub-band using the transmit beams corresponding to the replica index values, to jointly generate the interference coordination configuration, as shown in Table 2(c-2).

Mode 2: when the interference measurement report reported by the first base station 6100 is the measurement result shown in Table 2(a-1), Table 2(a-2), Table 2(b-1), Table 2(b-2), Table 2(c-1) or Table 2(c-2), the OAM 6300 generates the interference coordination configuration directly based on the interference measurement report.

In step 619, the OAM 6300 transmits the interference coordination configuration to the interfering base station 6200.

In step 621, the interfering base station 6200 performs interference coordination based on the received interference coordination configuration. Specifically, the interfering base station 6200 determines transmit beams corresponding to the replica index values indicated by the interference coordination configuration based on the interference coordination configuration received from the OAM 6300, which are hereinafter referred to as "interfering beams". In addition, the interfering base station 6200 may also determine transmit power reduction values corresponding to the interfering beams based on the interference coordination configuration. In addition, the interfering base station 6200 may also determine an average interference power measurement result corresponding to the interfering beams based on the interference coordination configuration. Next, the interfering base station 6200 performs interference coordination based on the interfering beams in the same way in which the interfering base station 9200 performs interference coordination based on the interfering beams in step 917, which will not be described repeatedly.

The following illustrates a frequency domain-based inter-base station interference coordination method, which may be used in combination with or independently of the interference coordination methods described before. For example, the frequency domain-based inter-base station interference coordination method in this example may be implemented before step 800 in FIG. 8, or may be implemented after step 8230 in FIG. 8, or may be performed simultaneously with or between any one or more steps in FIG. 8. The interference coordination method in this example is jointly implemented by the first base station 6100 and/or the interfering base station 6200.

Figure 13:
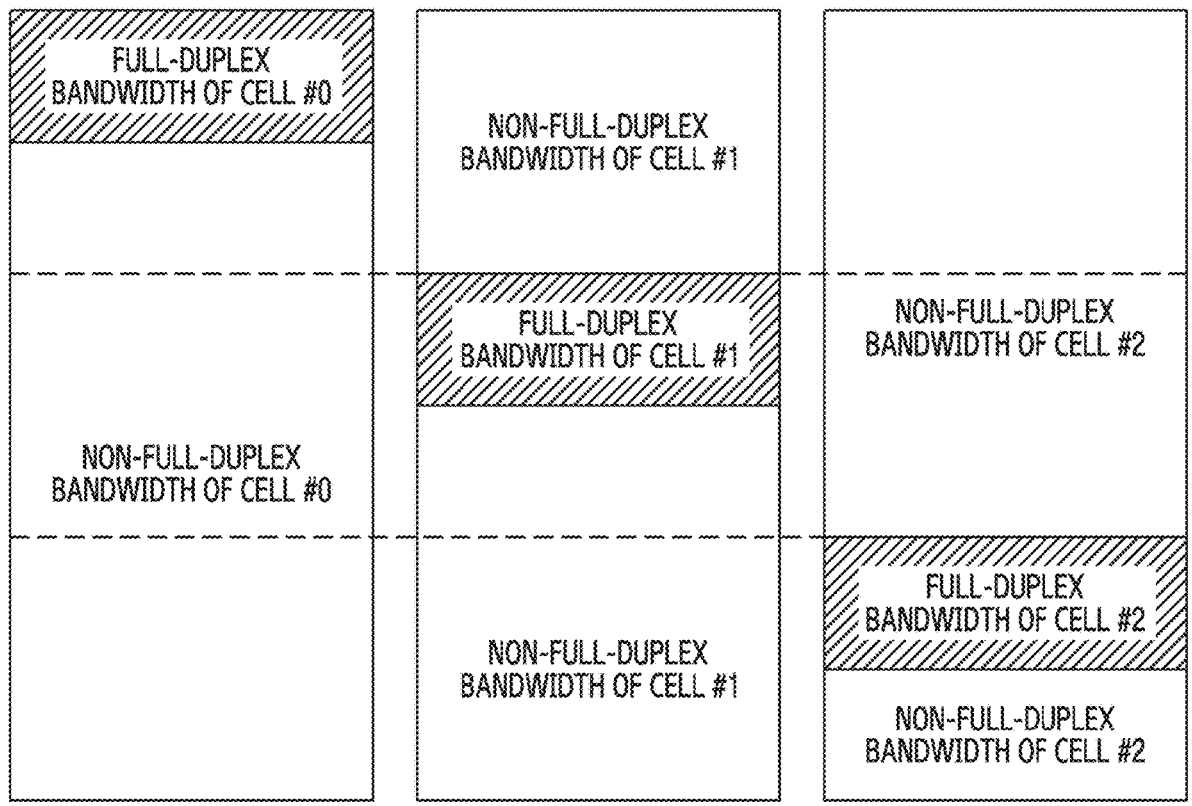
FIG. 13 is a schematic diagram illustrating full-duplex configuration according to an embodiment of the present disclosure.

The frequency domain-based inter-base station interference coordination method in this example is that a base station acquires a bandwidth position of full-duplex transmission according to configuration of OAM 6300 or a Cell ID of a cell in which the base station is located, wherein the full-duplex transmission bandwidth of the first base station 6100 (a present cell) and that of the interfering base station 6200 (an interfering cell) are not overlapped (as shown in FIG. 13) or are not completely overlapped (not shown). This design can ensure that the first base station 6100 will be interfered by only downlink transmission of the interfering base station 6200 on only a part of the time-and-frequency resources within the full-duplex transmission bandwidth (inter-base station interference will not occur on time-and-frequency resources for the uplink transmission of the interfering base station 6200).

FIG. 13 shows a schematic diagram in which Cell #0, Cell #1, and Cell #2 are interfering base stations to each other. The full-duplex bandwidths or bandwidth parts of Cell #0, Cell #1, and Cell #2 are not overlapped. Taking Cell #1 as an example, through the frequency domain-based interference coordination scheme, inter-base station interference suffered by the base station within Cell #1 on the full-duplex bandwidth or bandwidth part only occurs on time-domain or frequency-domain resources used for non-full-duplex downlink transmission of Cell #0 and Cell #2, thereby effectively reducing the inter-base station interference of neighboring cells on the full-duplex bandwidth or bandwidth part of a target cell, and effectively improving the spectrum efficiency of full-duplex transmission.

A specific implementation of the frequency domain-based interference coordination method is that each base station acquires configuration of the full-duplex bandwidth or bandwidth part within the system bandwidth through the OAM 6300, and the meaning of the configuration of the full-duplex bandwidth or bandwidth part at least includes one of the following: a size of the full-duplex bandwidth or bandwidth part, and a starting subcarrier frequency or center frequency of the full-duplex bandwidth or bandwidth part. Before the step that the base station acquires the configuration of the full-duplex bandwidth or bandwidth part within the system bandwidth through the OAM 6300, it may be further included that the first base station 6100 reports the inter-base station interference measurement report to the OAM 6300 through a backhaul link, wherein the first base station 6100 may be one or more base stations located in all the cells managed by the OAM 6300 and subjected to inter-base station interference of neighboring cells. A case where a base station is not only an interfering base station but also an interfered base station (e.g., the first base station 6100) may occur in all the cells managed by the OAM 6300. In view of this, the inter-base station interference among all the cells may be uniformly managed through frequency domain-based interference coordination by the OAM 6300 after collecting the inter-base station interference measurement reports of all the first base station 6100s within the cells managed by the OAM 6300.

Another specific implementation of the frequency domain-based interference coordination method is that each base station may determine a frequency-domain position of the full-duplex bandwidth or bandwidth part within the system bandwidth according to a Cell ID of the cell in which the base station is located. Specifically, before determining the frequency-domain position of the full-duplex bandwidth or bandwidth part within the system bandwidth according to the Cell ID, the base station may also acquire relevant parameters for determining the frequency-domain position of the full-duplex bandwidth or bandwidth part through the OAM 6300 or in a predetermined mode, wherein the configuration parameters may be the size of the full-duplex bandwidth or bandwidth part and/or a coordinated multiplexing factor N, wherein the coordinated multiplexing factor N refers to a maximum number of cells that can ensure that the full-duplex bandwidths or bandwidth parts are not overlapped with each other.

Figure 14:
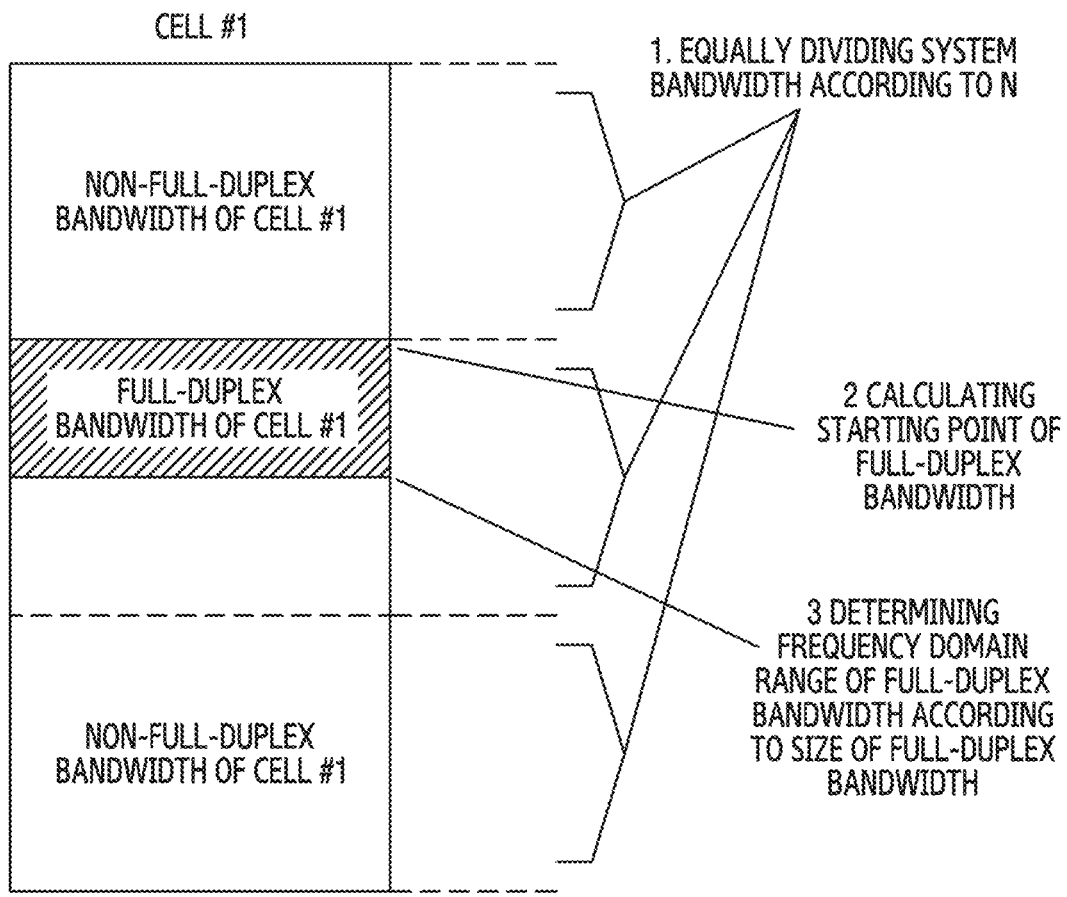
FIG. 14 is a schematic diagram illustrating full-duplex configuration according to an embodiment of the present disclosure.

A specific implementation in which the base station determines the frequency-domain position according to the Cell ID and the relevant parameters for determining the frequency-domain position of the full-duplex bandwidth or bandwidth part configured by the OAM 6300 may be that, for a base station with a Cell ID of $N_{CID}$, the starting position of the full-duplex bandwidth or bandwidth part within the system bandwidth is $(i_N-1)\cdot B/N$, wherein B represents the system bandwidth, and its unit may be a number of physical resource blocks, or a number of subcarriers, or a number of bandwidth parts, N represents the coordinated multiplexing factor, and $i_N = N_{CID}$ mod N. Then, for the base station with the Cell ID of $N_{CID}$, the frequency-domain range of the full-duplex bandwidth or bandwidth part within the system is $[(i_N-1)\cdot B/N, (i_N-1)\cdot B/N + B_{FD}[$, wherein $B_{FD}$ represents the full-duplex bandwidth, and with the same unit as that of the system bandwidth B. FIG. 14 shows a schematic diagram of an technical effect of the implementation, wherein the coordinated multiplexing factor size is set as N=3, and the Cell ID of the cell is set as $N_{CID}$=1, as shown in FIG. 14. In this way, the frequency-domain position of a specific full-duplex bandwidth or bandwidth part may be determined based on specific parameters, so that the full-duplex bandwidths or bandwidth parts are not overlapped or hardly overlapped with each other.

Specific methods for inter-base station interference coordination have been described above.

Figure 15:
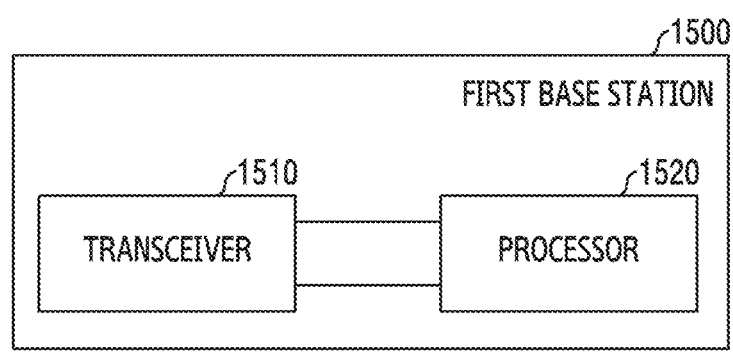
FIG. 15 illustrates a structure of a first base station according to an embodiment of the present disclosure.

FIG. 15 is a schematic diagram illustrating a structure of a first base station 1500.

In FIG. 15, the first base station 1500 includes a transceiver 1510 and a processor 1520.

The transceiver 1510 may transmit and receive uplink and/or downlink wireless signals in a wireless communication network to communicate with base stations or other terminals. Processor 1520 may generate signals to be transmitted by transceiver 1510, interpret signals received by transceiver 1510, or control the operation of transceiver 1510. Processor 1520 may perform inter-base station interference coordination methods in all embodiments of the present disclosure. For example, processor 1520 may control transceiver 1510 to receive physical signals transmitted by an interfering base station and perform interference measurement based on the received physical signals; and control transceiver 1510 to report an interference measurement result to an interfering base station(s) or a management center, to cause the interfering base station(s) to perform interference coordination for at least the first base station based on the interference measurement result reported by the first base station 1500 or configuration by the management center.

Figure 16:
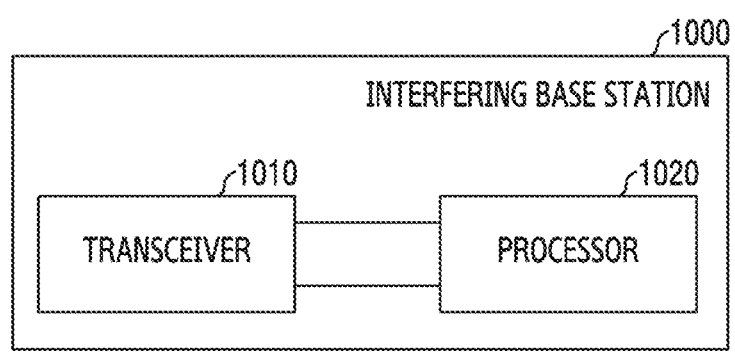
FIG. 16 illustrates a structure of an interfering base station according to an embodiment of the present disclosure.

FIG. 16 is a schematic diagram illustrating a structure of an interfering base station 1000.

In FIG. 16, the interfering base station 1000 includes a transceiver 1010 and a processor 1020.

Transceiver 1010 may transmit and receive uplink and/or downlink wireless signals in a wireless communication network to communicate with base stations or other terminals. Processor 1020 may generate signals to be transmitted by transceiver 1010, interpret signals received by transceiver 1010, or control the operation of transceiver 1010. Processor 1020 may perform inter-base station interference coordination methods in all embodiments of the present disclosure. For example, processor 1020 may control the transceiver 1010 to transmit physical signals to a first base station(s), so that the first base station(s) perform(s) interference measurement based on the physical signals transmitted by the interfering base station 1000 and reports interference measurement results to the interfering base station 1000 or a management center; and perform interference coordination for at least the first base station(s) according to the interference measurement result reported by the first base station(s) or the configuration by the management center.

Figure 17:
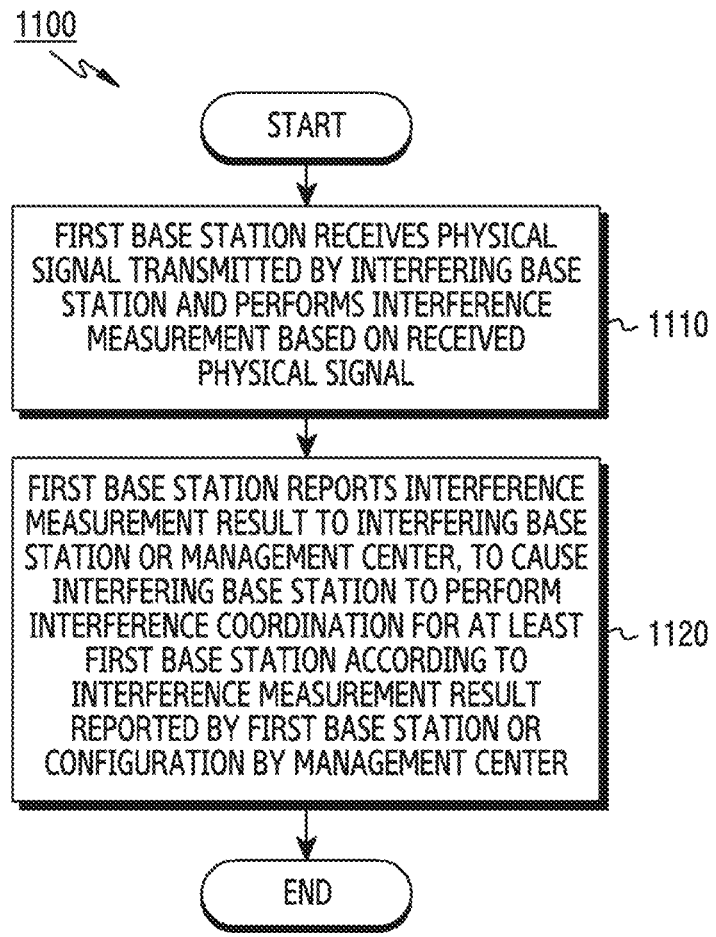
FIG. 17 illustrates a flowchart of an interference coordination method performed by a first base station according to an embodiment of the present disclosure.

FIG. 17 illustrates an inter-base station interference coordination method 1100 performed by the first base station 1500.

In step 1110, the first base station 1500 receives physical signals transmitted by the interfering base station 1000 and performs interference measurement based on the received physical signals.

In step 1120, the first base station 1500 reports an interference measurement result to the interfering base station 1000 or a management center 110, to cause the interfering base station 1000 to perform interference coordination for at least the first base station 1500 according to the interference measurement result reported by the first base station 1500 or configuration by the management center 110.

Figure 18:
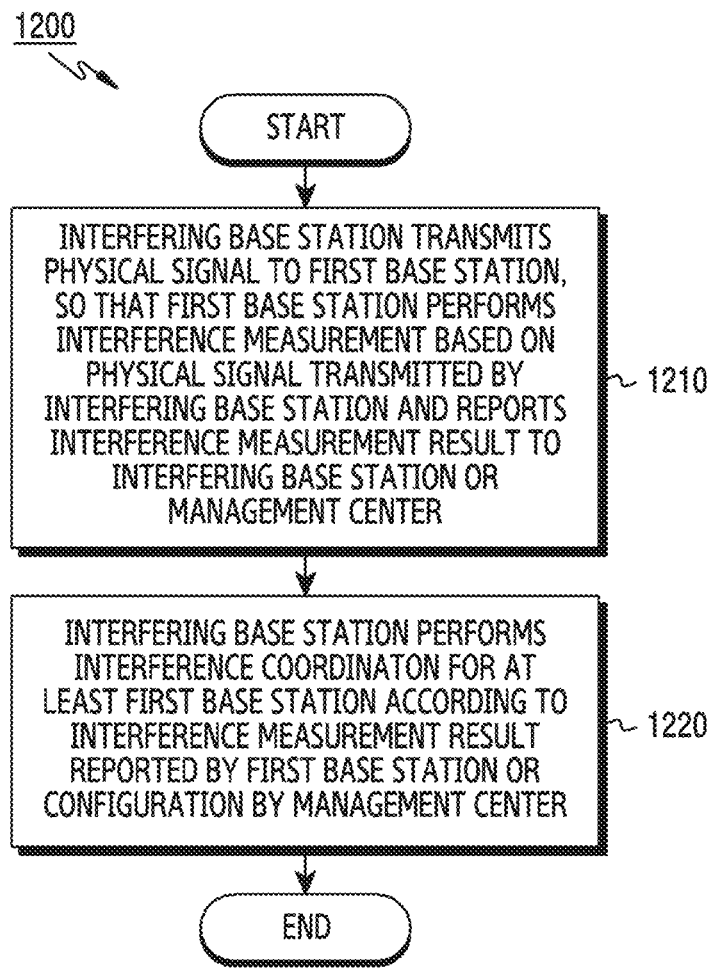
FIG. 18 illustrates a flowchart of an interference coordination method performed by an interfering base station according to an embodiment of the present disclosure.

FIG. 18 illustrates an inter-base station interference coordination method 1200 performed by the interfering base station 1000.

In step 1810, the interfering base station 1000 transmits physical signals to the first base station 1500, so that the first base station 1500 performs interference measurement based on the physical signals transmitted by the interfering base station 1000 and reports an interference measurement result to the interfering base station 1000 or the management center 110.

In step 1220, the interfering base station 1000 performs interference coordination for at least the first base station 1500 according to the interference measurement result reported by the first base station 1500 or configuration by the management center 110.

Figure 19:
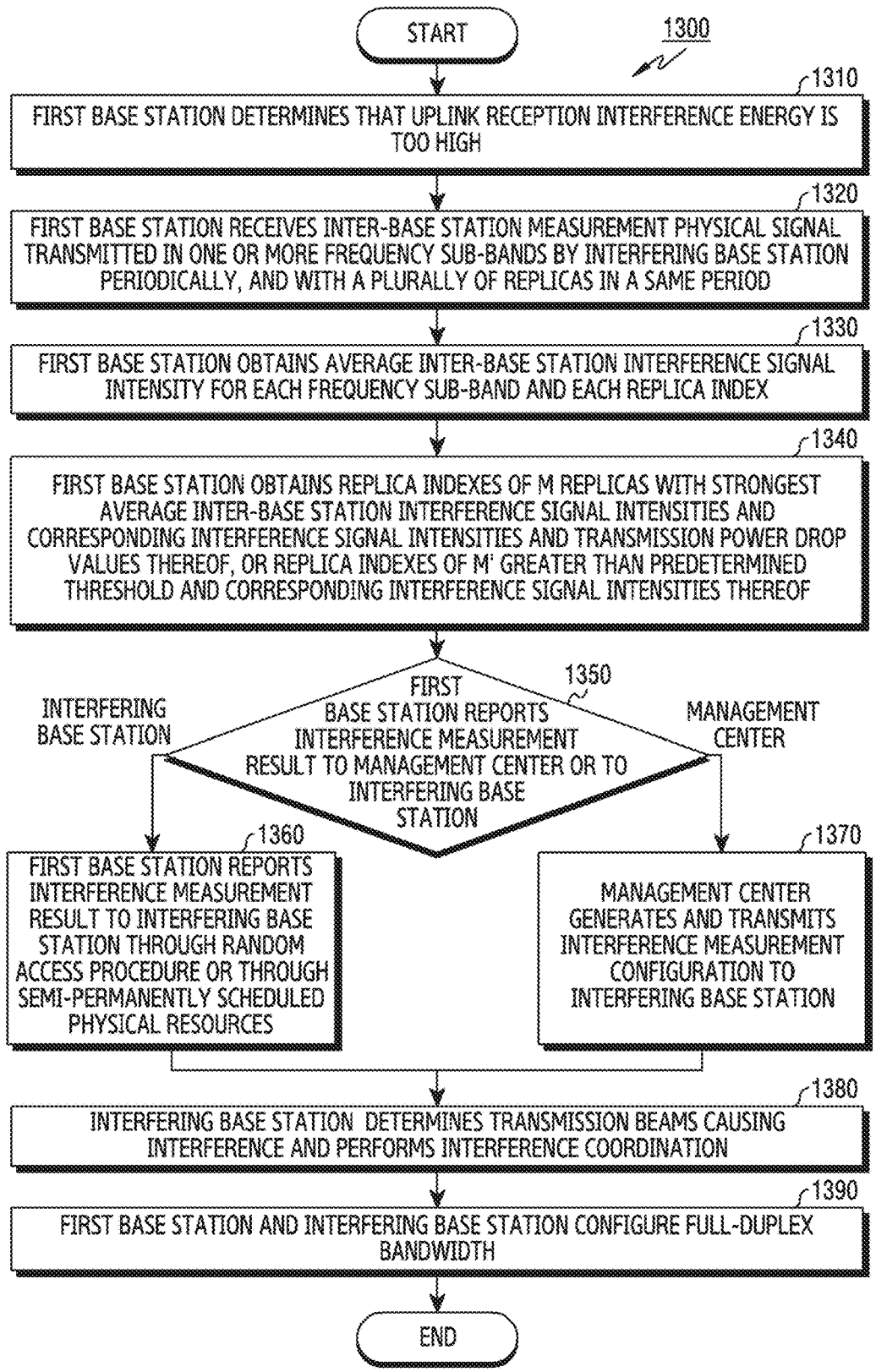
FIG. 19 illustrates a flowchart further illustrating the interference coordination method shown in FIG. 17 according to an embodiment of the present disclosure.

FIG. 19 is a schematic diagram 1300 of an inter-base station interference coordination method according to an embodiment of the present disclosure, which further details the method shown in FIG. 17.

In step 1310, a first base station determines that the energy of interference with uplink reception is too high. Step 1310 corresponds to step 901 of FIG. 9, and corresponds to step 601 of FIG. 12.

In step 1320, the first base station 1500 receives a physical signal transmitted by an interfering base station 1000, the physical signal including an inter-base station measurement physical signal transmitted in one or more frequency sub-bands, and, the inter-base station measurement physical signal is repeatedly transmitted in each frequency sub-band in a plurality of transmission periods, and, at least two replicas with different replica indexes of the inter-base station measurement physical signal are repeatedly transmitted in each frequency sub-band in the same transmission period. Manners in which a plurality of replicas with different replica indexes of the inter-base station measurement physical signal are repeatedly transmitted in each frequency sub-band in the same transmission period contain at least one of the following: the interfering base station 1000 transmitting at least two replicas with the same complex symbols with different analog transmit beams; the interfering base station 1000 transmitting at least two replicas with the same complex symbols with different digital transmit beams; or the interfering base station 1000 transmitting at least two replicas with the same complex symbols with the same analog transmit beams and the same digital transmit beams. Step 1320 corresponds to step 911 of FIG. 9, and corresponds to step 611 of FIG. 12.

In step 1330, the first base station 1500 averages inter-base station interference signal power of replicas in different transmission periods, in the same frequency sub-band and with the same replica index, to obtain an average inter-base station interference signal power for each frequency sub-band and each replica index.

In step 1340, the first base station 1500 obtains at least one of the following as the interference measurement result: the average inter-base station interference signal power for each frequency sub-band and each replica index, replica indexes of M replicas with the strongest average inter-base station interference signal power in each frequency sub-band, average inter-base station interference signal power of the M replicas in each frequency sub-band, and transmit power reduction values for transmit beams corresponding to the M replicas applied when the interfering base station 1000 performs downlink transmission in each frequency sub-band using the transmit beams corresponding to the M replicas, wherein M is a positive integer and is configured by the management center 110 or is a predetermined system value. Alternatively, the first base station 1500 obtains at least one of the following as the interference measurement result: the average inter-base station interference signal power for each frequency sub-band and each replica index, replica indexes of M' replicas among a plurality of replicas of which average inter-base station interference signal power are greater than a predetermined threshold in each frequency sub-band, average inter-base station interference signal power of the M' replicas in each frequency sub-band, and transmit power reduction values for transmit beams corresponding to the M' replicas applied when the interfering base station 1000 performs downlink transmission in each frequency sub-band using the transmit beams corresponding to the M' replicas, wherein M' is a positive integer and M'≤X. Wherein X is a positive integer and is configured by the management center 110 or is a predetermined system value. Steps 1330 and 1340 correspond to step 913 of FIG. 9, and correspond to step 613 of FIG. 12.

In step 1350, the first base station 1500 determines whether to report the interference measurement result to the management center 110 or to the interfering base station 1000. When the first base station 1500 determines to report to the management center 110, the method 1300 proceeds to step 1370, and when the first base station 1500 determines to report to the interfering base station 1000, the method 1300 proceeds to step 1360.

In step 1360, the first base station 1500 accesses a cell to which the interfering base station 1000 belongs, and reporting the interference measurement result to the interfering base station 1000 through an access link, including: the first base station 1500 carrying the interference measurement result in an Msg3 of a random access procedure with the cell to which the interfering base station 1000 belongs, or, the first base station 1500 carrying the interference measurement result in an uplink shared channel in an MsgA of a two-step random access procedure with the cell to which the interfering base station 1000 belongs, or, the first base station 1500 reporting the interference measurement result on physical resources of semi-persistent scheduling configured by the interfering base station 1000 for the first base station 1500. Step 1360 corresponds to step 915 of FIG. 9.

In step 1370, the management center 110 obtains at least one of the following as the configuration by the management center 110 from the interference measurement result reported by the first base station 1500: the average inter-base station interference signal power for each frequency sub-band and each replica index, replica index of M replicas of which average inter-base station interference signal power are greater than a predetermined threshold or with the strongest average inter-base station interference signal power in each frequency sub-band, average inter-base station interference signal power of the M replicas in each frequency sub-band, and transmit power reduction values for transmit beams corresponding to the M replicas applied when the interfering base station 1000 performs downlink transmission in each frequency sub-band using the transmit beams corresponding to the M replicas, wherein M is a positive integer. Alternatively, the management center 110 obtains at least one of the following as the configuration by the management center 110 from the interference measurement result reported by the first base station 1500: the average inter-base station interference signal power for each frequency sub-band and each replica index, replica indexes of the M' replicas of which average inter-base station interference signal power are greater than a predetermined threshold in each frequency sub-band, average inter-base station interference signal power of the M' replicas in each frequency sub-band, and transmit power reduction values for transmit beams corresponding to the M' replicas applied when the interfering base station 1000 performs downlink transmission in each frequency sub-band using the transmit beams corresponding to the M' replicas, wherein M is a positive integer, and as thus, the value of M is adjustable based on the predetermined threshold and X. Then, the management center 110 transmits the configuration by the management center 110 to the interfering base station 1000. Step 1370 corresponds to step 617 of FIG. 12.

In step 1380, the interfering base station 1000 determines transmit beams corresponding to the interference measurement result reported by the first base station 1500 or the configuration by the management center 110; and performing the following steps for K transmit beams among the determined transmit beams: performing, by the interfering base station 1000, downlink transmission without using the K transmit beams in all time-and-frequency resources or specific time-and-frequency resources of the system; further determining, by the interfering base station 1000, transmit power reduction values corresponding to the K transmit beams from the interference measurement result, and performing downlink transmission in all time-and-frequency resources or specific time-and-frequency resources according to the determined transmit power reduction values corresponding to the K transmit beams when performing downlink transmission using the K transmit beams; wherein K is a positive integer, and when the determined transmit beams are determined from the interference measurement result reported by the first base station 1500, K≤M*[number of frequency sub-bands], and when the determined transmit beams are determined from the configuration by the management center 110, K≤M'*[number of frequency sub-bands]. The specific time-and-frequency resources include one of the following: time-and-frequency resources for interference coordination configured by the management center 110; or time-and-frequency resources for interference coordination acquired by the interfering base station 1000 according to a predetermined rule, wherein the predetermined rule includes: using a fixed frequency band within a system bandwidth as frequency-domain resources for interference coordination; using a fixed (single) subframe(s) or a slot(s) or time-domain symbols in a slot(s) as time-domain resources for interference coordination; and combination of the above frequency-domain resources and time-domain resources. Step 1380 corresponds to step 917 of FIG. 9, and corresponds to step 621 of FIG. 18.

In step 1390, at least one of the first base station 1500 and the interfering base station 1000 configures a full-duplex bandwidth or bandwidth part within the system bandwidth, wherein the full-duplex bandwidth of the first base station 1500 and that of the interfering base station 1000 are not overlapped or are not completely overlapped. Specifically, at least one of the first base station 1500 and the interfering base station 1000 determines a starting position and a frequency-domain range of the full-duplex bandwidth or bandwidth part of the at least one of the first base station 1500 and the interfering base station 1000 based on at least one of the system bandwidth, a full-duplex bandwidth, a coordinated multiplexing factor and a cell identifier of the at least one of the first base station 1500 and the interfering base station 1000. Although step 1390 is shown to be performed after step 1380 in FIG. 19, step 1390 may be performed simultaneously with any other step in FIG. 13, may be performed between any other two steps in FIG. 19, may be performed independently of any other step in FIG. 19, or may be omitted.

Steps 1310, 1320, 1330, 1340 may be applied to step 1110 of FIG. 17, and steps 1350, 1360, 1370, 1380 may be applied to step 1120 of FIG. 17, and step 1390 may be applied to any one of steps 1110 and 1120 of FIG. 17, may be performed before step 1110, may be performed after step 1120, may be performed simultaneously with steps 1110 and 1120, or may be performed independently of steps 1110 and 1120.

Figure 20:
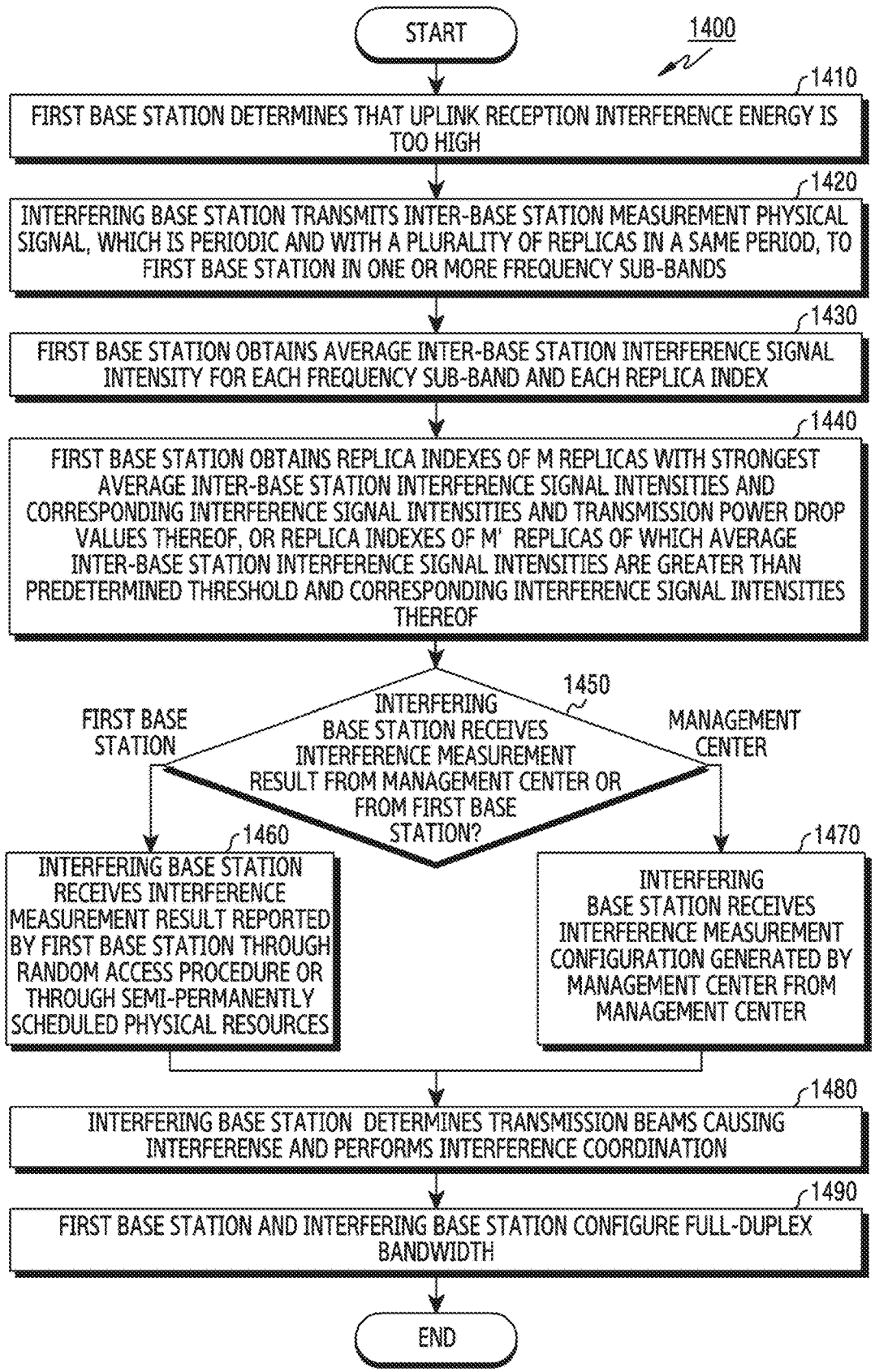
FIG. 20 illustrates a flowchart further illustrating the interference coordination method shown in FIG. 18 according to an embodiment of the present disclosure.

FIG. 20 is a schematic diagram 1400 of an inter-base station interference coordination method according to an embodiment of the present disclosure, which further details the method shown in FIG. 18.

In step 1410, a first base station 1500 determines that the energy of interference with uplink reception is too high. Step 1410 corresponds to step 901 of FIG. 9 and corresponds to step 601 of FIG. 12.

In step 1420, the interfering base station 1000 transmits a physical signal to the first base station 1500, the physical signal including an inter-base station measurement physical signal transmitted in one or more frequency sub-bands, and, the inter-base station measurement physical signal is repeatedly transmitted in each frequency sub-band in a plurality of transmission periods, and, at least two replicas with different replica indexes of the inter-base station measurement physical signal are repeatedly transmitted in each frequency sub-band in the same transmission period. Manners in which a plurality of replicas with different replica indexes of the inter-base station measurement physical signal are repeatedly transmitted in each frequency sub-band in the same transmission period contain at least one of the following: the interfering base station 1000 transmitting at least two replicas with the same complex symbols with different analog transmit beams; the interfering base station 1000 transmitting at least two replicas with the same complex symbols with different digital transmit beams; or the interfering base station 1000 transmitting at least two replicas with the same complex symbols with the same analog transmit beams and the same digital transmit beams. Step 1420 corresponds to step 911 of FIG. 9, and corresponds to step 611 of FIG. 12.

In step 1430, the first base station 1500 averages inter-base station interference signal power of replicas in different transmission periods, in the same frequency sub-band and with the same replica index, to obtain an average inter-base station interference signal power for each frequency sub-band and each replica index.

In step 1440, the first base station 1500 obtains at least one of the following as the interference measurement result: the average inter-base station interference signal power for each frequency sub-band and each replica index, replica indexes of M replicas with the strongest average inter-base station interference signal power in each frequency sub-band, average inter-base station interference signal power of the M replicas in each frequency sub-band, and transmit power reduction values for transmit beams corresponding to the M replicas applied when the interfering base station 1000 performs downlink transmission in each frequency sub-band using the transmit beams corresponding to the M replicas, wherein M is a positive integer and is configured by the management center 110 or is a predetermined system value. Alternatively, the first base station 1500 obtains at least one of the following as the interference measurement result: the average inter-base station interference signal power for each frequency sub-band and each replica index, replica indexes of M' replicas among a plurality of replicas of which average inter-base station interference signal power are greater than a predetermined threshold in each frequency sub-band, average inter-base station interference signal power of the M' replicas in each frequency sub-band, and transmit power reduction values for transmit beams corresponding to the M' replicas applied when the interfering base station 1000 performs downlink transmission in each frequency sub-band using the transmit beams corresponding to the M' replicas, wherein M' is a positive integer, and M'≤X, wherein X is a positive integer and is configured by the management center 110 or is a predetermined system value. As such, the value of M is adjustable based on the predetermined threshold and X. Steps 1430 and 1440 correspond to step 913 of FIG. 9, and correspond to step 613 of FIG. 12.

In step 1450, the interfering base station 1000 determines whether to obtain information related to the interference measurement result from the management center 110 or from the interfering base station 1000. When the interfering base station 1000 determines to obtain information related to the interference measurement result from the management center 110, the method 1400 proceeds to step 1470, and when the interfering base station 1000 determines to obtain information related to the interference measurement result from the interfering base station 1000, the method 1400 proceeds to step 1460.

In step 1460, the interfering base station 1000 receives the interference measurement result from the first base station 1500 through an access link, including: the interfering base station 1000 obtaining the interference measurement result through an Msg3 of a random access procedure of the first base station 1500 with the cell to which the interfering base station 1000 belongs, or, the interfering base station 1000 obtaining the interference measurement result through an uplink shared channel in an MsgA of a two-step random access procedure of the first base station 1500 with the cell to which the interfering base station 1000 belongs, or, the interfering base station 1000 obtaining the interference measurement result on physical resources of semi-persistent scheduling configured by the interfering base station 1000 for the first base station 1500. Step 1460 may correspond to step 915 of FIG. 9.

In step 1470, the management center 110 obtains at least one of the following as configuration by the management center 110 from the interference measurement result reported by the first base station 1500: the average inter-base station interference signal power for each frequency sub-band and each replica index, replica index of M replicas of which average inter-base station interference signal power are greater than a predetermined threshold or with the strongest average inter-base station interference signal power in each frequency sub-band, average inter-base station interference signal power of the M replicas in each frequency sub-band, and transmit power reduction values for transmit beams corresponding to the M replicas applied when the interfering base station 1000 performs downlink transmission in each frequency sub-band using the transmit beams corresponding to the M replicas, wherein M is a positive integer. Or the management center 110 obtains at least one of the following as the configuration by the management center 110 from the interference measurement result reported by the first base station 1500: the average inter-base station interference signal power for each frequency sub-band and each replica index, replica indexes of M' replicas among a plurality of replicas of which average inter-base station interference signal power are greater than a predetermined threshold in each frequency sub-band, average inter-base station interference signal power of the M' replicas in each frequency sub-band, and transmit power reduction values for transmit beams corresponding to the M' replicas applied when the interfering base station 1000 performs downlink transmission in each frequency sub-band using the transmit beams corresponding to the M' replicas, wherein M' is a positive integer, and M'≤X, wherein X is a positive integer and is configured by the management center 110 or is a predetermined system value. As such, the value of M' is adjustable based on the predetermined threshold and X. Then, the management center 110 transmits the configuration by the management center 110 to the interfering base station 1000. Step 1470 may correspond to step 617 of FIG. 12.

In step 1480, the interfering base station 1000 determines transmit beams corresponding to the interference measurement result reported by the first base station 1500 or the configuration by the management center 110; and performing the following steps for K transmit beams among the determined transmit beams: performing, by the interfering base station 1000, downlink transmission without using the K transmit beams in all time-and-frequency resources or specific time-and-frequency resources of the system; further determining, by the interfering base station 1000, transmit power reduction values corresponding to the K transmit beams from the interference measurement result, and performing downlink transmission in all time-and-frequency resources or specific time-and-frequency resources according to the determined transmit power reduction values corresponding to the K transmit beams when performing downlink transmission using the K transmit beams; wherein k is a positive integer, and when the determined transmit beams are determined from the interference measurement result reported by the first base station 1500, K≤M*[number of frequency sub-bands], and when the determined transmit beams are determined from the configuration by the management center 110, K≤M'*[number of frequency sub-bands]. The specific time-and-frequency resources include one of the following: time-and-frequency resources for interference coordination configured by the management center 110; or time-and-frequency resources for interference coordination acquired by the interfering base station 1000 according to a predetermined rule, wherein the predetermined rule includes: using a fixed frequency band within a system bandwidth as frequency-domain resources for interference coordination; using a fixed (single) subframe(s) or a slot(s) or time-domain symbols in a slot(s) as time-domain resources for interference coordination; and combination of the above frequency-domain resources and time-domain resources. Step 1480 corresponds to step 917 of FIG. 9 and corresponds to step 621 of FIG. 12.

In step 1490, at least one of the first base station 1500 and the interfering base station 1000 configures a full-duplex bandwidth or bandwidth part within the system bandwidth, wherein the full-duplex bandwidth or bandwidth part of the first base station 1500 and that of the interfering base station 1000 are not overlapped or are not completely overlapped. Specifically, at least one of the first base station 1500 and the interfering base station 1000 determines a starting position and a frequency-domain range of the full-duplex bandwidth or bandwidth part of the at least one of the first base station 1500 and the interfering base station 1000, based on at least one of the system bandwidth, a full-duplex bandwidth, a coordinated multiplexing factor and a cell identifier of the at least one of the first base station 1500 and the interfering base station 1000. Although step 1490 is shown to be performed after step 1480 in FIG. 20, step 1490 may be performed simultaneously with any other step of FIG. 20, or may be performed between any other two steps of FIG. 20, or may be performed independently of any other step of FIG. 20, or may be omitted.

Steps 1410, 1420, 1430, 1440 may be applied to step 1810 of FIG. 12, steps 1450, 1460, 1470, 1480 may be applied to step 1120 of FIG. 12, and step 1490 may be applied to any one of steps 1810 and 1220 of FIG. 12, may be performed before step 1810, may be performed after step 1220, may be performed between steps 1810 and 1220, or may be performed independently of steps 1810 and 1220.

Those skilled in the art can clearly understand that the implementation principle and technical effect of the gNB provided by the embodiment of the present disclosure are the same as those of the previous method embodiment. For convenience and conciseness of description, the parts not mentioned in this embodiment may refer to the corresponding contents in the previous method embodiment and will not be repeated here.

The embodiment of the present disclosure also provides an electronic device (such as a terminal device), which comprises: a processor and a memory, wherein that memory store at least one instruction, at least one program, code set or instruction set, and the at least one instruction, at least one program, code set or instruction set is loaded and execute by the processor to realize corresponding contents in the method embodiment.

Optionally, the electronic device may further include a transceiver. The processor is connected to the transceiver, such as via a bus. It should be noted that the transceiver is not limited to one in actual disclosure, and the structure of the electronic device is not limited to the embodiment of the present disclosure.

The processor may be a CPU, a general-purpose processor, a DSP, an ASIC, an FPGA or other programmable logic device, a transistor logic device, a hardware component, or any combination thereof. Which may implement or execute the various illustrative logical blocks, modules, and circuits described in connection with the present disclosure. The processor may also be a combination that implements computing functions, such as a combination that includes one or more microprocessors, a combination of dsps and microprocessors, and the like.

The bus may include a path to transfer information between the above components. The bus may be a PCI bus, an EISA bus, or the like. The bus can be divided into address bus, data bus, control bus, etc. The memory may be ROM or other type of static storage device capable of storing static information and instructions, RAM or other type of dynamic storage device capable of storing information and instructions, EEPROM, CD-ROM or other optical disk storage, optical disk storage (including compact disk, laser disk, optical disk, digital versatile disk, Blu-ray disk, etc.), magnetic disk storage medium or other magnetic storage device, or any other medium capable of carrying or storing desired program codes in the form of instructions or data structures and capable of being accessed by a computer, but is not limited thereto.

The embodiment of the present disclosure also provides a computer readable storage medium for storing computer instructions which, when executed on a computer, enable the computer to execute corresponding contents in the foregoing method embodiment.

It should be understood although various steps in the flowchart of the drawings are shown in sequence as indicated by arrows, these steps are not necessarily executed in sequence as indicated by arrows. Unless explicitly stated herein, the execution of these steps is not strictly limited in sequence, but may be performed in other sequences. Moreover, at least a part of the steps in the flowchart of the drawings may include a plurality of sub-steps or stages, which are not necessarily completed at the same time, but may be executed at different times, and the execution order thereof is not necessarily sequentially, but may be executed in turn or alternately with at least a part of the sub-steps or stages of other steps or other steps.

The above description is only part of the implementation of this disclosure. It should be pointed out that for a person of ordinary skill in the technical field, several improvements and embellishments can be made without departing from the principles of this disclosure. These improvements and embellishments should also be regarded as the protection scope of this disclosure.

The invention claimed is:

1. A method of remote interference management (RIM), performed by a first base station in a wireless communication system, the method comprising:
   identifying configuration information including a first base station set identifier (ID) for a first remote interference management reference signal (RIM-RS) and a second base station set ID for a second RIM-RS, wherein a set of available sequences corresponding to the first base station set ID is configured with the first base station;

transmitting, to a second base station, the first RIM-RS determined based on the first base station set ID of the configuration information in a first period indicated by the first base station set ID;

in response to remote interference being reduced, receiving, from the second base station, the second RIM-RS in a second period after the first period and indicated by the second base station set ID of the configuration information;

in case that the remote interference is not reduced to a designated level, transmitting, to the second base station, a third RIM-RS including first bits corresponding to a first sequence index, wherein the first sequence index is included in a first half of sequence indexes for the set of the available sequences and wherein the first half of the sequence indexes indicates the remote interference exists; and in case that the remote interference is reduced to the designated level based on the first RIM-RS, transmitting, to the second base station, a third RIM-RS including second bits corresponding to a second sequence index, wherein the second sequence index is included in a second half of the sequence indexes for the set of the available sequences and wherein the second half of the sequence indexes indicates the remote interference is reduced to the designated level, wherein the second half of the sequence indexes follows the first half of the sequence indexes, wherein a time period in which the first RIM-RS and the third RIM-RS are transmitted is divided into a first period for the first RIM-RS and a third period for the third RIM-RS which follows the first period, wherein the first period is indexed with a first number of transmission occasions based on a number of switching points, included in the time period, between a downlink pattern and an uplink pattern, and the third period is indexed with a second number of transmission occasions based on the number of the switching points, and wherein the first base station set ID indicates a first index corresponding to a first occasion in which the first RIM-RS is transmitted among the first period, and a second index corresponding to a second occasion in which the third RIM-RS is transmitted among the third period.

2. The method of claim 1, further comprising:
detecting the second RIM-RS;
determining information on the second base station set ID based on the second RIM-RS; and
reporting the information on the second base station set ID.

3. The method of claim 1, wherein the configuration information comprises at least one of DL-UL pattern period, transmission period of RIM-RS, time period allocation information of each type of the RIM-RS in the transmission period of the RIM-RS, a number of repetitions of each type of RIM-RS, a number of frequency domain resources of the RIM-RS, or the set of available sequences on transmission occasions of the RIM-RS.

4. The method of claim 2,
wherein a type of the first RIM-RS comprises at least one of a first type RIM-RS for a near base station interference measurement, and a second type RIM-RS for a remote base station interference measurement.

5. The method of claim 4, wherein a number of repetitions of the first type RIM-RS for the near base station interference measurement is equal to a number of repetitions of the second type RIM-RS for the remote base station interference measurement.

6. The method of claim 2, the method further comprising:
stopping a transmission of the third RIM-RS including the first bits in case that the second RIM-RS is not detected.

7. A first base station in a wireless communication system, the first base station comprising:
at least one transceiver; and
at least one processor coupled with the at least one transceiver,
wherein the at least one processor is configured to:
identify configuration information including a first base station set identifier (ID) for a first remote interference management reference signal (RIM-RS) and a second base station set ID for a second RIM-RS, wherein a set of available sequences corresponding to the first base station set ID is configured with the first base station, transmit, to a second base station, the first RIM-RS determined based on the first base station set ID of the configuration information in a first period indicated by the first base station set ID, in response to remote interference being reduced, receive, from the second base station, the second RIM-RS in a second period after the first period and indicated by the second base station set ID of the configuration information, in case that the remote interference is not reduced to a designated level, transmit, to the second base station, a third RIM-RS including first bits corresponding to a first sequence index, wherein the first sequence index is included in a first half of sequence indexes for the set of the available sequences and wherein the first half of the sequence indexes indicates the remote interference exists, and in case that the remote interference is reduced to the designated level based on the first RIM-RS, transmit, to the second base station, a third RIM-RS including second bits corresponding to a second sequence index, wherein the second sequence index is included in a second half of the sequence indexes for the set of the available sequences and wherein the second half of the sequence indexes indicates the remote interference is reduced to the designated level, wherein the second half of the sequence indexes follows the first half of the sequence indexes, wherein a time period in which the first RIM-RS and the third RIM-RS are transmitted is divided into a first period for the first RIM-RS and a third period for the third RIM-RS which follows the first period, wherein the first period is indexed with a first number of transmission occasions based on a number of switching points, included in the time period, between a downlink pattern and an uplink pattern, and the third period is indexed with a second number of transmission occasions based on the number of the switching points, and wherein the first base station set ID indicates a first index corresponding to a first occasion in which the first RIM-RS is transmitted among the first period, and a second index corresponding to a second occasion in which the third RIM-RS is transmitted among the third period.

8. The first base station of claim 7, wherein the at least one processor is further configured to:
detect the second RIM-RS,
determine information on the second base station set ID based on the second RIM-RS, and
report the information on the second base station set ID.

9. The first base station of claim 7, wherein the configuration information comprises at least one of DL-UL pattern period, transmission period of RIM-RS, time period allocation information of each type of the RIM-RS in the transmission period of the RIM-RS, a number of repetitions of each type of RIM-RS, a number of frequency domain resources of the RIM-RS, or the set of available sequences on transmission occasions of the RIM-RS.

10. The first base station of claim 8,
wherein a type of the first RIM-RS comprises at least one of a first type RIM-RS for a near base station interference measurement, and a second type RIM-RS for a remote base station interference measurement.

11. The first base station of claim 10, wherein a number of repetitions of the first type RIM-RS for the near base station interference measurement is equal to a number of repetitions of the second type RIM-RS for the remote base station interference measurement.

12. The first base station of claim 8, wherein the processor is further configured to:
stop a transmission of the third RIM-RS including the second bits in case that the second RIM-RS is not detected.

13. A method of remote interference management (RIM), performed by a second base station in a wireless communication system, the method comprising:
receiving, from a first base station, a first remote interference management reference signal (RIM-RS) in a first period indicated by a first base station set identifier (ID) of configuration information, wherein a set of available sequences corresponding to the first base station set ID is configured with the second base station;
identifying the first base station based on a mapping relationship between the first base station set identifier (ID) and the first RIM-RS;
performing an interference reduction;
transmitting, to the first base station, a second RIM-RS in a second period after the first period and indicated by a second base station set ID of the configuration information;
in case that remote interference is not reduced to a designated level, receiving, from the first base station, a third RIM-RS including first bits corresponding to a first sequence index, wherein the first sequence index is included in a first half of sequence indexes for the set of the available sequences and wherein the first half of the sequence indexes indicates the remote interference exists; and
in case that the remote interference is reduced to the designated level:
receiving, from the first base station, a third RIM-RS including second bits corresponding to a second sequence index, wherein the second sequence index is included in a second half of the sequence indexes for the set of the available sequences and wherein the second half of the sequence indexes indicates the remote interference is reduced to the designated level; and
restoring a configuration changed by the interference reduction,
wherein the second half of the sequence indexes follows the first half of the sequence indexes,
wherein a time period in which the first RIM-RS and the third RIM-RS are received is divided into a first period for the first RIM-RS and a third period for the third RIM-RS which follows the first period,
wherein the first period is indexed with a first number of transmission occasions based on a number of switching points, included in the time period, between a downlink pattern and an uplink pattern, and the third period is indexed with a second number of transmission occasions based on the number of the switching points, and
wherein the first base station set ID indicates a first index corresponding to a first occasion in which the first RIM-RS is received among the first period, and a second index corresponding to a second occasion in which the third RIM-RS is received among the third period.

14. A second base station in a wireless communication system, the second base station comprising
at least one transceiver;
at least one processor coupled with the at least one transceiver and configured to:
receive, from a first base station, a first remote interference management reference signal (RIM-RS) in a first period indicated by a first base station set identifier (ID) of configuration information, wherein a set of available sequences corresponding to the first base station set ID is configured with the second base station,
identify the first base station based on a mapping relationship between the first base station set identifier (ID) and the first RIM-RS,
perform an interference reduction,
transmit, to the first base station, a second RIM-RS in a second period after the first period and indicated by a second base station set ID of the configuration information,
in case that remote interference is not reduced to a designated level, receive, from the first base station, a third RIM-RS including first bits corresponding to a first sequence index, wherein the first sequence index is included in a first half of sequence indexes for the set of the available sequences and wherein the first half of the sequence indexes indicates the remote interference exists, and
in case that the remote interference is reduced to the designated level:
receive, from the first base station, a third RIM-RS including second bits corresponding to a second sequence index, wherein the second sequence index is included in a second half of the sequence indexes for the set of the available sequences and wherein the second half of the sequence indexes indicates the remote interference is reduced to the designated level, and
restore a configuration changed by the interference reduction,
wherein the second half of the sequence indexes follows the first half of the sequence indexes,
wherein a time period in which the first RIM-RS and the third RIM-RS are received is divided into a first period for the first RIM-RS and a third period for the third RIM-RS which follows the first period,
wherein the first period is indexed with a first number of transmission occasions based on a number of switching points, included in the time period, between a downlink pattern and an uplink pattern, and the third period is indexed with a second number of transmission occasions based on the number of the switching points, and wherein the first base station set ID indicates a first index corresponding to a first occasion in which the first RIM-RS is received among the first period, and a second index corresponding to a second occasion in which the third RIM-RS is received among the third period.

* * * * *